United States Patent
Wu et al.

(10) Patent No.: US 11,178,576 B2
(45) Date of Patent: Nov. 16, 2021

(54) PARAMETER CONVERSIONS BETWEEN AN EVOLVED PACKET SYSTEM NETWORK AND A 5G NETWORK

(71) Applicant: HUAWEI TECHNOLOGIES CO., LTD., Guangdong (CN)

(72) Inventors: Yizhuang Wu, Beijing (CN); Xiaobo Wu, Shanghai (CN); Chunshan Xiong, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 99 days.

(21) Appl. No.: 16/673,260

(22) Filed: Nov. 4, 2019

(65) Prior Publication Data
US 2020/0068445 A1 Feb. 27, 2020

Related U.S. Application Data

(63) Continuation of application No. PCT/CN2018/085500, filed on May 3, 2018.

(30) Foreign Application Priority Data

May 5, 2017 (CN) .......................... 201710314165.X

(51) Int. Cl.
*H04W 28/22* (2009.01)
*H04W 36/00* (2009.01)
*H04W 36/14* (2009.01)

(52) U.S. Cl.
CPC ....... *H04W 28/22* (2013.01); *H04W 36/0066* (2013.01); *H04W 36/0083* (2013.01); *H04W 36/14* (2013.01)

(58) Field of Classification Search
CPC ............ H04W 36/30; H04W 36/0033; H04W 36/0069; H04W 88/06; H04W 24/10;
(Continued)

(56) References Cited

U.S. PATENT DOCUMENTS

2009/0316656 A1* 12/2009 Zhao ................. H04W 36/0044
370/331
2012/0093129 A1 4/2012 Zhao et al.
(Continued)

FOREIGN PATENT DOCUMENTS

CN 101312586 A 11/2008
CN 101594285 A 12/2009
(Continued)

OTHER PUBLICATIONS

Huawei: "TS 23.502: Discussion about QoS parameter mapping from 5GS to EPS and how to allocate TFT", 3GPP Draft; SA WG2 Meeting #120, S2-172012, Mar. 27-31, 2017, Busan, Korea, total 4 pages. XP051247745.
(Continued)

*Primary Examiner* — Allahyar Kasraian
(74) *Attorney, Agent, or Firm* — Womble Bond Dickinson (US) LLP

(57) ABSTRACT

This application provides a parameter determining method and a communications entity. The method includes: When a UE is in a system in which an evolved packet system (EPS) network and a 5GS network interwork, the UE is currently located in the 5GS network, and QoS parameters used include an authorized UE aggregate maximum bit rate (AMBR) and an authorized session AMBR of a session. Because of movement of the UE, the UE needs to be handed over to the EPS network, and QoS parameters that need to be used for the UE in the EPS network include an authorized UE AMBR and an authorized access point name (APN) AMBR. The authorized APN AMBR is determined by a first communications entity based on at least one of a subscribed APN AMBR or the authorized session AMBR of the PDU session, and the authorized UE AMBR is determined by a
(Continued)

second communications entity based on the authorized APN AMBR.

20 Claims, 40 Drawing Sheets

(58) Field of Classification Search
CPC . H04W 36/0055; H04W 36/14; H04W 28/22; H04W 36/08; H04W 76/15; H04W 28/24; H04W 36/00; H04W 36/22; H04W 36/0066; H04W 36/0083; H04W 28/0268; H04W 36/24; H04W 36/34; H04W 36/0016; H04W 36/36
See application file for complete search history.

(56) References Cited

U.S. PATENT DOCUMENTS

2017/0034749 A1* 2/2017 Chandramouli .. H04W 36/0055
2019/0394830 A1* 12/2019 Mildh ............... H04W 52/0258

FOREIGN PATENT DOCUMENTS

| CN | 102595362 A | * | 7/2012 | ............ H04W 76/20 |
|---|---|---|---|---|
| CN | 102595362 A | | 7/2012 | |
| CN | 103052116 A | | 4/2013 | |
| CN | 104284374 A | | 1/2015 | |
| EP | 2753035 A2 | | 7/2014 | |
| EP | 2753035 B1 | | 11/2016 | |
| WO | 2017018970 A1 | | 2/2017 | |

OTHER PUBLICATIONS

ZTE:"Policing solution for MTC Groups", 3GPP TSG SA WG2 Meeting #92, TD S2-122849, Jul. 9-13, 2012, Barcelona, Spain, total 2 pages. XP050633373.

CATT:"23.501 Aggregate bit rate limitations for non-GBR QoS flows", SA WG2 Meeting #119, S2-171602, Feb. 13-17, 2017, Dubrovnik, Croatia. Total 2 pages. XP051235596.

3GPP TS 23.501 V0.4.0 (Apr. 2017), 3rd Generation Partnership Project;Technical Specification Group Services and System Aspects; System Architecture for the 5G System; Stage 2 (Release 15), Apr. 2017. total 122 pages.

Samsung:"Rate Limitation Enforcement in 5G system", 3GPP SA WG2 Meeting #118-BIS, S2-170331, Jan. 16-20, 2017 Spokane, WA, USA, total 2 pages.

* cited by examiner

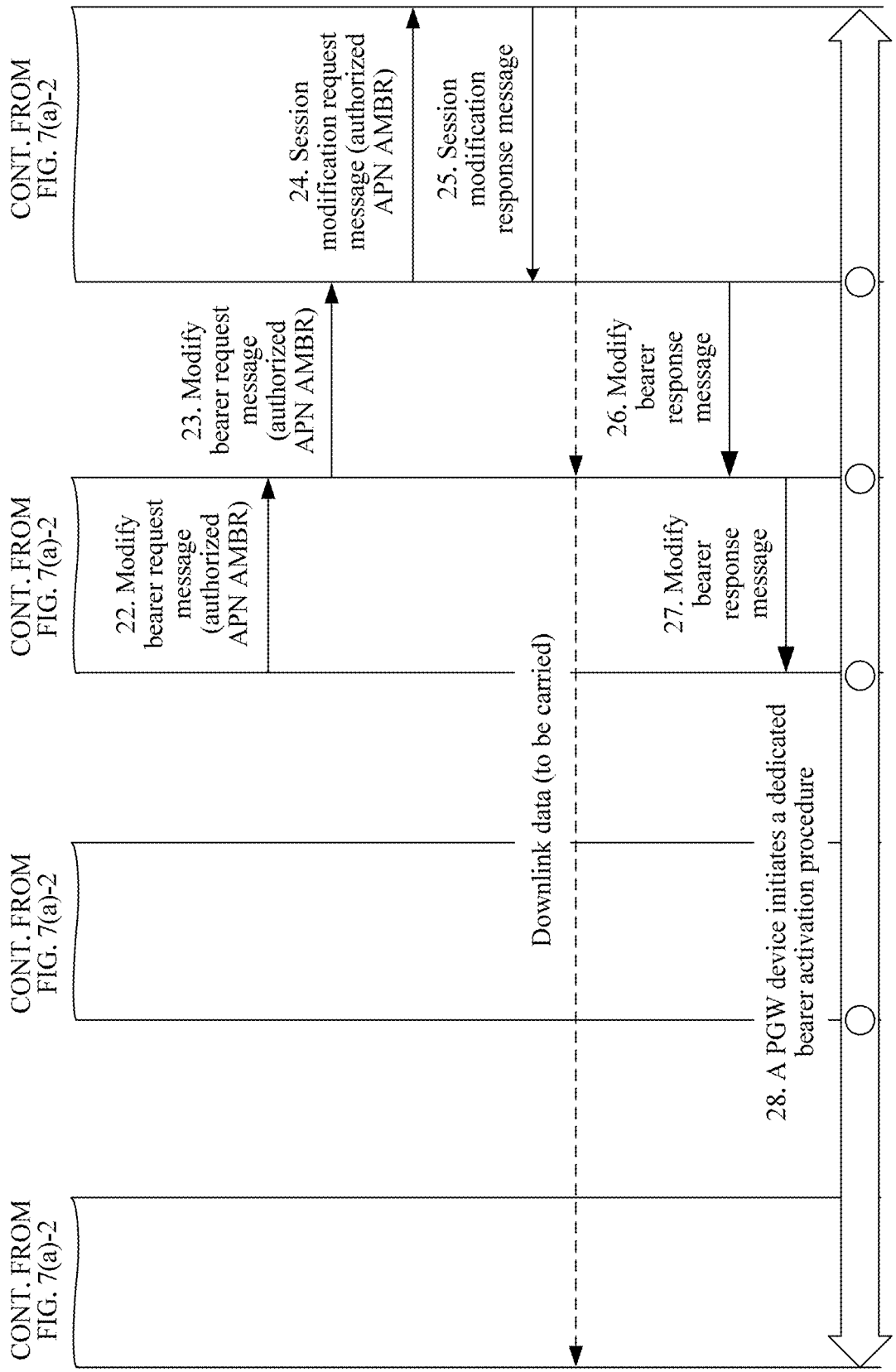

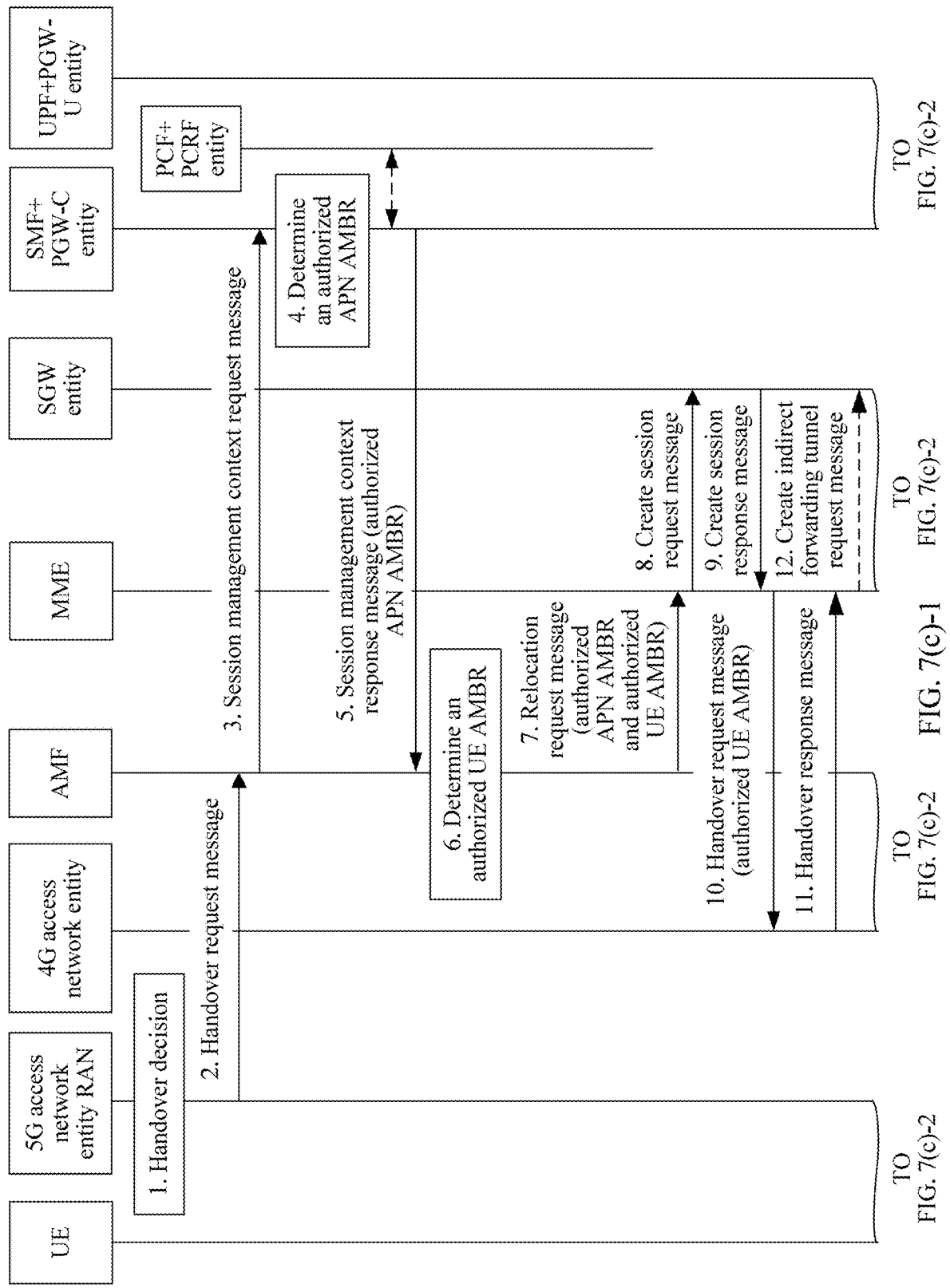

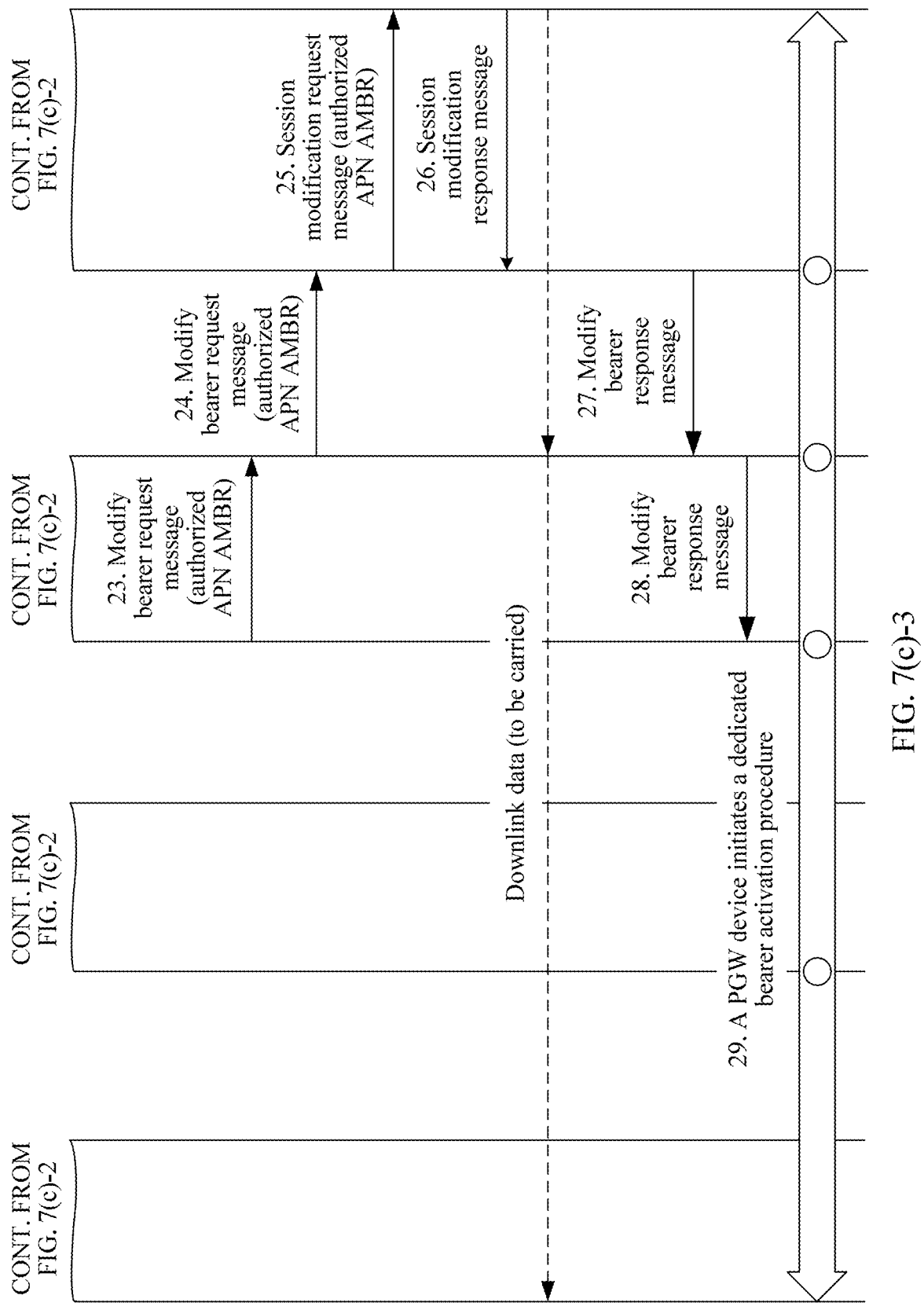

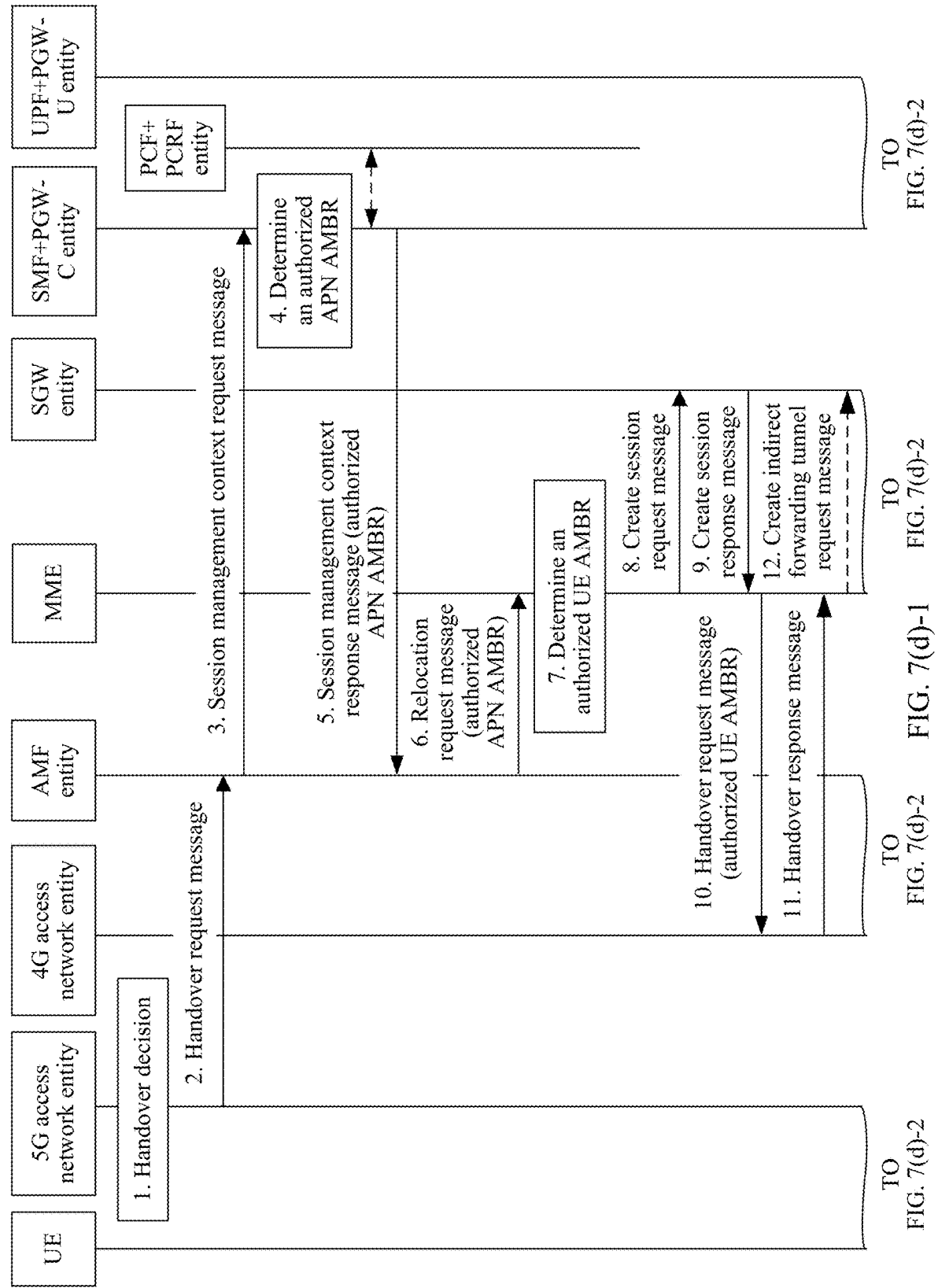

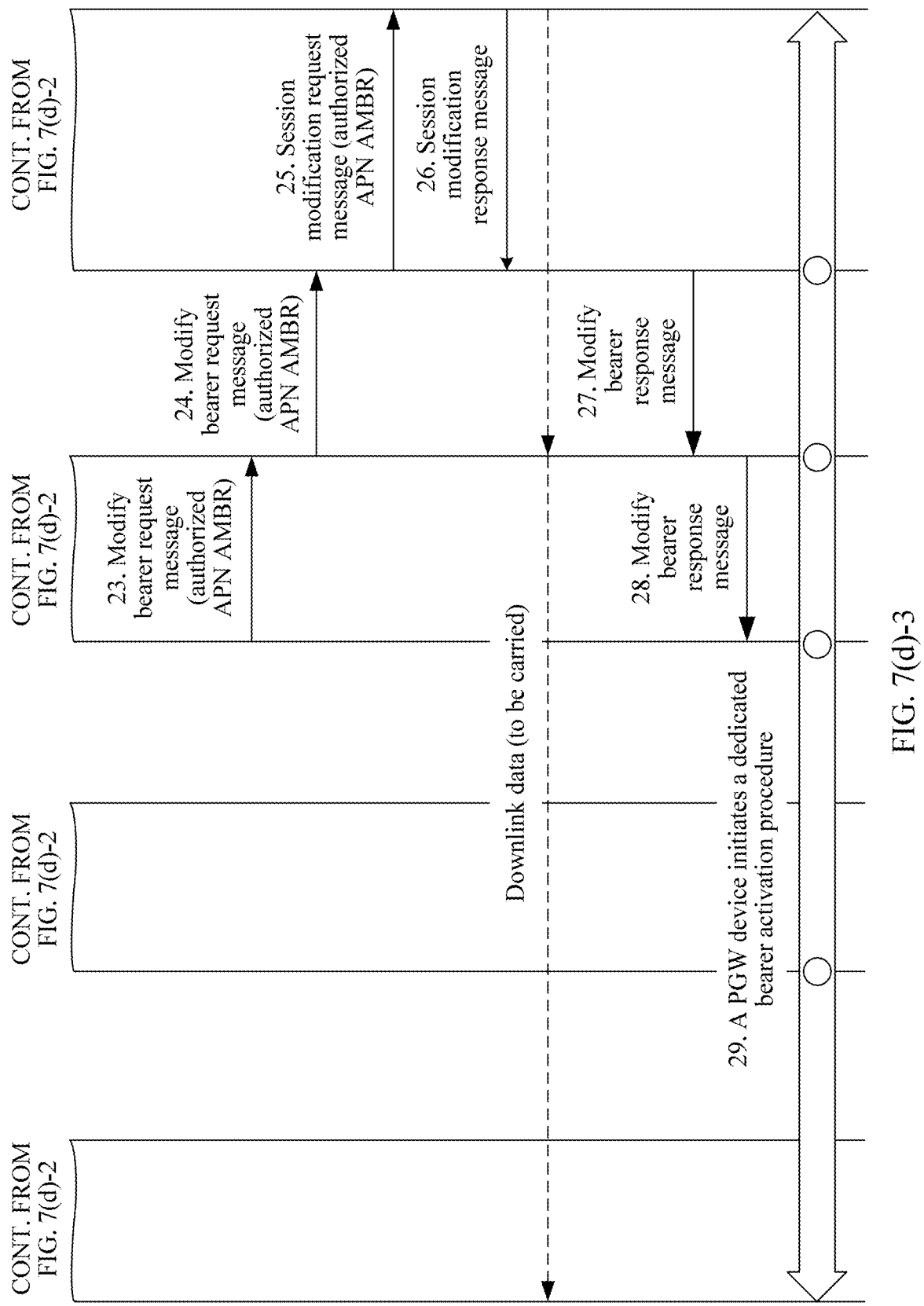

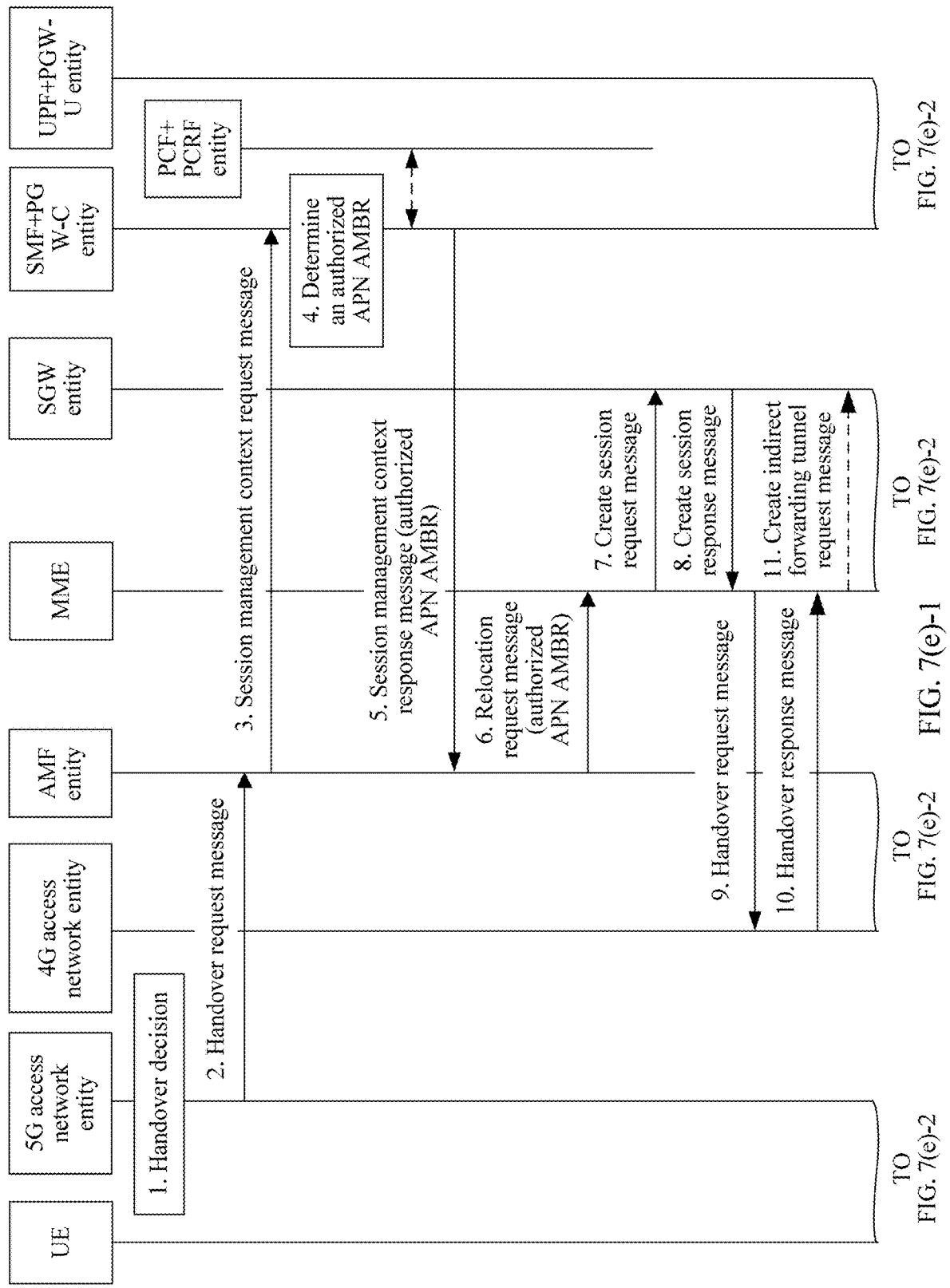

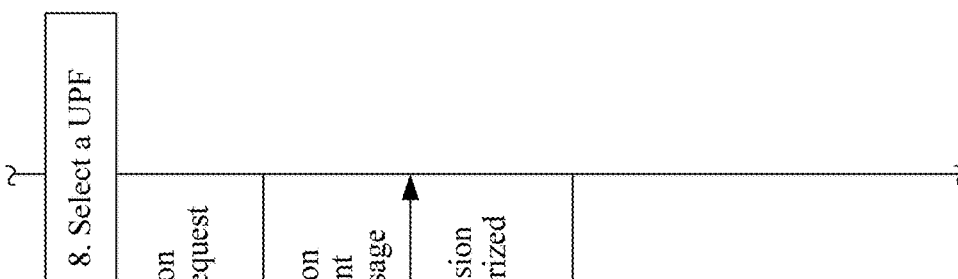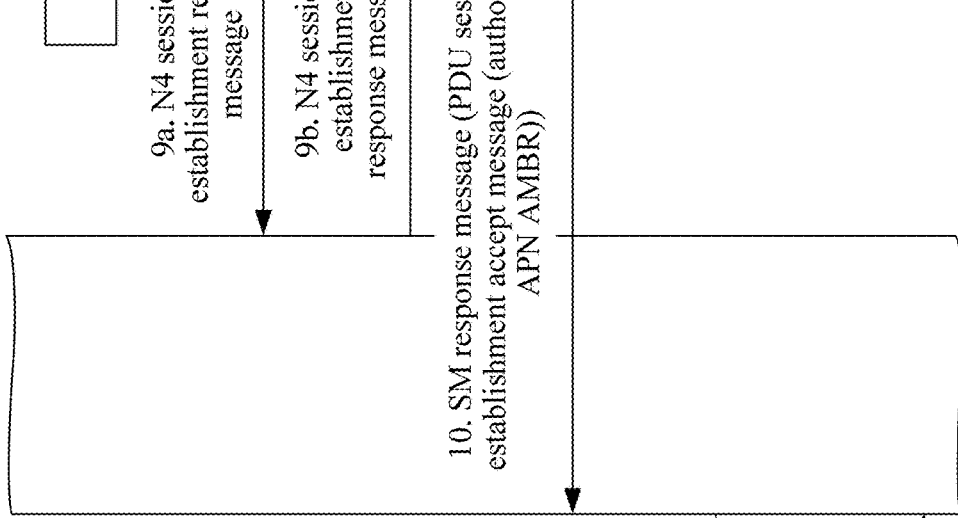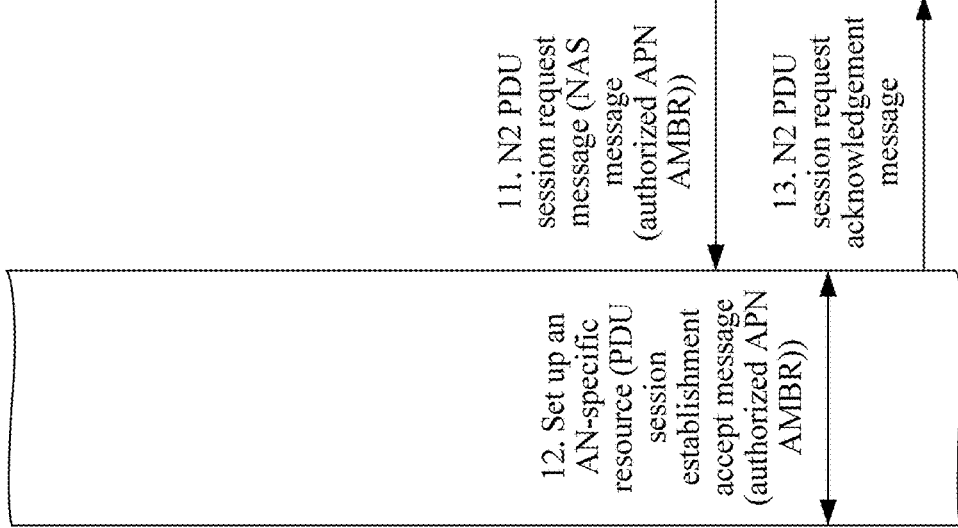
FIG. 7(f)-2

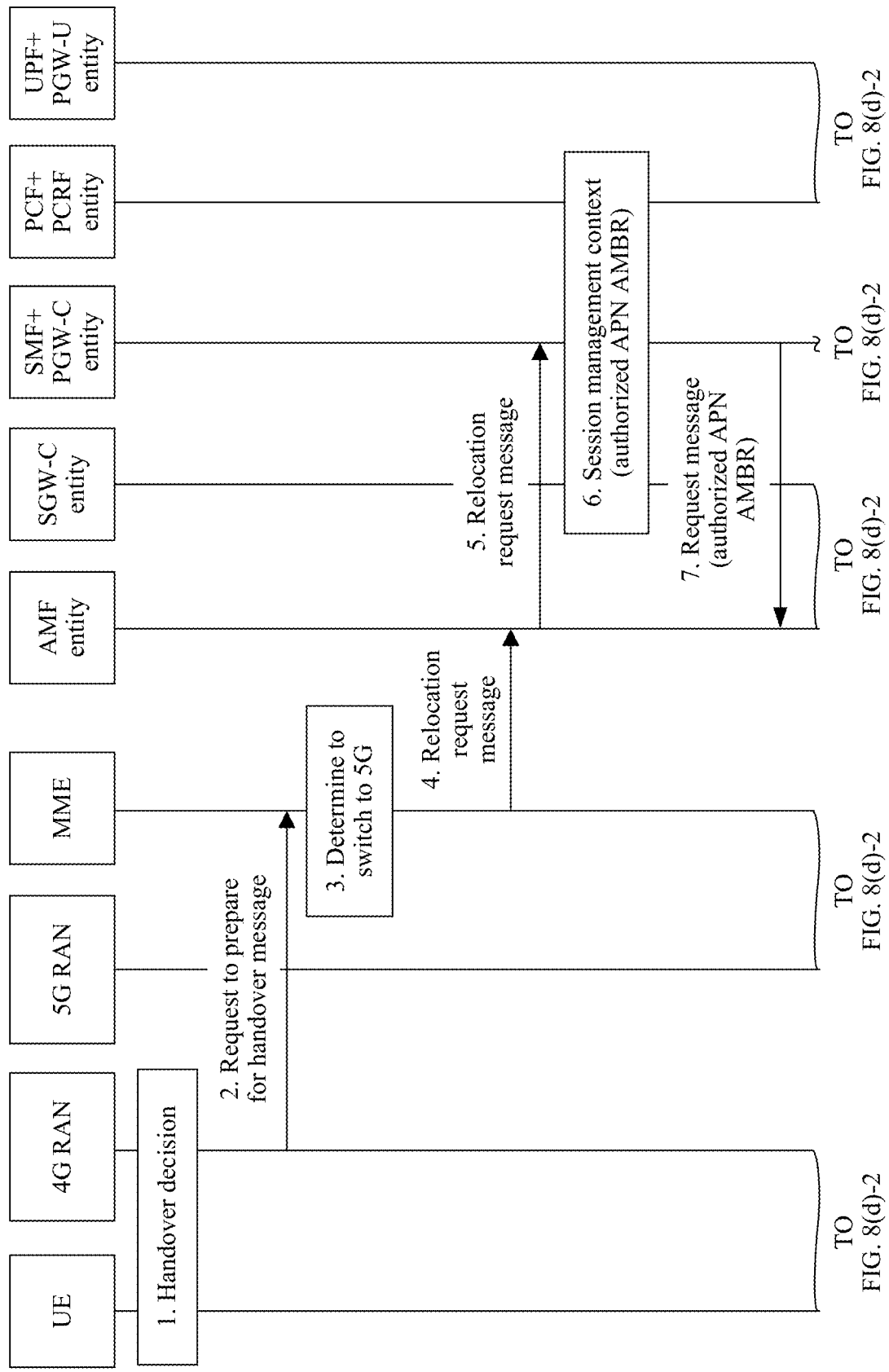

PARAMETER CONVERSIONS BETWEEN AN EVOLVED PACKET SYSTEM NETWORK AND A 5G NETWORK

CROSS-REFERENCE TO RELATED APPLICATIONS

This application is a continuation of International Application No. PCT/CN2018/085500, filed on May 3, 2018, which claims priority to Chinese Patent Application No. 201710314165.X, filed on May 5, 2017. The disclosures of the aforementioned applications are herein incorporated by reference in their entireties.

TECHNICAL FIELD

This application relates to the field of wireless communications technologies, and in particular, to a parameter determining method and a communications entity in a wireless communications system.

BACKGROUND

In an evolved packet system (EPS), a bearer-based QoS control mechanism is defined in a 3rd generation partnership project (3GPP) EPS, to control transmission of a large quantity of services with different quality of service (QoS) requirements on limited network resources. EPS bearers include a GBR (guaranteed bit rate) bearer and a non-GBR bearer. For each GBR bearer, bandwidth control is based on a maximum bit rate (MBR) parameter. For the non-GBR bearer, to limit bandwidth, aggregate maximum bit rates (AMBR) are provided, and the aggregate maximum bit rates include an access point name (APN) AMBR and a UE AMBR. In addition, for maximum bandwidth of all non-GBR bearers in one or more PDN connections of a same packet data network (PDN) of each user, in an uplink direction, user equipment (UE) controls an APN AMBR, and a PDN gateway (PGW) device performs check, and in a downlink direction, the PGW device controls the APN AMBR. For maximum bandwidth of all non-GBR bearers of one user, a mobility management entity (MME) device determines a UE AMBR and delivers the UE AMBR to a base station, and the base station controls the UE AMBR.

When being handed over between a 5GS network and an EPS network, the UE needs to switch between QoS parameters in the two system networks. This mainly relates to switching between an authorized UE AMBR in the EPS network and an authorized UE AMBR in the 5GS network and switching between an authorized APN AMBR in the EPS network and an authorized session AMBR in the 5GS network.

Aggregate session control is performed based on different granularities in the EPS network and the 5GS network. In the EPS network, a same APN AMBR is used for all sessions in a same PDN, and in the 5GS network, each packet data unit (PDU) session in a same data network (DN) is controlled by using an independent authorized session AMBR. Therefore, when the UE is handed over between the two system networks, a direct mapping cannot be performed. To be specific, when the UE is handed over from the EPS network to the 5GS network, the authorized UE AMBR and the authorized APN AMBR in the EPS network cannot be directly used as the authorized UE AMBR and the authorized session AMBR in the 5GS network respectively, and when the UE is handed over from the 5GS network to the EPS network, the authorized UE AMBR and the authorized session AMBR in the 5GS cannot be used as the authorized UE AMBR and the authorized APN AMBR in the EPS network respectively. Therefore, how to establish a mapping of aggregate QoS parameters between the two system networks is a problem to be resolved.

SUMMARY

This application provides a parameter determining method and a communications entity, to establish a QoS parameter mapping between an EPS network and a 5GS network.

According to a first aspect, this application provides a parameter determining method, including:

determining, by a first communications entity, an authorized APN AMBR based on at least one of a subscribed APN AMBR and an authorized session AMBR of a PDU session, where the authorized APN AMBR is used by a second communications entity to determine an authorized user equipment UE AMBR of UE based on the authorized APN AMBR, and the authorized APN AMBR and the authorized UE AMBR are QoS parameters in an EPS network when the UE is handed over from a 5GS network to the EPS network.

In this application, when the UE is located in a network that supports interworking between an EPS and a 5GS, the UE is currently located in the 5GS network, and used QoS parameters include an authorized UE AMBR and the authorized session AMBR of the session. Because of movement of the UE, the UE needs to be handed over to the EPS network, and QoS parameters that need to be used for the UE in the EPS network include the authorized UE AMBR and the authorized APN AMBR. The authorized APN AMBR is determined by the first communications entity based on at least one of the subscribed APN AMBR and the authorized session AMBR of the PDU session, and the authorized UE AMBR is determined by the second communications entity based on the authorized APN AMBR. Therefore, a method for regenerating a QoS parameter when the UE is handed over from the 5GS network to the EPS network is provided, so that a QoS parameter can be correctly used when the UE is handed over between the 5GS network and the EPS network, and further, the UE can correctly communicate.

In one embodiment, the first communications entity is an access and mobility management function (AMF) entity, an MME, a session management entity, a policy control entity, or UE, and the second communications entity is an AMF entity, an MME, or UE. The session management entity is an SMF entity and/or a PGW-C entity, and the policy control entity is a policy control function (PCF) entity and/or a PCRF entity.

In one embodiment, when the first communications entity is an AMF entity, an MME, a session management entity, or a policy control entity, the method further includes: sending, by the first communications entity, the authorized APN AMBR to the UE and/or a user plane entity. The user plane entity is a user plane function (UPF) entity and/or a PGW-U entity.

In one embodiment, the second communications entity sends the authorized UE AMBR of the UE to a 4G access network entity.

In one embodiment, the subscribed APN AMBR is obtained by the first communications entity from a UDM entity and/or an HSS entity.

In one embodiment, the determining, by a first communications entity, an authorized APN AMBR based on at least one of a subscribed APN AMBR and an authorized session AMBR of a PDU session includes: authorized APN AMBR=min(subscribed APN AMBR, sum(authorized session AMBR of the PDU session)), where sum( ) is a summation function, and min( ) is a function of calculating a minimum value.

In one embodiment, the determining, by a first communications entity, an authorized APN AMBR based on at least one of a subscribed APN AMBR and an authorized session AMBR of a PDU session includes: authorized APN AMBR=sum(authorized session AMBR of the PDU session), where sum( ) is a summation function.

In one embodiment, the first communications entity is a session management entity or a policy control entity, and the determining, by a first communications entity, an authorized APN AMBR based on at least one of a subscribed APN AMBR and an authorized session AMBR of a PDU session includes: determining, by the first communications entity, the authorized APN AMBR based on the subscribed APN AMBR and a policy. The policy may be determined based on a network status. For example, the policy may be as follows: When the network status is idle, the subscribed APN AMBR is increased as the authorized APN AMBR; or when the network status is congested, the subscribed APN AMBR is reduced as the authorized APN AMBR. Alternatively, the policy may be determined depending on whether the UE roams. When the UE is a roaming user equipment, the subscribed APN AMBR is reduced as the authorized APN AMBR; or when the UE is a non-roaming user, a value of the subscribed APN AMBR may be used as the authorized APN AMBR. Alternatively, the authorized APN AMBR may be determined based on time information. For example, to encourage a user to use a network at night, a value of a subscribed APN AMBR may be provided as the authorized APN AMBR. In addition, the policy may be determined based on a network status and depending on whether the UE roams.

According to a second aspect, an embodiment of this application provides a communications entity, where the communications entity may perform any parameter determining method provided in the first aspect.

In one embodiment, the communications entity has a function of implementing behavior of the first communications entity in any method in the first aspect. The function may be implemented by hardware, or may be implemented by hardware by executing corresponding software. The hardware or the software includes one or more modules corresponding to the foregoing function. The communications entity may be an AMF entity, an MME, a session management entity, a policy control entity, or UE.

In one embodiment, a structure of the communications entity includes a processor and a transceiver. The processor is configured to support the communications entity in performing corresponding functions in any method in the first aspect, for example, generating, receiving, or processing data and/or information in the method. The transceiver is configured to support communication between the communications entity and another entity, and send information or an instruction in any method in the first aspect to the another entity or receive information or an instruction in any method in the first aspect from the another entity. The communications entity may further include a memory. The memory is coupled to the processor and stores a program instruction and data that are necessary for the communications entity.

According to a third aspect, this application provides a parameter determining method, including:

determining, by a third communications entity, an authorized session AMBR of a session based on a subscribed session AMBR, or an authorized APN AMBR and a quantity of PDN connections, where the authorized session AMBR is used by a fourth communications entity to determine an authorized user equipment UE AMBR of UE based on at least the authorized session AMBR, and the authorized session AMBR and the authorized UE AMBR are QoS parameters in a 5GS network when the UE is handed over from an EPS network to the 5GS network.

In this application, when the UE is in a system in which the EPS network and the 5GS network interwork, the UE is currently located in the EPS network, and used QoS parameters include an authorized UE AMBR and the authorized APN AMBR. Because of movement of the UE, the UE needs to be handed over to the 5GS network, and QoS parameters that need to be used by the UE in the 5GS network include the authorized UE AMBR and the authorized session AMBR of the session. The authorized session AMBR is determined by the third communications entity based on the subscribed session AMBR, or the authorized APN AMBR and the quantity of PDN connections, and the authorized UE AMBR is determined by the fourth communications entity based on at least the authorized session AMBR. Therefore, a method for regenerating a QoS parameter when the UE is handed over from the EPS network to the 5GS network is provided.

In one embodiment, the third communications entity is an AMF entity, an MME, a 5G access network entity, a session management entity, a policy control entity, or UE. The policy control entity is a PCF entity and/or a PCRF entity. The session management entity is an SMF entity and/or a PGW-C entity.

In one embodiment, the fourth communications entity is an AMF entity, an MME, a 5G access network entity, or UE.

In one embodiment, when the third communications entity is an AMF entity, an MME, a 5G access network entity, a session management entity, or a policy control entity, the method further includes: sending, by the third communications entity, the authorized session AMBR to the UE and/or a user plane entity. The user plane entity is a UPF entity and/or a PGW-U entity.

In one embodiment, the fourth communications entity is an AMF entity, an MME, or UE, and the authorized UE AMBR is sent by the fourth communications entity to a 5G access network entity.

In one embodiment, when the third communications entity is a session management entity or a policy control entity, the determining, by a third communications entity, an authorized session AMBR of a session based on a subscribed session AMBR includes: determining, by the third communications entity, the authorized session AMBR based on the subscribed session AMBR and a policy.

In one embodiment, the authorized APN AMBR is equal to a sum of authorized session AMBRs of N sessions, where N is the quantity of PDN connections. All the authorized session AMBRs of the N sessions are equal; or all the authorized session AMBRs of the N sessions are not equal, and an authorized session AMBR of each of the N sessions is determined by the third communications entity based on an attribute of the session.

In one embodiment, the subscribed session AMBR is obtained by the third communications entity from a UDM entity and/or an HSS entity.

According to a fourth aspect, an embodiment of this application provides a communications entity, where the communications entity may perform any parameter determining method provided in the third aspect.

In one embodiment, the communications entity has a function of implementing behavior of the third communications entity in any method in the third aspect. The function may be implemented by hardware, or may be implemented by hardware by executing corresponding software. The hardware or the software includes one or more modules corresponding to the foregoing function. The communications entity is an AMF entity, an MME, a 5G access network entity, a session management entity, a policy control entity, or UE. The policy control entity is a PCF entity and/or a PCRF entity. The session management entity is an SMF entity and/or a PGW-C entity.

In one embodiment, a structure of the communications entity includes a processor and a transceiver. The processor is configured to support the communications entity in performing corresponding functions in any method in the third aspect, for example, generating, receiving, or processing data and/or information in the method. The transceiver is configured to support communication between the communications entity and another entity, and send information or an instruction in any method in the third aspect to the another entity or receive information or an instruction in any method in the third aspect from the another entity. The communications entity may further include a memory. The memory is coupled to the processor and stores a program instruction and data that are necessary for the communications entity.

According to a fifth aspect, an embodiment of this application provides a computer storage medium, configured to store a computer software instruction used by the communications entity provided in the second aspect. The computer storage medium includes a program designed for executing the first aspect.

According to a sixth aspect, an embodiment of this application provides a computer storage medium, configured to store a computer software instruction used by the communications entity provided in the fourth aspect. The computer storage medium includes a program designed for executing the third aspect.

According to a seventh aspect, this application further provides a computer program product including an instruction. When the computer program product runs on a computer, the computer performs the method in the first aspect. The computer program product includes a computer executable instruction, and the computer executable instruction is stored in a computer-readable storage medium. A processor of a communications entity may read the computer executable instruction from the computer-readable storage medium. The processor executes the computer executable instruction, so that the communications entity performs the operations performed by the communications entity in the foregoing method provided in the embodiments of this application, or a functional unit corresponding to the operations is deployed in the communications entity.

According to an eighth aspect, this application further provides a computer program product including an instruction. When the computer program product runs on a computer, the computer performs the method in the third aspect. The computer program product includes a computer executable instruction, and the computer executable instruction is stored in a computer-readable storage medium. A processor of a communications entity may read the computer executable instruction from the computer-readable storage medium. The processor executes the computer executable instruction, so that the communications entity performs the operations performed by the communications entity in the foregoing method provided in the embodiments of this application, or a functional unit corresponding to the operations is deployed in the communications entity.

According to a ninth aspect, this application further provides a chip system, and the chip system includes a processor, configured to support a communications entity in implementing functions in the foregoing aspects, for example, generating, receiving, or processing data and/or information in the foregoing methods. In one embodiment, the chip system further includes a memory. The memory is configured to store a program instruction and data that are necessary for a terminal device. The chip system may include a chip, or may include a chip and another discrete device.

BRIEF DESCRIPTION OF DRAWINGS

The following provides more detailed descriptions of the embodiments of this application with reference to the accompanying drawings.

FIG. 7($a$)-1 to FIG. 7($a$)-3 show Embodiment 1 of a parameter determining process according to this application;

FIG. 7($b$)-1 to FIG. 7($b$)-3 show Embodiment 2 of a parameter determining process according to this application;

FIG. 7($c$)-1 to FIG. 7($c$)-3 show Embodiment 3 of a parameter determining process according to this application;

FIG. 7($d$)-1 to FIG. 7($d$)-3 show Embodiment 4 of a parameter determining process according to this application;

FIG. 7($e$)-1 to FIG. 7($e$)-3 show Embodiment 5 of a parameter determining process according to this application;

FIG. 7($f$)-1 to FIG. 7($f$)-3 show Embodiment 6 of a parameter determining process according to this application;

FIG. 8($a$)-1 to FIG. 8($a$)-3 show Embodiment 7 of a parameter determining process according to this application;

FIG. 8($b$)-1 to FIG. 8($b$)-3 show Embodiment 7 of a parameter determining process according to this application;

FIG. 8($c$)-1 to FIG. 8($c$)-3 show Embodiment 8 of a parameter determining process according to this application;

FIG. 8($d$)-1 to FIG. 8($d$)-3 show Embodiment 9 of a parameter determining process according to this application;

FIG. 8($e$)-1 to FIG. 8($e$)-3 show Embodiment 10 of a parameter determining process according to this application;

FIG. 10($b$) is a schematic diagram of a terminal device according to this application;

DESCRIPTION OF EMBODIMENTS

The following clearly describes the technical solutions in the embodiments of this application with reference to the accompanying drawings in the embodiments of this application.

Network architectures and service scenarios described in the embodiments of this application are intended to describe the technical solutions in the embodiments of this application more clearly, and do not constitute a limitation on the technical solutions provided in the embodiments of this application. A person of ordinary skill in the art may learn that as the network architectures evolve and a new service scenario emerges, the technical solutions provided in the embodiments of this application are also applicable to a similar technical problem.

This application may be applied to existing cellular communications systems such as a global system for mobile communications (GSM), a wideband code division multiple access (WCDMA) system, and a long term evolution (LTE) system, and is applicable to a 5th generation (5G) mobile communications system, for example, a communications system such as a new radio (NR) access network or a cloud radio access network (CRAN). This application may also be extended to similar wireless communications systems such as other cellular systems related to wireless fidelity (wife), worldwide interoperability for microwave access (WiMAX), and 3rd generation partnership project (3GPP), is also applicable to another wireless communications system using an orthogonal frequency division multiplexing (OFDM) access technology, and is further applicable to a future wireless communications system.

Network architectures and service scenarios described in this application are intended to describe the technical solutions in this application more clearly, and do not constitute a limitation on the technical solutions provided in this application. A person of ordinary skill in the art may learn that as the network architectures evolve and a new service scenario emerges, the technical solutions provided in this application are also applicable to a similar technical problem.

Figure 1:
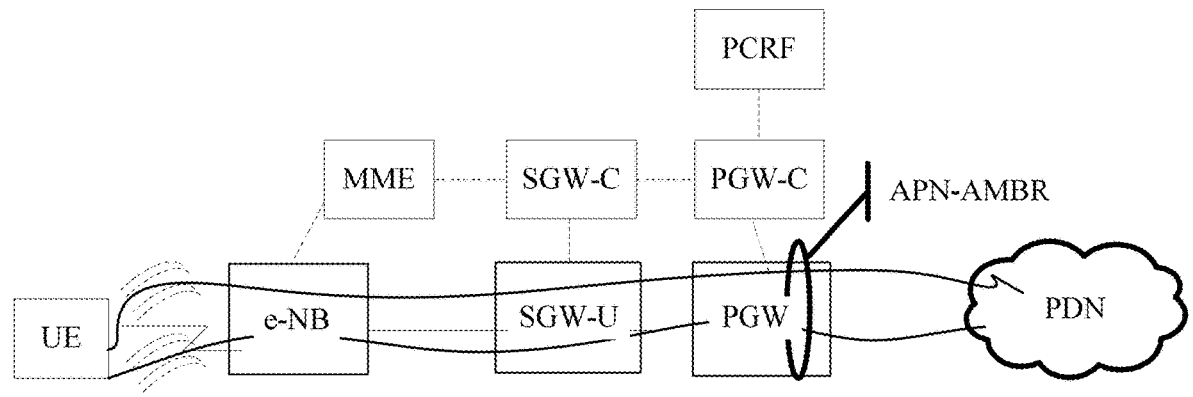
FIG. 1 is an architectural diagram in which a control plane and a user plane are separated in an EPS system according to this application.

FIG. 1 is an architectural diagram in which a control plane and a user plane are separated in an EPS system. One or more PDN connections may be established between UE and a PDN, and all connections in one PDN are controlled based on a same authorized APN AMBR. For example, there are two PDN connections in one PDN in FIG. 1. Assuming that a value of an authorized APN AMBR is 100, if an AMBR value of one PDN is 20, a maximum AMBR value of the other PDN connection is 80; or if an AMBR value of one PDN connection is 40, a maximum AMBR value of the other PDN connection is 60; or the like.

In a 5G architecture, QoS control based on a QoS flow is provided to implement QoS control over a service, where the QoS flow is a group of aggregate packet data flows for which same QoS processing is used. A GBR QoS flow and a non-GBR QoS flow are supported in the 5G architecture. For the GBR QoS flow, QoS parameters include a GFBR and an MFBR, and maximum bandwidth is controlled based on the MFBR, and for the non-GBR QoS flow, AMBRs are provided, where the AMBRs include a session AMBR based on a PDU session (which may be referred to as a session AMBR) and a UE AMBR based on UE (which is referred to as a UE AMBR). In terms of the session AMBR, for maximum bandwidth of all non-GBR QoS flows of a specific PDU session, in an uplink direction, UE performs session AMBR control, and a UPF entity performs check, and in a downlink direction, the UPF entity performs session AMBR control. In terms of the UE AMBR, for maximum bandwidth of all non-GBR QoS flows of UE, an access network node (for example, a base station) performs UE AMBR control.

Figure 2:
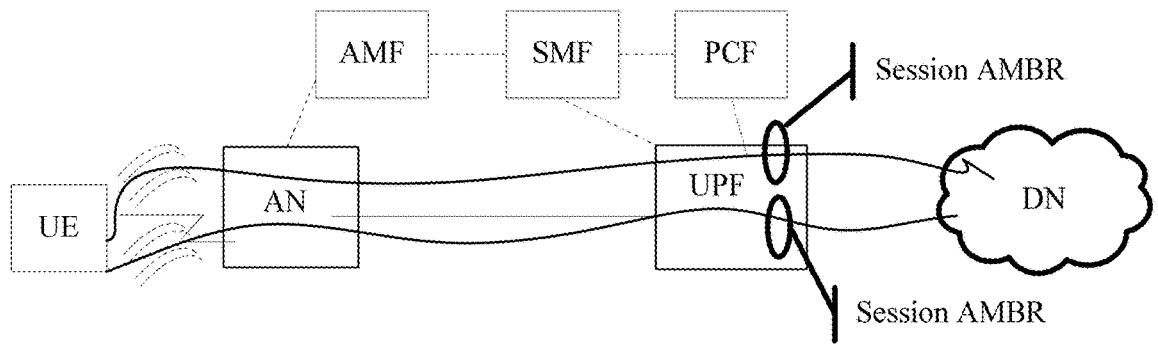
FIG. 2 is a diagram of a 5G architecture defined in 3GPP according to this application.

FIG. 2 shows a 5G architecture defined in 3GPP. When a plurality of PDU session connections are established between UE and a same DN, one authorized session AMBR is used for control for each session. For example, in FIG. 2, there are two PDU session connections in one DN. For example, an AMBR value of one of the two PDU session connections is 20, and an AMBR value of the other PDU session connection may be 30, 40, or the like. In other words, AMBRs of different PDU sessions are controlled by using different authorized session AMBRs, and do not affect each other.

Figure 3:
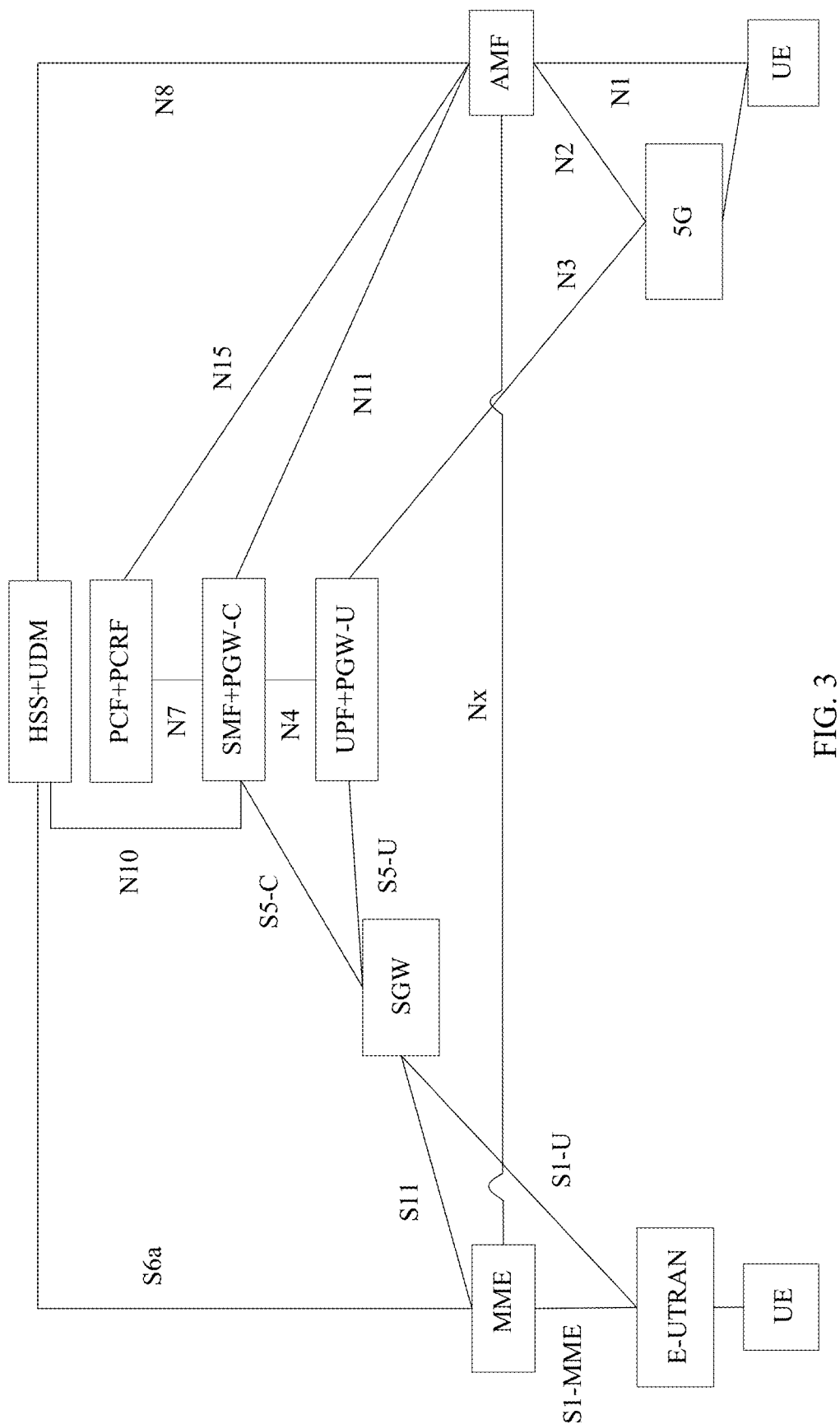
FIG. 3 is an architectural diagram of interworking between a 5GS system and an EPS system according to this application.

In a 5GS architecture, to support interworking between a 5GS system and an EPS system, an interworking architecture shown in FIG. 3 is defined, and an Nx interface is introduced for communication between an MME device in the EPS system and an AMF device in the 5G system. Serving gateways (SGW) may include a control plane SGW-C and a user plane SGW-U. There is an interface between the SGW-C and each of a PGW-C and the SGW-U, and there is an interface between the SGW-U and a PGW-U. When moving in a network in which interworking is supported, UE transmits a handover request through the Nx interface between the MME device and the AMF device.

Figure 4:
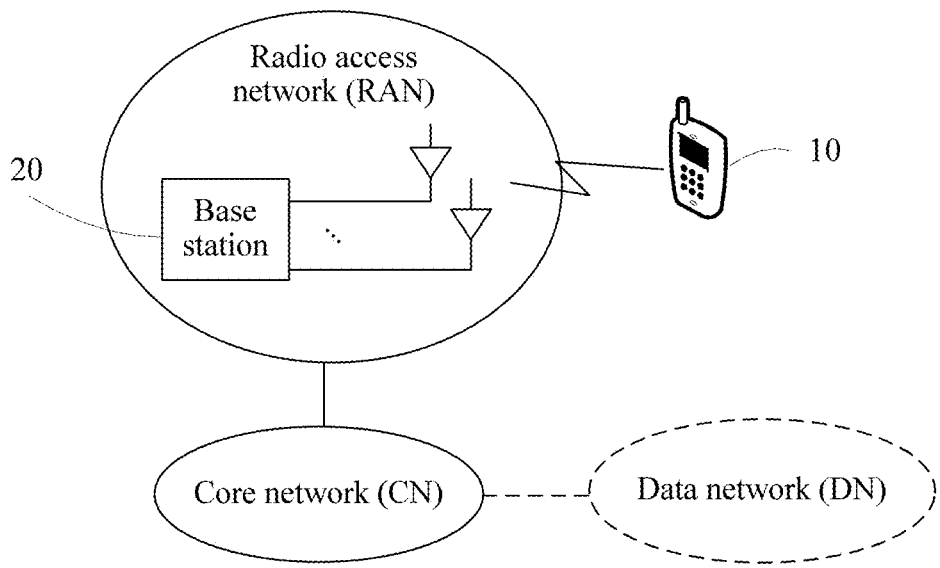
FIG. 4 is a schematic diagram of an application scenario according to this application.

FIG. 4 is a schematic diagram of a possible application scenario according to this application. At least one terminal device 10 is included, and communicates with a radio access network (RAN) over a wireless interface. The RAN includes at least one base station 20. For clarity, only one base station and one terminal device are shown in the figure. The terminal device 10 may further communicate with another terminal device 10, for example, communication in a device-to-device (D2D) or machine-to-machine (M2M) scenario. The base station 20 may communicate with the terminal device 10, and may also communicate with another base station 20, for example, communication between a macro base station and an access point. The RAN is connected to a core network (CN). The CN may be coupled to one or more data networks (DN) such as the Internet and a public switched telephone network (PSTN).

In this application, nouns "network" and "system" are usually interchangeably used, but meanings of the nouns may be understood by a person skilled in the art.

For ease of understanding, some nouns in this application are described below.

(1) A terminal device, also referred to as user equipment (UE) or a terminal, is a device that provides a user with voice and/or data connectivity, for example, a handheld device, an in-vehicle device, a wearable device, a computing device, or a control device having a wireless connection function or a wireless communication function, or another processing device connected to a wireless modem, and mobile stations (MS) in various forms. Common terminal devices include a mobile phone, a tablet computer (pad), a notebook computer, a palmtop computer, a mobile Internet device (MID), and a wearable device such as a smartwatch, a smart band, or a pedometer. For ease of description, in this application, the devices mentioned above are collectively referred to as a terminal device.

(2) An access network entity, including a 5G access network entity and a 4G access network entity, is a device that connects a terminal device to a wireless network, and includes but is not limited to an evolved NodeB (eNB), a radio network controller (RNC), a NodeB (NB), a base station controller (BSC), a base transceiver station (BTS), a home base station (for example, a home evolved NodeB or a home NodeB, HNB for short), a baseband unit (BBU), a gNodeB (gNB), a transmission and reception point (TRP), a transmission point (TP), a mobile switching center, and the like. In addition, the access network entity may further include a WiFi access point (AP) and the like, and may further include various forms of macro base stations, micro base stations, relay stations, access points, remote radio units (RRU), and the like. A device having a base station function may have different names in different systems. For example, in an LTE network, the device is referred to as an evolved NodeB (eNB or eNodeB); and in a 3rd generation (3G) network, the device is referred to as a NodeB.

(3) An MME is a key control node in a 3GPP long term evolution (LTE) access network. The MME is responsible for positioning and a paging process of UE in an idle mode, including relaying. Simply, the MME is responsible for a control plane signaling processing part. The control plane signaling processing part relates to a bearer activate/modify/delete process, and when UE is initialized and is connected to the MME, an SGW entity is selected for the UE.

(4) An AMF entity is responsible for access and mobility management, is a termination point of an NG2 interface, terminates a non-access stratum (NAS) message, completes registration management, connection management, reachability management, mobility management, and the like, and transparently routes a session management message to a session management function (SMF) entity.

(5) An SGW entity is an important network element in an evolved packet core (EPC). A function of the SGW entity is equivalent to that of a user plane of a serving GPRS support node (ESGSN) network element in an original 3G core network. In addition, SGW entities may include a control plane SGW-C entity and a user plane SGW-U entity. There is an interface between the SGW-C entity and each of a PGW-C entity and the SGW-U entity, and there is an interface between the SGW-U entity and a PGW-U entity.

(6) A PGW entity is introduced in an EPC system, and has a function similar to that of a gateway GPRS support node (GGSN) network element. The PGW entity is a border gateway in an EPC network, and provides functions such as user session management and bearer control, data forwarding, IP address allocation, and non-3GPP user access. The PGW entity is an anchor in a 3GPP access and non-3GPP access public data network PDN, and PGW entities may include a control plane PGW-C entity and a user plane PGW-U entity.

(7) An SMF entity is responsible for session management, UE IP address allocation and management, anchor function allocation and selection, UPF and user plane path selection (reselection), and the like.

(8) A main function of a PCF entity is a policy decision point, provides detection that is based on a service data flow and an application, gating, and rules for QoS control, flow-based charging control, and the like, and is a policy control function entity in a 5G system.

(9) A policy and charging rules function (PCRF) entity is a policy and charging control policy decision point of a service data flow and an IP bearer resource. The policy and charging rules function entity selects and provides an available policy and charging control decision for a policy and charging execution function entity, and the PCRF entity is a policy and charging control functional unit in 4G.

(10) A user plane function (UPF) entity is used for user plane functions such as data packet routing and transmis-sion, user plane QoS processing, uplink service verification, packet identification at a transport layer, downlink data packet buffering, downlink data packet indication, and legal interception.

(11). A unified data management (UDM) entity is responsible for credential processing, location management, and subscription management. The unified data management entity provides access to a user data storage unit, and supports access authentication, registration, mobility management, and the like.

(12) A home subscriber server (HSS) entity is a server, in the EPS, that is used to store user subscription information, and is mainly responsible for managing user subscription data and location information of a mobile user.

FIG. 3 is an architectural diagram of interworking between an EPS and a 5GS. In an EPS network, UE accesses a core network element MME by using an access network E-UTRAN. An interface between the E-UTRAN and the MME is an S1-MME interface. In a 5GS network, the UE accesses a core network element AMF entity by using a 5G access network, and a core network of the EPS network is the same as that of the 5GS network. Functions of a PCF entity and a PCRF entity are combined, and the PCF entity and the PCRF entity may be collectively referred to as a policy control entity. A UPF entity and a PGW-U entity are combined, and are referred to as a user plane entity. An SMF entity and a PGW-C entity are combined, and are referred to as a session management entity. A home subscriber server (HSS) entity and a UDM entity are combined, and are referred to as a data management entity (or referred to as an HSS/UDM entity). SGW entities may include an SGW-C entity and an SGW-U entity.

The following explains some common concepts or definitions in the embodiments of this application. It should be noted that some English abbreviations in an LTE system are used as examples in this specification for describing the embodiments of this application. This may vary with evolution of a network. For specific evolution, refer to descriptions in corresponding standards.

In this application, a 4G network may also be referred to as an EPS network, an access network of the 4G network is referred to as an E-UTRAN, and a core network of the 4G network is referred to as an EPC network. A 5G network may also be referred to as a new radio (NR) network, and a 5G system is 5GS for short. A plurality of nouns of a same meaning in this application are used alternately.

Generally, "data" in this application is service data, but may also include content such as signaling or a message that needs to be transmitted in a system, for example, a reference signal or an uplink/downlink control message.

The term "and/or" in this application describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

With reference to the accompanying drawings, the following provides more detailed descriptions of the solutions provided in the embodiments of this application.

Figure 5:
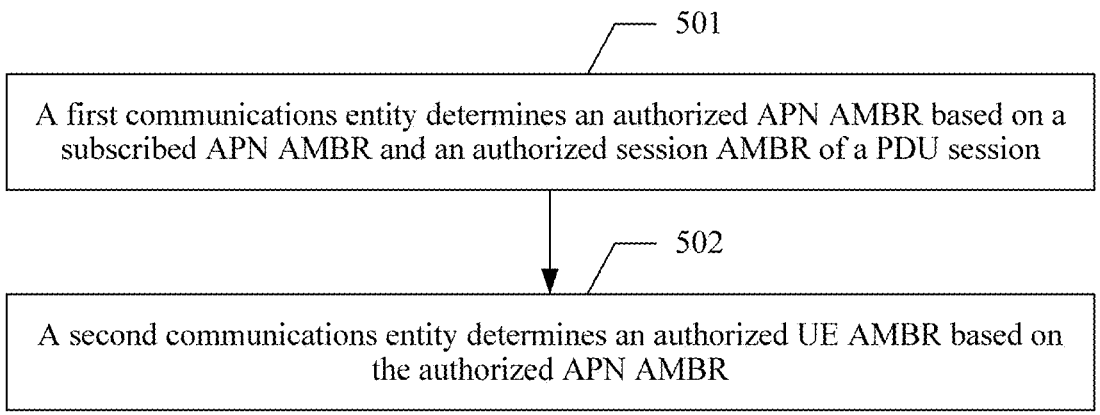
FIG. 5 is a flowchart of a parameter determining method according to this application.

FIG. 5 is a flowchart of a parameter determining method according to this application. The method is applied to a scenario in which UE is handed over from a 5GS network to an EPS network, and includes the following operations:

Operation 501: A first communications entity determines an authorized APN AMBR based on at least one of a subscribed APN AMBR and an authorized session AMBR of a PDU session.

Operation 502: A second communications entity determines an authorized UE AMBR based on the authorized APN AMBR.

The authorized APN AMBR and the authorized UE AMBR are QoS parameters in the EPS network when the UE is handed over from the 5GS network to the EPS network.

In this application, when the UE is located in the EPS network and the 5GS network that interwork, the UE is currently located in the 5GS network, and used QoS parameters include an authorized UE AMBR and the authorized session AMBR of the session. Because of movement of the UE, the UE needs to be handed over to the EPS network, and QoS parameters that need to be used for the UE in the EPS network include the authorized UE AMBR and the authorized APN AMBR. The authorized APN AMBR is determined by the first communications entity based on at least one of the subscribed APN AMBR and the authorized session AMBR of the PDU session, and the authorized UE AMBR is determined by the second communications entity based on the authorized APN AMBR. Therefore, a method for regenerating a QoS parameter when the UE is handed over from the 5GS network to the EPS network is provided, so that a QoS parameter can be correctly used when the UE is handed over between the 5GS network and the EPS network, and further, the UE can correctly communicate.

In one embodiment, the first communications entity is an AMF entity, an MME, a session management entity, a policy control entity, or UE, and the second communications entity is an AMF entity, an MME, or UE. The session management entity is an SMF entity and/or a PGW-C entity, and the policy control entity is a PCF entity and/or a PCRF entity.

In one embodiment, when the first communications entity is an AMF entity, an MME, a session management entity, or a policy control entity, the method further includes: sending, by the first communications entity, the authorized APN AMBR to the UE and/or a user plane entity. The user plane entity is a UPF entity and/or a PGW-U entity.

In one embodiment, the second communications entity further sends the authorized UE AMBR of the UE to a 4G access network entity.

In one embodiment, the subscribed APN AMBR is obtained by the first communications entity from a UDM entity and/or an HSS entity.

In operation 501, that a first communications entity determines an authorized APN AMBR based on a subscribed APN AMBR and an authorized session AMBR of a PDU session specifically includes: authorized APN AMBR=min (subscribed APN AMBR, sum(authorized session AMBR of the PDU session)), where sum( ) is a summation function, and min( ) is a function of calculating a minimum value. That is, the authorized APN AMBR is a minimum value in the subscribed APN AMBR and a sum of authorized session AMBRs of all PDU sessions. Certainly, the authorized APN AMBR is either of the subscribed APN AMBR and the sum of the authorized session AMBRs of all the PDU sessions if the subscribed APN AMBR and the sum of the authorized session AMBRs of all the PDU sessions are the same. For example, the UE is currently located in the 5GS network, there are five PDU sessions in one DN, authorized session AMBRs corresponding to the five PDU sessions are 10, 15, 16, 14, and 15, and the subscribed APN AMBR of the UE is 75. In this case, after the UE is handed over to the EPS network, an authorized APN AMBR used in a PDN corresponding to the DN is min(75, 10+15+16+14+15)=min(75, 70)=70. Further, the PDU session is a PDU session in an activated state.

In operation 501, that a first communications entity determines an authorized APN AMBR based on an authorized session AMBR of a PDU session specifically includes: authorized APN AMBR=sum(authorized session AMBR of the PDU session), where sum( ) is a summation function. In other words, the authorized APN AMBR is a sum of authorized session AMBRs of all PDU sessions. For example, the UE is currently located in the 5GS network, there are five PDU sessions in one DN, authorized session AMBRs corresponding to the five PDU sessions are 10, 15, 16, 14, and 15. In this case, after the UE is handed over to the EPS network, an authorized APN AMBR used in a PDN corresponding to the DN is 10+15+16+14+15=70.

In operation 501, the first communications entity is a session management entity or a policy control entity, and that a first communications entity determines an authorized APN AMBR based on at least one of a subscribed APN AMBR and an authorized session AMBR of a PDU session includes: determining, by the first communications entity, the authorized APN AMBR based on the subscribed APN AMBR and a policy. The policy may be determined based on a network status. For example, the policy may be as follows: When the network status is idle, the subscribed APN AMBR is increased as the authorized APN AMBR; or when the network status is congested, the subscribed APN AMBR is reduced as the authorized APN AMBR. Alternatively, the policy may be determined depending on whether the UE roams. When the UE is a roaming user, the subscribed APN AMBR is reduced as the authorized APN AMBR; or when the UE is a non-roaming user, a value of the subscribed APN AMBR may be used as the authorized APN AMBR. Alternatively, the authorized APN AMBR may be determined based on time information. For example, to encourage a user to use a network at night, a value of the subscribed APN AMBR may be provided as the authorized APN AMBR. In addition, the policy may be determined based on a network status and depending on whether the UE roams. For example, assuming that the subscribed APN AMBR of the UE is 65, the authorized APN AMBR finally obtained by the first communications entity based on the policy may be, for example, 68, 65, or 72.

In operation 502, for example, a specific method for determining, by the second communications entity, the authorized UE AMBR based on the authorized APN AMBR may be as follows: authorized UE AMBR=min{sum(authorized APN AMBRs in all DNs), subscribed UE AMBR}, that is, the authorized UE AMBR of the UE is a smaller value in the subscribed UE AMBR and a sum of the authorized APN AMBRs in all the DNs, where the function min(a, b) represents calculating a smaller value in a and b, sum( ) is a summation function, the subscribed UE AMBR is a subscribed UE AMBR used by the UE in the EPS network, and the subscribed UE AMBR may be obtained by the second communications entity from the UDM/HSS entity.

Figure 6:
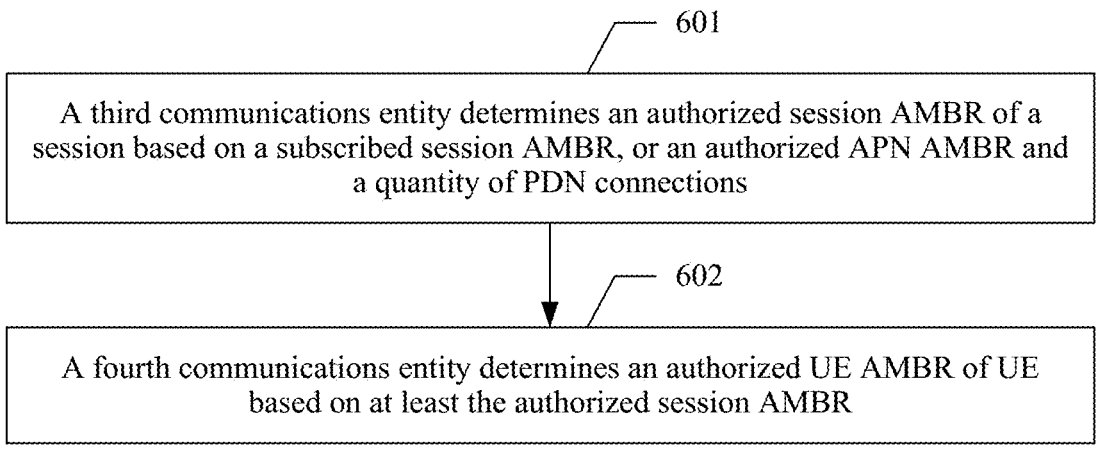
FIG. 6 is a flowchart of a parameter determining method according to this application.

FIG. 6 is a flowchart of a parameter determining method according to this application. The method includes the following operations:

Operation 601: A third communications entity determines an authorized session AMBR of a session based on a subscribed session AMBR, or an authorized APN AMBR and a quantity of PDN connections.

Operation 602: A fourth communications entity determines an authorized UE AMBR of UE based on at least the authorized session AMBR.

The authorized session AMBR and the authorized UE AMBR are QoS parameters in a 5GS network when the UE is handed over from an EPS network to the 5GS network.

In this application, when the UE is located in the EPS network and the 5GS network that interwork, the UE is currently located in the EPS network, and used QoS parameters include an authorized UE AMBR and the authorized APN AMBR. Because of movement of the UE, the UE needs to be handed over to the 5GS network, and QoS parameters that need to be used by the UE in the 5GS network include the authorized UE AMBR and the authorized session AMBR of the session. The authorized session AMBR is determined by the third communications entity based on the subscribed session AMBR, or the authorized APN AMBR and the quantity of PDN connections, and the authorized UE AMBR is determined by the fourth communications entity based on at least the authorized session AMBR. Therefore, a method for regenerating a QoS parameter when the UE is handed over from the EPS network to the 5GS network is provided.

In one embodiment, the third communications entity is an AMF entity, an MME, a 5G access network entity, a session management entity, a policy control entity, or UE. The policy control entity is a PCF entity and/or a PCRF entity. The session management entity is an SMF entity and/or a PGW-C entity. The fourth communications entity is an AMF entity, an MME, a 5G access network entity, or UE.

In one embodiment, when the third communications entity is an AMF entity, an MME, a 5G access network entity, a session management entity, or a policy control entity, the method further includes: sending, by the third communications entity, the authorized session AMBR to the UE and/or a user plane entity. Optionally, the user plane entity is a UPF entity and/or a PGW-U entity.

In one embodiment, when the fourth communications entity is an AMF entity, an MME, or UE, the authorized UE AMBR is sent by the fourth communications entity to a 5G access network entity.

In operation 601, when the third communications entity is a session management entity or a policy control entity, that a third communications entity determines an authorized session AMBR of a session based on a subscribed session AMBR includes: determining, by the third communications entity, the authorized session AMBR based on the subscribed session AMBR and a policy. To be specific, when the UE is located in the EPS network, the UE authorizes the subscribed session AMBR based on the subscribed session AMBR in the 5GS and the policy in the 5GS, to obtain the authorized session AMBR used in the 5GS. For example, the policy may be as follows: When a network status is idle, the subscribed session AMBR is increased as the authorized session AMBR; or when a network status is congested, a subscribed APN AMBR is reduced as the authorized APN AMBR. Alternatively, the policy may be determined depending on whether the UE roams. When the UE is a roaming user, a subscribed APN AMBR is reduced as the authorized APN AMBR; or when the UE is a non-roaming user, a value of a subscribed APN AMBR may be used as the authorized APN AMBR. Alternatively, the authorized APN AMBR may be determined based on time information. For example, to encourage a user to use a network at night, a value of a subscribed APN AMBR may be provided as the authorized APN AMBR. In addition, the policy may be determined based on a network status and depending on whether the UE roams. For example, assuming that the subscribed session AMBR of the UE is 40, the third communications entity finally obtains three authorized session AMBRs based on the policy, where the three authorized session AMBRs are, for example, 42, 45, and 53.

In one embodiment, the subscribed session AMBR is obtained by the third communications entity from a UDM entity and/or an HSS entity.

In operation 601, that a third communications entity determines an authorized session AMBR of a session based on an authorized APN AMBR and a quantity of PDN connections may be specifically that the authorized APN AMBR is equal to a sum of authorized session AMBRs of N sessions, where N is the quantity of PDN connections. For example, assuming that an authorized APN AMBR of a PDN in the EPS network is 100, and four PDN connections are included (that is, N=4), after the UE is handed over to the 5GS, correspondingly, there are four PDU sessions in a DN corresponding to the PDN, and each PDU session corresponds to one authorized session AMBR. In this case, the authorized session AMBR may be determined in at least the following two methods:

Method 1: All the authorized session AMBRs of the N sessions are equal.

To be specific, authorized session AMBRs of the four PDU sessions are all 25.

Method 2: All the authorized session AMBRs of the N sessions are not equal, and an authorized session AMBR of each of the N sessions is determined by the third communications entity based on an attribute of the session.

To be specific, all authorized session AMBRs of the four PDU sessions are not equal, and a specific value of an authorized session AMBR of each PDU session may be determined based on an attribute of the PDU session. For example, four obtained authorized session AMBRs are 20, 26, 24, and 30.

In operation 602, a specific method for determining, by the fourth communications entity, the authorized UE AMBR based on the authorized session AMBR may be, for example, determining the authorized UE AMBR based on the subscribed UE AMBR and received authorized session AMBRs of all sessions. In one embodiment, authorized UE AMBR=min(sum(authorized session AMBRs of all the sessions), subscribed UE AMBR), that is, the authorized UE AMBR of the UE is a smaller value in the subscribed UE AMBR and a sum of the authorized session AMBRs of all the sessions, where the function min(a, b) represents calculating a smaller value in a and b, sum( ) is a summation function, the subscribed UE AMBR is a subscribed UE AMBR used by the UE in the 5GS network, and the subscribed UE AMBR may be obtained by the fourth communications entity from the UDM/HSS entity.

With reference to specific embodiments, the following provides some detailed implementation processes of determining a parameter in this application.

Embodiment 1

Figures 1, 7A:
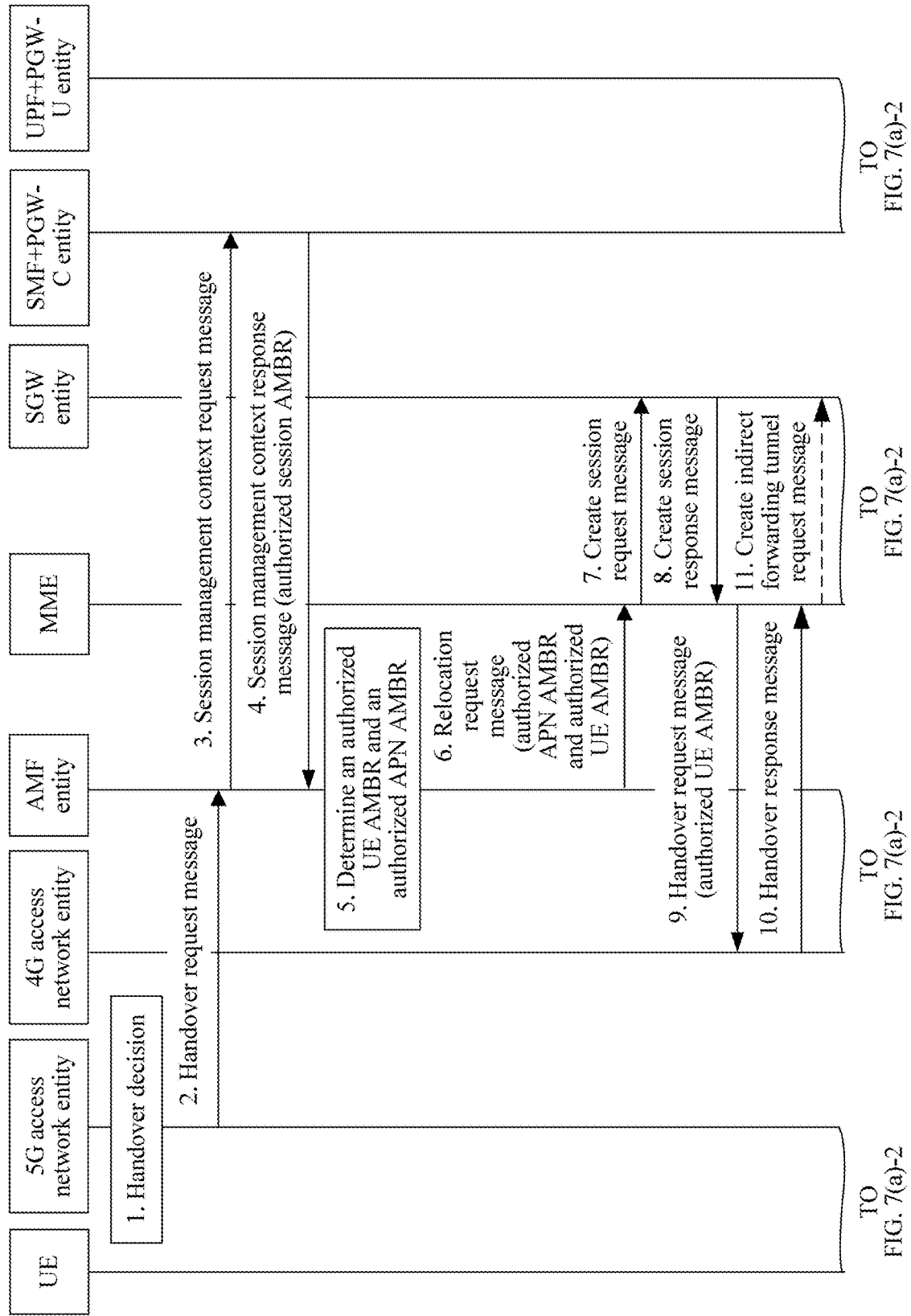
Figures 2, 7A:
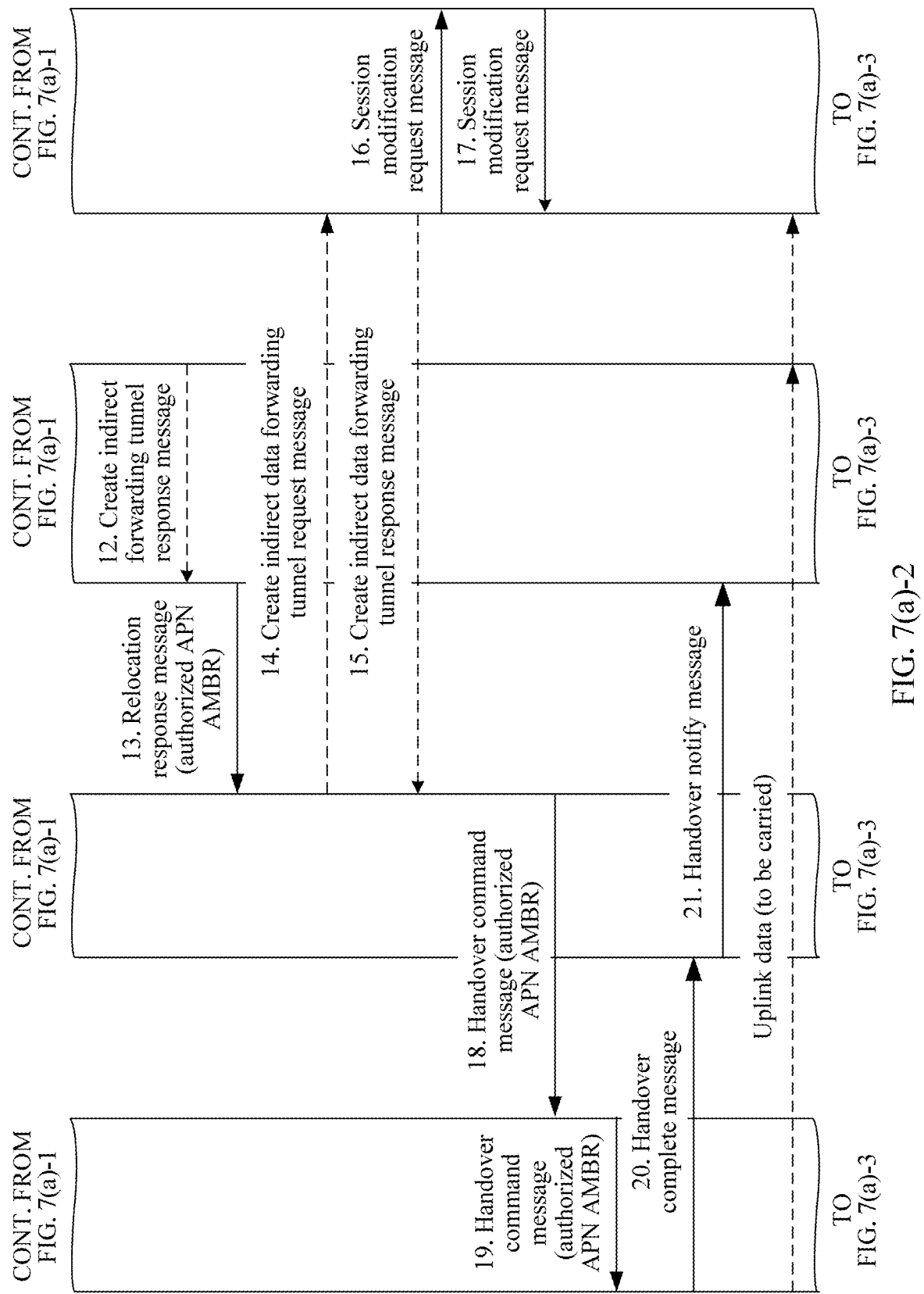

FIG. 7(a)-1 to FIG. 7(a)-3 are a schematic flowchart of a parameter determining method according to this application. The method is applied to a scenario in which UE is handed over from a 5GS network to an EPS network. To be specific, the UE accesses the network by using a 5G access network entity, to obtain a service. Because of movement of the UE, the 5G access network entity determines that a handover procedure needs to be initiated.

In this embodiment, a first communications entity is an AMF entity, and a second communications entity is an AMF entity. To be specific, the AMF entity determines an authorized UE AMBR of the UE and an authorized APN AMBR in each DN.

A specific procedure is described as follows:

Operation 1: The 5G access network entity determines that the UE needs to be handed over to a 4G access network entity.

Because of movement of the UE, the UE has moved to a 4G network. For example, the UE has moved to a base station in the 4G network. In this case, the 5G access network entity detects that a signal of the UE is relatively weak, and therefore makes a handover decision, and starts to prepare for the handover.

Operation 2: The 5G access network entity sends a handover request message to the AMF entity.

The handover request message includes a target eNB ID. The target eNB ID may be an ID of a base station that is in the 4G network and detected by the UE and whose signal is strongest, or may be an ID of a base station that is obtained from the 4G access network entity through message exchange between the 5G access network entity and the 4G access network entity. A manner of obtaining the target eNB ID is not limited in this application.

Operation 3: The AMF entity sends a session management context request (SM context request) message to an SMF+PGW-C entity.

The AMF entity determines, based on the target eNB ID, that the handover to the 4G access network entity is needed, and therefore sends the session management context request to the SMF+PGW-C entity.

Operation 4: The SMF+PGW-C entity sends a session management context response (SM context response) message to the AMF entity.

The session management context response message includes one or more authorized session AMBRs.

It should be noted that in this application, in a 5G network, the UE may establish a connection to a plurality of DNs, and establish one or more PDU sessions with each DN, where each PDU session has one authorized session AMBR. One or more PDU sessions in a same DN are controlled by one SMF+PGW-C entity. PDU sessions in different DNs may be controlled by different SMF entities. Therefore, when there are a plurality of SMF entities, the AMF entity needs to initiate operation 3 and operation 4 to each SMF entity, to obtain an authorized session AMBR in each DN by using each SMF entity.

Operation 5: The AMF entity determines an authorized UE AMBR and an authorized APN AMBR.

Specifically, the AMF entity determines an authorized APN AMBR in each DN based on a subscribed APN AMBR and an authorized session AMBR in the DN. In one embodiment, authorized APN AMBR=min{sum(authorized session AMBRs in one DN), subscribed APN AMBR}, that is, an authorized APN AMBR in one DN is a smaller value in the subscribed APN AMBR and a sum of authorized session AMBRs in the DN.

In one embodiment, authorized APN AMBR=sum(authorized session AMBR of a PDU session), where sum( ) is a summation function.

For a method for calculating the authorized UE AMBR, in one embodiment, authorized UE AMBR=min{sum(authorized APN AMBRs in all DNs), subscribed UE AMBR}, that is, the authorized UE AMBR of the UE is a smaller value in the subscribed UE AMBR and a sum of the authorized APN AMBRs in all the DNs. The authorized UE AMBR is either of the subscribed UE AMBR and the sum of the authorized APN AMBRs in all the DNs if the subscribed UE AMBR and the sum of the authorized APN AMBRs in all the DNs are equal.

The function min(a, b) represents calculating a smaller value in a and b, and sum( ) is a summation function.

Operation 6: The AMF entity sends a relocation request message to an MME.

The relocation request message includes the authorized APN AMBR and the authorized UE AMBR.

Operation 7: The MME sends a create session request message to an SGW entity.

The create session request message is used to request to establish a PDN connection.

Operation 8: The SGW entity allocates a local resource, and sends a create session response message to the MME.

Operation 9: The MME sends a handover request message to the 4G access network entity.

The handover request message includes the authorized UE AMBR.

Operation 10: The 4G access network entity allocates a requested resource, and sends a handover response message to the MME.

Operation 11: The MME sends a create indirect forwarding tunnel request (create indirect data forwarding tunnel request) message to the SGW.

The request includes target EPS RAN tunnel identification information.

Operation 12: The SGW entity sends a create indirect forwarding tunnel response (create indirect data forwarding tunnel response) message to the MME.

The response message includes SGW tunnel identification information.

Operation 11 and operation 12 are optional operations. Operation 11 and operation 12 are performed only when the MME determines to apply indirect forwarding.

Operation 13: The MME sends a relocation response message to the AMF entity.

In one embodiment, the message includes the authorized APN AMBR.

Operation 14: The AMF entity sends a create indirect data forwarding tunnel request (create indirect data forwarding tunnel request) message to the SMF+PGW-C entity.

Operation 15: The SMF+PGW-C entity returns a create indirect data forwarding tunnel response message to the AMF entity.

Operation 14 and operation 15 are optional operations.

Operation 16: The SMF+PGW-C entity initiates a session modification request (modification request) message to a UPF+PGW-U entity.

Operation 17: The UPF+PGW-U entity initiates a session modification response (modification response) message to the SMF+PGW-C entity.

Operation 18: The AMF entity sends a handover command message to the 5G access network entity.

The handover command message includes the authorized APN AMBR.

In one embodiment, the authorized APN AMBR included in the handover command message is an uplink authorized APN AMBR.

Operation 19: The 5G access network entity sends a handover command (handover command) message to the UE.

The handover command message includes the authorized APN AMBR.

Operation 20: The UE returns a handover complete message to the 4G access network entity.

Operation 21: The 4G access network entity sends a handover notify message to the MME.

Operation 22: The MME sends a modify bearer request message to the SGW entity.

In one embodiment, the request message includes authorized APN AMBRs.

The authorized APN AMBRs included in the request message include the uplink APN AMBR and a downlink APN AMBR.

Operation 23: The SGW entity sends a modify bearer request message to the SMF+PGW-C entity.

In one embodiment, the request message includes the authorized APN AMBRs.

Operation 24: The SMF+PGW-C entity sends a session modification request (Session modification request) message to the UPF+PGW-U entity.

The request message includes the authorized APN AMBRs.

In one embodiment, for the session modification request message, reference may be made to an Sx session modification request in 4G.

Operation 25: The UPF entity sends a session modification response message to the SMF+PGW-C entity.

In one embodiment, for the session modification response message, reference may be made to an Sx session modification response in 4G.

Operation 26: The SMF+PGW-C entity sends a modify bearer response message to the SGW entity.

Operation 27: The SGW entity sends a modify bearer response message to the MME.

Operation 28: A PGW entity initiates a dedicated bearer activation (initiated dedicated bearer activation) procedure.

Through operation 1 to operation 28, the AMF entity determines the authorized UE AMBR of the UE, and sends the determined authorized UE AMBR of the UE to the 4G access network entity, so that the 4G access network entity controls the UE AMBR, and specifically, a base station in the 4G access network entity controls the UE AMBR. The AMF entity determines the authorized APN AMBR, and sends the determined authorized APN AMBR to the UE and the PGW entity, so that in an uplink direction, the UE controls the APN AMBR, and the PGW entity performs check, and in a downlink direction, the PGW entity controls the APN AMBR.

Embodiment 2

Figures 1, 7B:
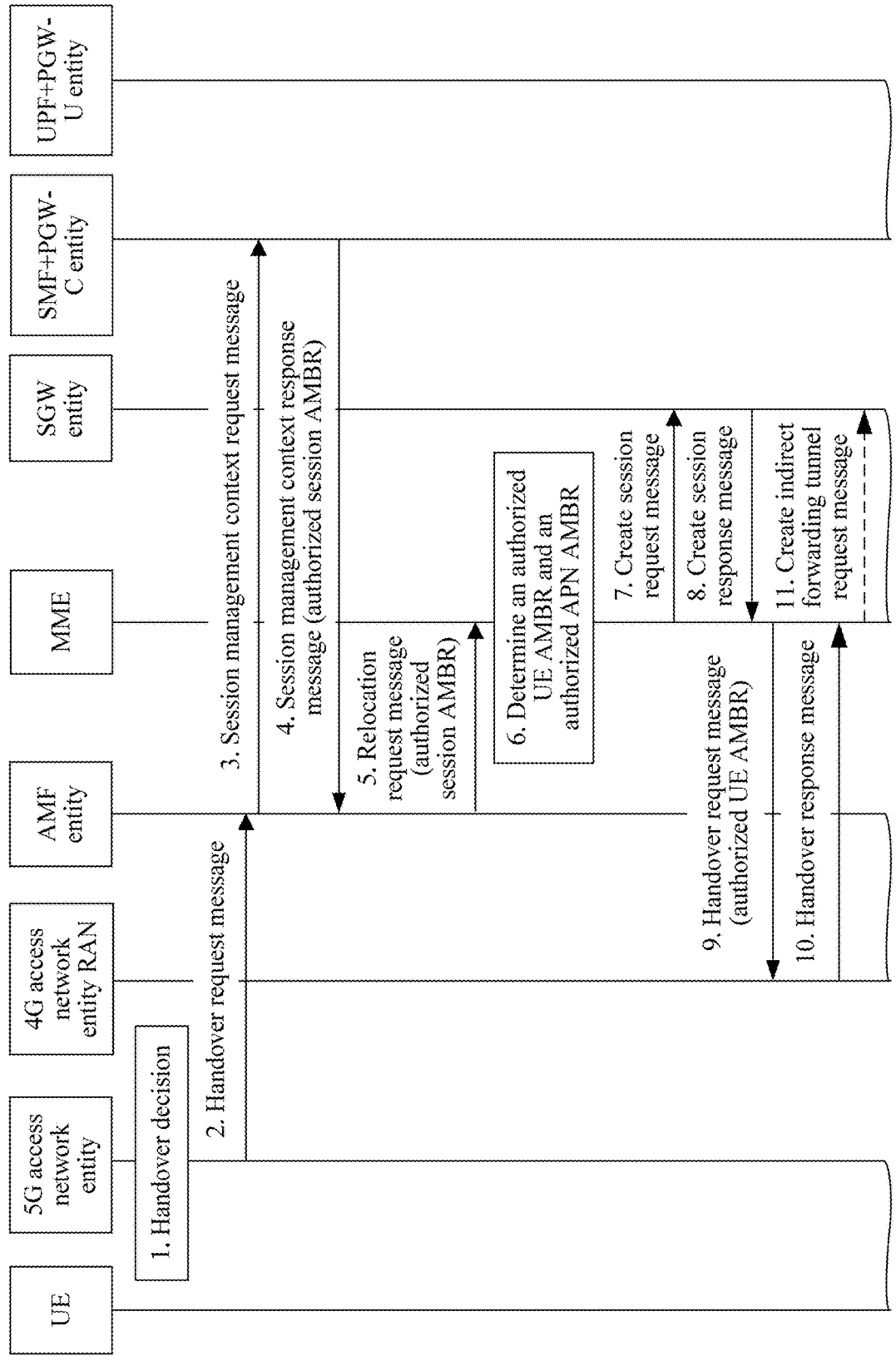
Figures 2, 7B:
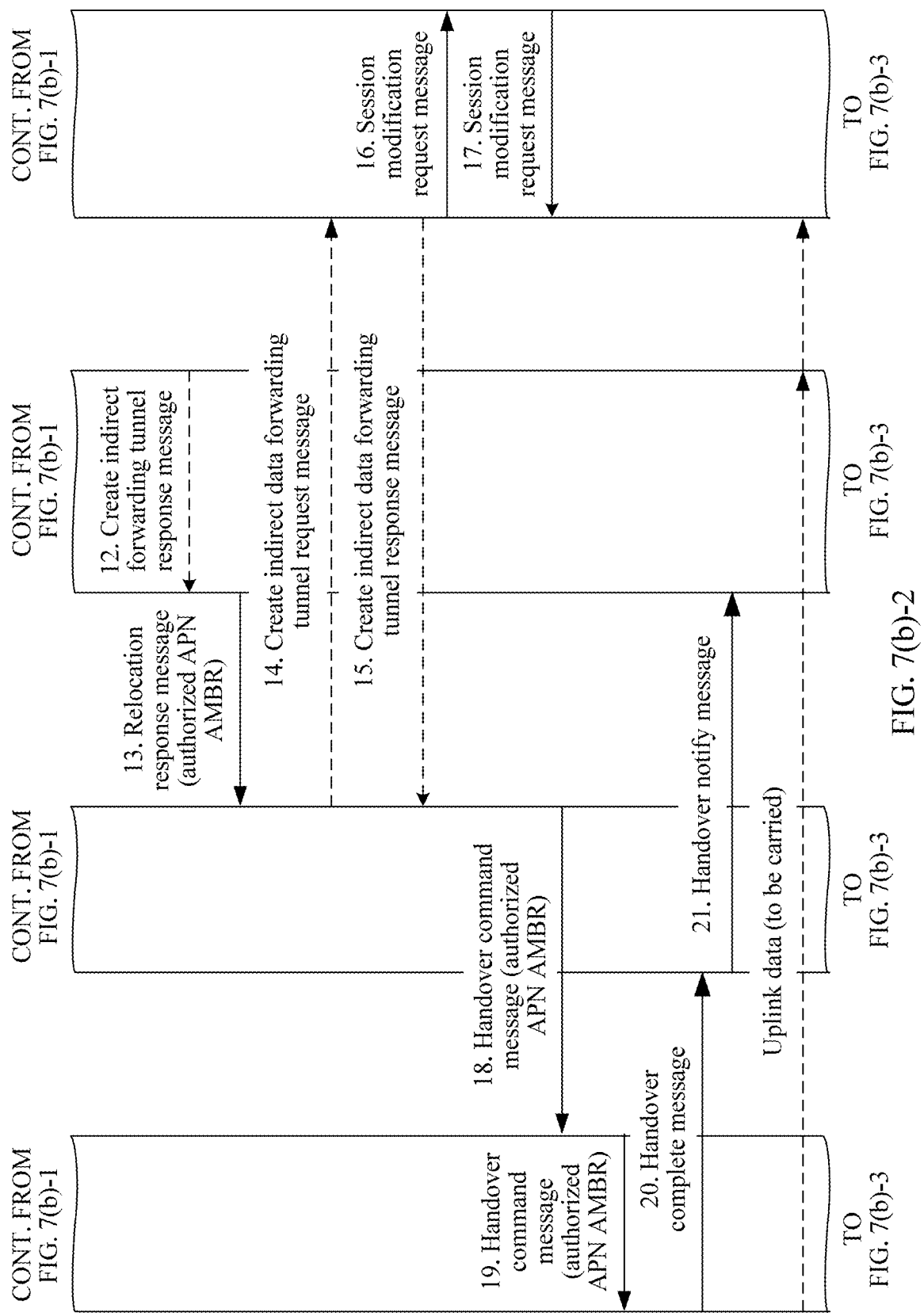
Figures 3, 7B:
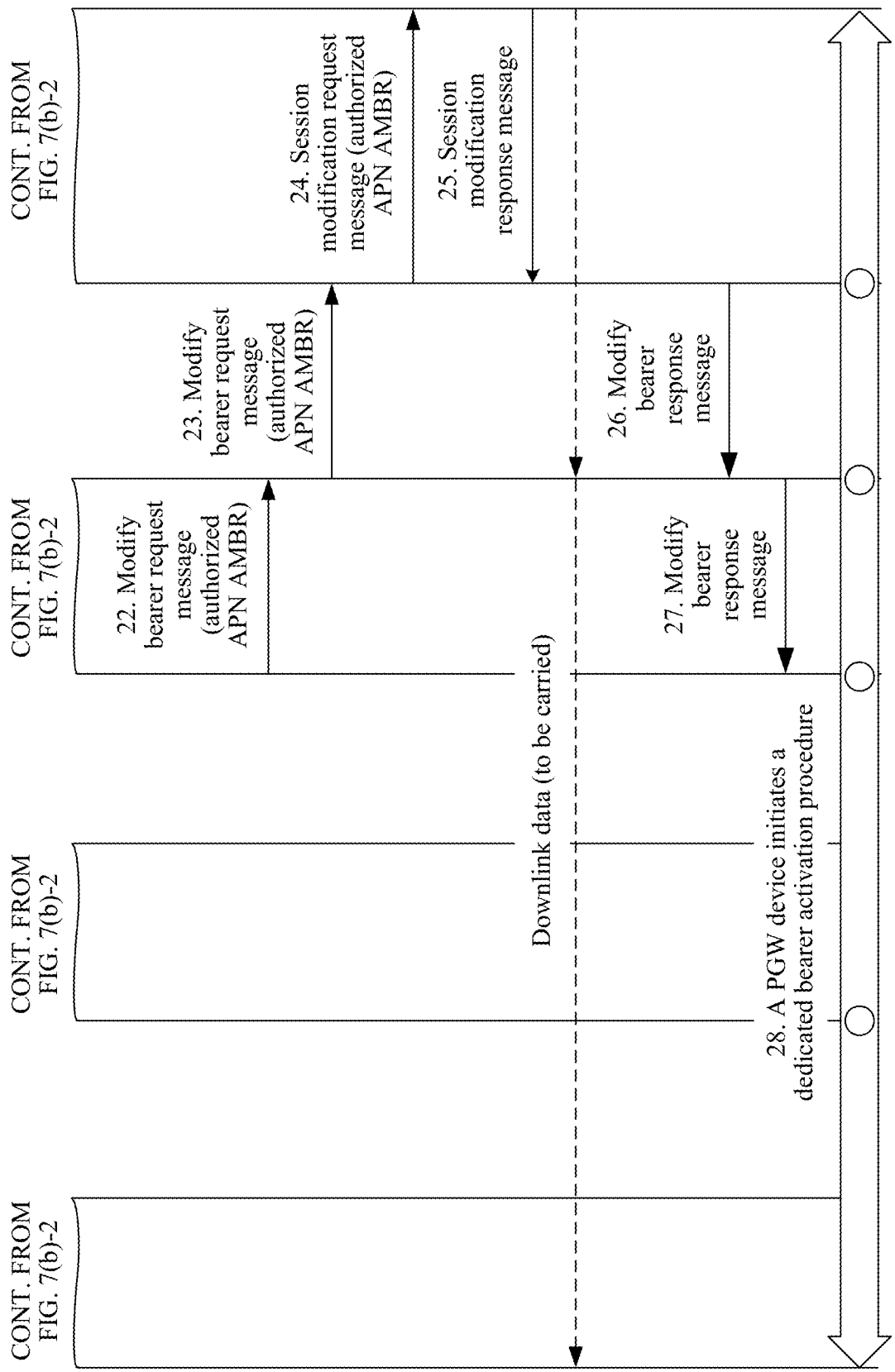

FIG. 7(b)-1 to FIG. 7(b)-3 are a schematic flowchart of another parameter determining method according to this application. The method is applied to a scenario in which UE is handed over from a 5GS network to an EPS network. To be specific, the UE accesses the network by using a 5G access network entity, to obtain a service. Because of movement of the UE, the 5G access network entity determines that a handover procedure needs to be initiated.

In this embodiment, a first communications entity is an MME, and a second communications entity is an MME. To be specific, the MME determines an authorized UE AMBR of the UE and an authorized APN AMBR in each DN.

A specific procedure is described as follows:

Operation 1: The 5G access network entity determines that the UE needs to be handed over to a 4G access network entity.

Because of movement of the UE, the UE has moved to a 4G network. For example, the UE has moved to a base station in the 4G network. In this case, the 5G access network entity detects that a signal of the UE is relatively weak, and therefore makes a handover decision, and starts to prepare for the handover.

Operation 2: The 5G access network entity sends a handover request message to an AMF entity.

The handover request message includes a target eNB ID. The target eNB ID may be an ID of a base station that is in the 4G network and detected by the UE and whose signal is strongest, or may be an ID of a base station that is obtained from the 4G access network entity through message exchange between the 5G access network entity and the 4G access network entity. A manner of obtaining the target eNB ID is not limited in this application.

Operation 3: The AMF entity sends a session management context request (SM context request) message to an SMF+PGW-C entity.

The AMF entity determines, based on the target eNB ID, that the handover to the 4G access network entity is needed, and therefore sends the session management context request to the SMF+PGW-C entity.

Operation 4: The SMF+PGW-C entity sends a session management context response (SM context response) message to the AMF entity.

The session management context response message includes one or more authorized session AMBRs.

It should be noted that in this application, the UE may establish a connection to a plurality of DNs, and establish one or more PDU sessions with each DN, where each PDU session has one authorized session AMBR. One or more PDU sessions in a same DN are controlled by one SMF entity. PDU sessions in different DNs may be controlled by different SMF entities. Therefore, when there are a plurality of SMF entities, the AMF entity needs to initiate operation 3 and operation 4 to each SMF entity, to obtain an authorized session AMBR in each DN by using each SMF entity.

Operation 5: The AMF entity sends a relocation request message to the MME.

The relocation request message includes the authorized session AMBRs.

Operation 6: The MME determines an authorized UE AMBR and an authorized APN AMBR.

Specifically, the MME determines an authorized APN AMBR in each DN based on a subscribed APN AMBR and an authorized session AMBR in the DN. In one embodiment, authorized APN AMBR=min{sum(authorized session AMBRs in the DN), subscribed APN AMBR}, that is, an authorized APN AMBR in one DN is a smaller value in the subscribed APN AMBR and a sum of authorized session AMBRs in the DN.

In one embodiment, authorized APN AMBR=sum(authorized session AMBR of a PDU session), where sum( ) is a summation function.

For a method for calculating the authorized UE AMBR, in one embodiment, authorized UE AMBR=min{sum(authorized APN AMBRs in all DNs), subscribed UE AMBR}, that is, the authorized UE AMBR of the UE is a smaller value in the subscribed UE AMBR and a sum of the authorized APN AMBRs in all the DNs. The authorized UE AMBR is either of the subscribed UE AMBR and the sum of the authorized APN AMBRs in all the DNs if the subscribed UE AMBR and the sum of the authorized APN AMBRs in all the DNs are equal.

The function min(a, b) represents calculating a smaller value in a and b, and sum( ) is a summation function.

Operation 7: The MME sends a create session request message to an SGW entity.

The create session request message is used to request to establish a PDN connection.

Operation 8: The SGW entity allocates a local resource, and sends a create session response (create session response) message to the MME.

Operation 9: The MME sends a handover request message to the 4G access network entity.

The handover request message includes the authorized UE AMBR.

Operation 10: The 4G access network entity allocates a requested resource, and sends a handover response message to the MME.

Operation 11: The MME sends a create indirect forwarding tunnel request (create indirect data forwarding tunnel request) message to the SGW.

The request includes information such as a target EPS RAN node tunnel identifier.

Operation 12: The SGW entity sends a create indirect forwarding tunnel response (create indirect data forwarding tunnel response) message to the MME.

The response message includes information such as an SGW tunnel identifier.

Operation 11 and operation 12 are optional operations. Operation 11 and operation 12 are performed only when the MME determines to apply indirect forwarding.

Operation 13: The MME sends a relocation response message to the AMF entity.

In one embodiment, the message includes the authorized APN AMBR.

Operation 14: The AMF entity sends a create indirect data forwarding tunnel request (create indirect data forwarding tunnel request) message to the SMF+PGW-C entity.

Operation 15: The SMF+PGW-C entity returns a create indirect data forwarding tunnel response message to the AMF entity.

Operation 14 and operation 15 are optional operations.

Operation 16: The SMF+PGW-C entity initiates a session modification request message to a UPF+PGW-U entity.

Operation 17: The UPF+PGW-U entity initiates a session modification response message to the SMF+PGW-C entity.

Operation 18: The AMF entity sends a handover command message to the 5G access network entity.

The handover command message includes the authorized APN AMBR.

In one embodiment, the authorized APN AMBR included in the handover command message is an uplink authorized APN AMBR.

Operation 19: The 5G access network entity sends a handover command (handover command) message to the UE.

The handover command message includes the authorized APN AMBR.

Operation 20: The UE returns a handover complete message to the 4G access network entity.

Operation 21: The 4G access network entity sends a handover notify (handover notify) message to the MME.

Operation 22: The MME sends a modify bearer request message to the SGW entity.

In one embodiment, the request message includes authorized APN AMBRs.

The authorized APN AMBRs included in the request message include the uplink APN AMBR and a downlink APN AMBR.

Operation 23: The SGW entity sends a modify bearer request message to the SMF+PGW-C entity.

In one embodiment, the request message includes the authorized APN AMBRs.

Operation 24: The SMF+PGW-C entity sends a session modification request message to the UPF entity.

The request message includes the authorized APN AMBRs.

In one embodiment, for the session modification request message, reference may be made to an Sx session modification request in 4G.

Operation 25: The UPF entity sends a session modification response message to the SMF+PGW-C entity.

In one embodiment, for the session modification request message, reference may be made to an Sx session modification response in 4G.

Operation 26: The SMF+PGW-C entity sends a modify bearer response message to the SGW entity.

Operation 27: The SGW entity sends a modify bearer response message to the MME.

Operation 28: A PGW entity initiates a dedicated bearer activation (initiated dedicated bearer activation) procedure.

Through operation 1 to operation 28, the MME determines the authorized UE AMBR of the UE, and sends the determined authorized UE AMBR of the UE to the 4G access network entity, so that the 4G access network entity controls the UE AMBR, and specifically, a base station in the 4G access network entity controls the UE AMBR. The MME determines the authorized APN AMBR, and sends the determined authorized APN AMBR to the UE and the PGW entity, so that in an uplink direction, the UE controls the APN AMBR, and the PGW entity performs check, and in a downlink direction, the PGW entity controls the APN AMBR.

Embodiment 3

Figures 2, 7C:
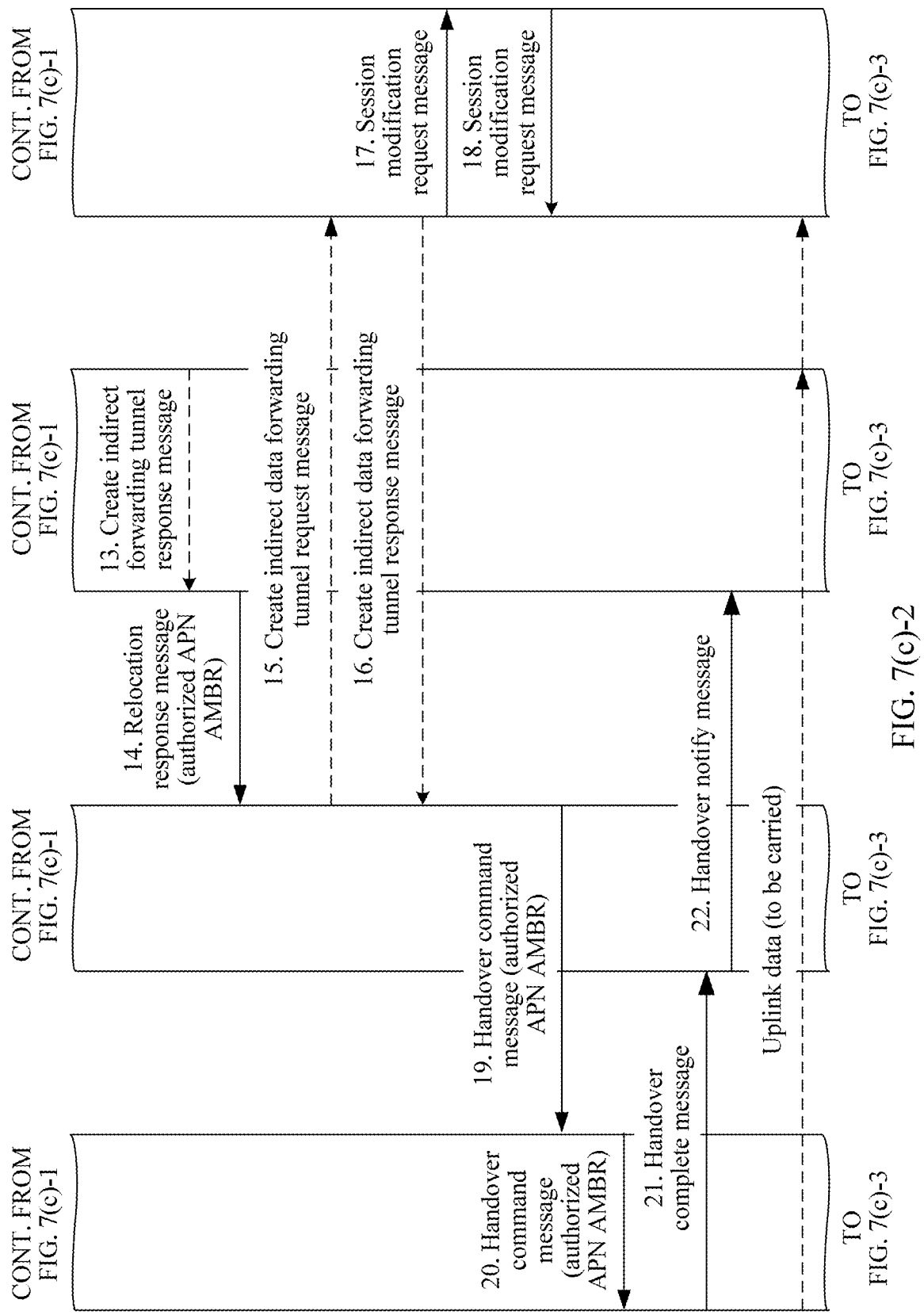

FIG. 7(c)-1 to FIG. 7(c)-3 are a schematic flowchart of another parameter determining method according to this application. The method is applied to a scenario in which UE is handed over from a 5GS network to an EPS network. To be specific, the UE accesses the network by using a 5G access network entity, to obtain a service. Because of movement of the UE, the 5G access network entity determines that a handover procedure needs to be initiated.

In this embodiment, a first communications entity is an SMF+PGW-C entity, and a second communications entity is an AMF entity. To be specific, the AMF entity determines an authorized UE AMBR of the UE, and the SMF+PGW-C entity determines an authorized APN AMBR in each DN.

A specific procedure is described as follows:

Operation 1: The 5G access network entity determines that the UE needs to be handed over to a 4G access network entity.

Because of movement of the UE, the UE has moved to a 4G network. For example, the UE has moved to a base station in the 4G network. In this case, the 5G access network entity detects that a signal of the UE is relatively weak, and therefore makes a handover decision, and starts to prepare for the handover.

Operation 2: The 5G access network entity sends a handover request message to the AMF entity.

The handover request message includes a target eNB ID. The target eNB ID may be an ID of a base station that is in the 4G network and detected by the UE and whose signal is strongest, or may be an ID of a base station that is obtained from the 4G access network entity through message exchange between the 5G access network entity and the 4G access network entity. A manner of obtaining the target eNB ID is not limited in this application.

Operation 3: The AMF entity sends a session management context request (SM context request) message to the SMF+PGW-C entity.

The AMF entity determines, based on the target eNB ID, that the handover to the 4G access network entity is needed, and therefore sends the session management context request to the SMF+PGW-C entity.

Operation 4: The SMF+PGW-C entity determines an authorized APN AMBR.

Specifically, the SMF+PGW-C entity determines an authorized APN AMBR in each DN based on a subscribed APN AMBR and an authorized session AMBR in the DN. In one embodiment, authorized APN AMBR=min{sum(authorized session AMBRs in the DN), subscribed APN AMBR}, that is, an authorized APN AMBR in one DN is a smaller value in the subscribed APN AMBR and a sum of authorized session AMBRs in the DN. The subscribed APN AMBR is obtained by the SMF+PGW-C entity from a UDM entity and/or an HSS entity.

The function min(a, b) represents calculating a smaller value in a and b, and sum( ) is a summation function.

In one embodiment, the SMF+PGW-C entity determines an authorized APN AMBR in each DN based on an authorized session AMBR in the DN, where authorized APN AMBR=sum(authorized session AMBR of a PDU session), and sum( ) is a summation function.

In one embodiment, the SMF+PGW-C entity interacts with a PCF+PCRF based on an authorized session AMBR in each DN, to determine an APN AMBR in the DN. The SMF+PGW-C entity may determine the authorized APN AMBR based on the subscribed APN AMBR and a policy.

In an alternative method, operation 4 may be replaced by the following: A PCF+PCRF entity (that is, the first communications entity is a PCF+PCRF entity) determines an authorized APN AMBR.

In one embodiment, the SMF+PGW-C entity sends the subscribed APN AMBR to the PCF+PCRF entity, the PCF+PCRF entity determines the authorized APN AMBR based on the subscribed APN AMBR and a policy on the PCF+PCRF and/or information obtained from a user data repository (UDR), and the PCF+PCRF entity sends the authorized APN AMBR to the SMF+PGW-C entity.

Alternatively, the SMF+PGW-C entity obtains the authorized APN AMBR from the PCF+PCRF entity, and the authorized APN AMBR is determined by the PCF+PCRF entity based on the subscribed APN AMBR and a policy on the PCF+PCRF and/or information obtained from a UDR. The subscribed APN AMBR is obtained by the PCF+PCRF entity from the UDM entity and/or the HSS entity by using the SMF+PGW-C.

Operation 5: The SMF+PGW-C entity sends a session management context response (SM context response) message to the AMF entity.

The session management context response message includes the authorized APN AMBR.

It should be noted that in this application, the UE may establish a connection to a plurality of DNs, and establish one or more PDU sessions with each DN, where each PDU session has one authorized session AMBR. One or more PDU sessions in a same DN are controlled by one SMF entity. PDU sessions in different DNs may be controlled by different SMF entities. Therefore, when there are a plurality of SMF+PGW-C entities, the AMF entity needs to initiate operation 3 to operation 5 to each SMF+PGW-C entity, to obtain an authorized APN AMBR in each DN by using each SMF+PGW-C entity.

Operation 6: The AMF entity determines an authorized UE AMBR.

For a method for calculating the authorized UE AMBR, in one embodiment, authorized UE AMBR=min{sum(authorized APN AMBRs in all DNs), subscribed UE AMBR}, that is, the authorized UE AMBR of the UE is a smaller value in the subscribed UE AMBR and a sum of the authorized APN AMBRs in all the DNs. The authorized UE AMBR is either of the subscribed UE AMBR and the sum of the authorized APN AMBRs in all the DNs if the subscribed UE AMBR and the sum of the authorized APN AMBRs in all the DNs are equal.

The function min(a, b) represents calculating a smaller value in a and b, and sum( ) is a summation function.

The subscribed UE AMBR is obtained by the AMF entity from the UDM entity and/or the HSS entity.

Operation 7: The AMF entity sends a relocation request message to an MME.

The relocation request message includes the authorized APN AMBR and the authorized UE AMBR.

Operation 8: The MME sends a create session request message to an SGW entity.

The create session request message is used to request to establish a PDN connection.

Operation 9: The SGW entity allocates a local resource, and sends a create session response message to the MME.

Operation 10: The MME sends a handover request message to the 4G access network entity.

The handover request message includes the authorized UE AMBR.

Operation 11: The 4G access network entity allocates a requested resource, and sends a handover response message to the MME.

Operation 12: The MME sends a create indirect forwarding tunnel request (create indirect data forwarding tunnel request) message to the SGW.

The request includes information such as a target EPS RAN tunnel identifier.

Operation 13: The SGW entity sends a create indirect forwarding tunnel response (create indirect data forwarding tunnel response) message to the MME.

The response message includes information such as an SGW tunnel identifier.

Operation 12 and operation 13 are optional operations. Operation 12 and operation 13 are performed only when the MME determines to apply indirect forwarding.

Operation 14: The MME sends a relocation response message to the AMF entity.

In one embodiment, the message includes the authorized APN AMBR.

Operation 15: The AMF entity sends a create indirect data forwarding tunnel request (create indirect data forwarding tunnel request) message to the SMF+PGW-C entity.

Operation 16: The SMF+PGW-C entity returns a create indirect data forwarding tunnel response (Create indirect data forwarding tunnel response) message to the AMF entity.

Operation 15 and operation 16 are optional operations.

Operation 17: The SMF+PGW-C entity initiates a session modification request (modification request) message to a UPF+PGW-U entity.

Operation 18: The UPF+PGW-U entity initiates a session modification response (modification response) message to the SMF+PGW-C entity.

Operation 19: The AMF entity sends a handover command message to the 5G access network entity.

The handover command message includes the authorized APN AMBR.

Operation 20: The 5G access network entity sends a handover command (handover command) message to the UE.

The handover command message includes the authorized APN AMBR.

Operation 21: The UE returns a handover complete message to the 4G access network entity.

Operation 22: The 4G access network entity sends a handover notify (handover notify) message to the MME.

Operation 23: The MME sends a modify bearer request message to the SGW entity.

In one embodiment, the request message includes authorized APN AMBRs.

The authorized APN AMBRs included in the request message include an uplink APN AMBR and a downlink APN AMBR.

Operation 24: The SGW entity sends a modify bearer request message to the SMF+PGW-C entity.

In one embodiment, the request message includes the authorized APN AMBRs.

Operation 25: The SMF+PGW-C entity sends a session modification request message to the UPF entity.

The request message includes the authorized APN AMBRs.

In one embodiment, for the session modification request message, reference may be made to an Sx session modification request in 4G.

Operation 26: The UPF entity sends a session modification response message to the SMF+PGW-C entity.

In one embodiment, for the session modification request message, reference may be made to an Sx session modification response in 4G.

Operation 27: The SMF+PGW-C entity sends a modify bearer response message to the SGW entity.

Operation 28: The SGW entity sends a modify bearer response message to the MME.

Operation 29: A PGW entity initiates a dedicated bearer activation (initiated dedicated bearer activation) procedure.

Through operation 1 to operation 29, the AMF entity determines the authorized UE AMBR of the UE, and sends the determined authorized UE AMBR of the UE to the 4G access network entity, so that the 4G access network entity controls the UE AMBR, and specifically, a base station in the 4G access network entity controls the UE AMBR. The SMF+PGW-C entity determines the authorized APN AMBR, and sends the determined authorized APN AMBR to the UE and the PGW entity, so that in an uplink direction, the UE controls the APN AMBR, and the PGW entity performs check, and in a downlink direction, the PGW entity controls the APN AMBR.

Embodiment 4

Figures 2, 7D:
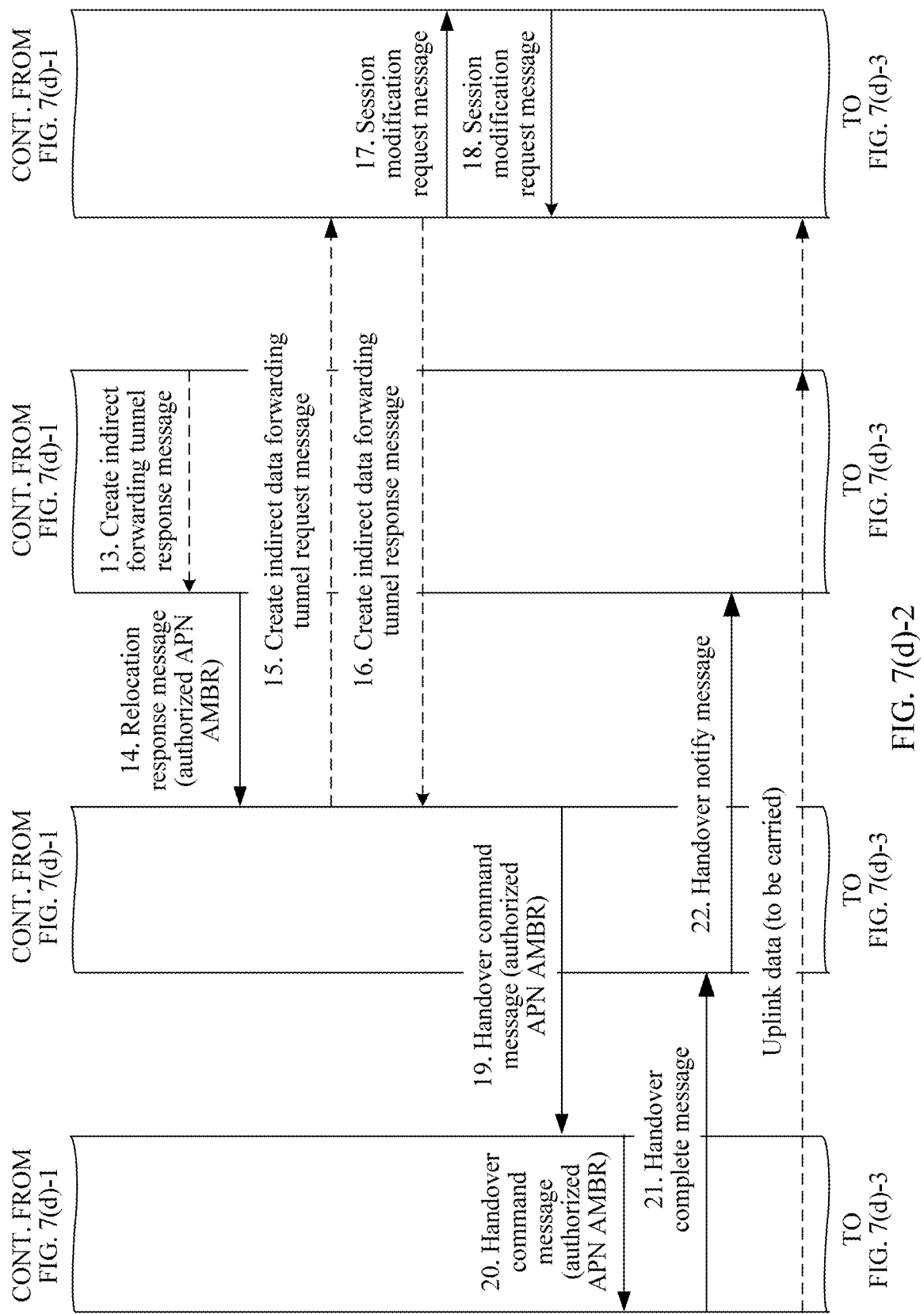

FIG. 7(d)-1 to FIG. 7(d)-3 are a schematic flowchart of another parameter determining method according to this application. The method is applied to a scenario in which UE is handed over from a 5GS network to an EPS network. To be specific, the UE accesses the network by using a 5G access network entity, to obtain a service. Because of movement of the UE, the 5G access network entity determines that a handover procedure needs to be initiated.

In this embodiment, a first communications entity is an SMF+PGW-C entity, and a second communications entity is an MME. To be specific, the MME determines an authorized UE AMBR of the UE, and the SMF+PGW-C entity determines an authorized APN AMBR in each DN.

A specific procedure is described as follows:

Operation 1: The 5G access network entity determines that the UE needs to be handed over to a 4G access network entity.

Because of movement of the UE, the UE has moved to a 4G network. For example, the UE has moved to a base station in the 4G network. In this case, the 5G access network entity detects that a signal of the UE is relatively weak, and therefore makes a handover decision, and starts to prepare for the handover.

Operation 2: The 5G access network entity sends a handover request message to an AMF entity.

The handover request message includes a target eNB ID. The target eNB ID may be an ID of a base station that is in the 4G network and detected by the UE and whose signal is strongest, or may be an ID of a base station that is obtained from the 4G access network entity through message exchange between the 5G access network entity and the 4G access network entity. A manner of obtaining the target eNB ID is not limited in this application.

Operation 3: The AMF entity sends a session management context request (SM context request) message to the SMF+PGW-C entity.

The AMF entity determines, based on the target eNB ID, that the handover to the 4G access network entity is needed, and therefore sends the session management context request to the SMF+PGW-C entity.

Operation 4: The SMF+PGW-C entity determines an authorized APN AMBR.

Specifically, the SMF+PGW-C entity determines an authorized APN AMBR in each DN based on a subscribed APN AMBR and an authorized session AMBR in the DN. In one embodiment, authorized APN AMBR=min{sum(authorized session AMBRs in the DN), subscribed APN AMBR}, that is, an authorized APN AMBR in one DN is a smaller value in the subscribed APN AMBR and a sum of authorized session AMBRs in the DN. The subscribed APN AMBR is obtained by the SMF+PGW-C entity from a UDM entity and/or an HSS entity. The authorized APN AMBR is either of the subscribed APN AMBR and the sum of the authorized session AMBRs in the DN if the subscribed APN AMBR and the sum of the authorized session AMBRs in the DN are equal.

The function min(a, b) represents calculating a smaller value in a and b, and sum( ) is a summation function.

In one embodiment, the SMF+PGW-C entity determines an authorized APN AMBR in each DN based on an authorized session AMBR in the DN, where authorized APN AMBR=sum(authorized session AMBR of a PDU session), and sum( ) is a summation function.

In one embodiment, the SMF+PGW-C entity interacts with a PCF+PCRF based on an authorized session AMBR in each DN, to determine an APN AMBR in the DN.

In one embodiment, the SMF+PGW-C entity may determine the authorized APN AMBR based on the subscribed APN AMBR and a local policy.

In an alternative method, operation 4 may be replaced by the following: A PCF+PCRF entity (that is, the first communications entity is a PCF+PCRF entity) determines an authorized APN AMBR.

In one embodiment, the SMF+PGW-C entity sends the subscribed APN AMBR to the PCF+PCRF entity, the PCF+PCRF entity determines the authorized APN AMBR based on the subscribed APN AMBR and a local policy on the PCF and/or information obtained from a UDR, and the PCF+PCRF entity sends the authorized APN AMBR to the SMF+PGW-C entity.

Alternatively, the SMF entity obtains the authorized APN AMBR from the PCF+PCRF entity, and the authorized APN AMBR is determined by the PCF+PCRF entity based on the subscribed APN AMBR and a local policy on the PCF and/or information obtained from a UDR. The subscribed APN AMBR is obtained by the PCF+PCRF entity from the UDM entity and the HSS entity by using the SMF+PGW-C.

Operation 5: The SMF+PGW-C entity sends a session management context response (SM context response) message to the AMF entity.

The session management context response message includes the authorized APN AMBR.

It should be noted that in this application, the UE may establish a connection to a plurality of DNs, and establish one or more PDU sessions with each DN, where each PDU session has one authorized session AMBR. One or more PDU sessions in a same DN are controlled by one SMF entity. PDU sessions in different DNs may be controlled by different SMF entities. Therefore, when there are a plurality of SMF entities, the AMF entity needs to initiate operation 3 to operation 5 to each SMF entity, to obtain an authorized APN AMBR in each DN by using each SMF entity.

Operation 6: The AMF entity sends a relocation request message to the MME.

The relocation request message includes the authorized APN AMBR.

Operation 7: The MME determines an authorized UE AMBR.

For a method for calculating the authorized UE AMBR, in one embodiment, authorized UE AMBR=min{sum(authorized APN AMBRs in all DNs), subscribed UE AMBR}, that is, the authorized UE AMBR of the UE is a smaller value in the subscribed UE AMBR and a sum of the authorized APN AMBRs in all the DNs.

The function min(a, b) represents calculating a smaller value in a and b, and sum( ) is a summation function.

The subscribed UE AMBR is obtained by the MME from the UDM entity and/or the HSS entity.

Operation 8: The MME sends a create session request message to an SGW entity.

The create session request message is used to request to establish a PDN connection.

Operation 9: The SGW entity allocates a local resource, and sends a create session response message to the MME.

Operation 10: The MME sends a handover request message to the 4G access network entity.

The handover request message includes the authorized UE AMBR.

Operation 11: The 4G access network entity allocates a requested resource, and sends a handover response message to the MME.

Operation 12: The MME sends a create indirect forwarding tunnel request (create indirect data forwarding tunnel request) message to the SGW.

The request includes information such as a target EPS RAN node tunnel identifier.

Operation 13: The SGW entity sends a create indirect forwarding tunnel response (create indirect data forwarding tunnel response) message to the MME.

The response message includes information such as an SGW entity tunnel identifier.

Operation 12 and operation 13 are optional operations. Operation 12 and operation 13 are performed only when the MME determines to apply indirect forwarding.

Operation 14: The MME sends a relocation response message to the AMF entity.

In one embodiment, the message includes the authorized APN AMBR.

Operation 15: The AMF entity sends a create indirect data forwarding tunnel request (create indirect data forwarding tunnel request) message to the SMF+PGW-C entity.

Operation 16: The SMF+PGW-C entity returns a create indirect data forwarding tunnel response (Create indirect data forwarding tunnel response) message to the AMF entity.

Operation 15 and operation 16 are optional operations.

Operation 17: The SMF+PGW-C entity initiates a session modification request message to a UPF+PGW-U entity.

Operation 18: The UPF+PGW-U entity initiates a session modification response (modification response) message to the SMF+PGW-C entity.

Operation 19: The AMF entity sends a handover command message to the 5G access network entity.

The handover command message includes the authorized APN AMBR.

In one embodiment, the authorized APN AMBR included in the handover command message is an uplink authorized APN AMBR.

Operation 20: The 5G access network entity sends a handover command message to the UE.

The handover command message includes the authorized APN AMBR.

Operation 21: The UE returns a handover complete message to the 4G access network entity.

Operation 22: The 4G access network entity sends a handover notify message to the MME.

Operation 23: The MME sends a modify bearer request message to the SGW entity.

In one embodiment, the request message includes authorized APN AMBRs.

The authorized APN AMBRs included in the request message include the uplink APN AMBR and a downlink APN AMBR.

Operation 24: The SGW entity sends a modify bearer request message to the SMF+PGW-C entity.

In one embodiment, the request message includes the authorized APN AMBRs.

Operation 25: The SMF+PGW-C entity sends a session modification request (Session modification request) message to the UPF entity.

The request message includes the authorized APN AMBRs.

In one embodiment, for the session modification request message, reference may be made to an Sx session modification request in 4G.

Operation 26: The UPF entity sends a session modification response message to the SMF+PGW-C entity.

In one embodiment, for the session modification request message, reference may be made to an Sx session modification response in 4G.

Operation 27: The SMF+PGW-C entity sends a modify bearer response message to the SGW entity.

Operation 28: The SGW entity sends a modify bearer response message to the MME.

Operation 29: A PGW entity initiates a dedicated bearer activation (initiated dedicated bearer activation) procedure.

Through operation 1 to operation 29, the MME determines the authorized UE AMBR of the UE, and sends the determined authorized UE AMBR of the UE to the 4G access network entity, so that the 4G access network entity controls the UE AMBR, and specifically, a base station in the 4G access network entity controls the UE AMBR. The SMF+PGW-C entity determines the authorized APN AMBR, and sends the determined authorized APN AMBR to the UE and the PGW entity, so that in an uplink direction, the UE controls the APN AMBR, and the PGW entity performs check, and in a downlink direction, the PGW entity controls the APN AMBR.

Embodiment 5

Figures 2, 7E:
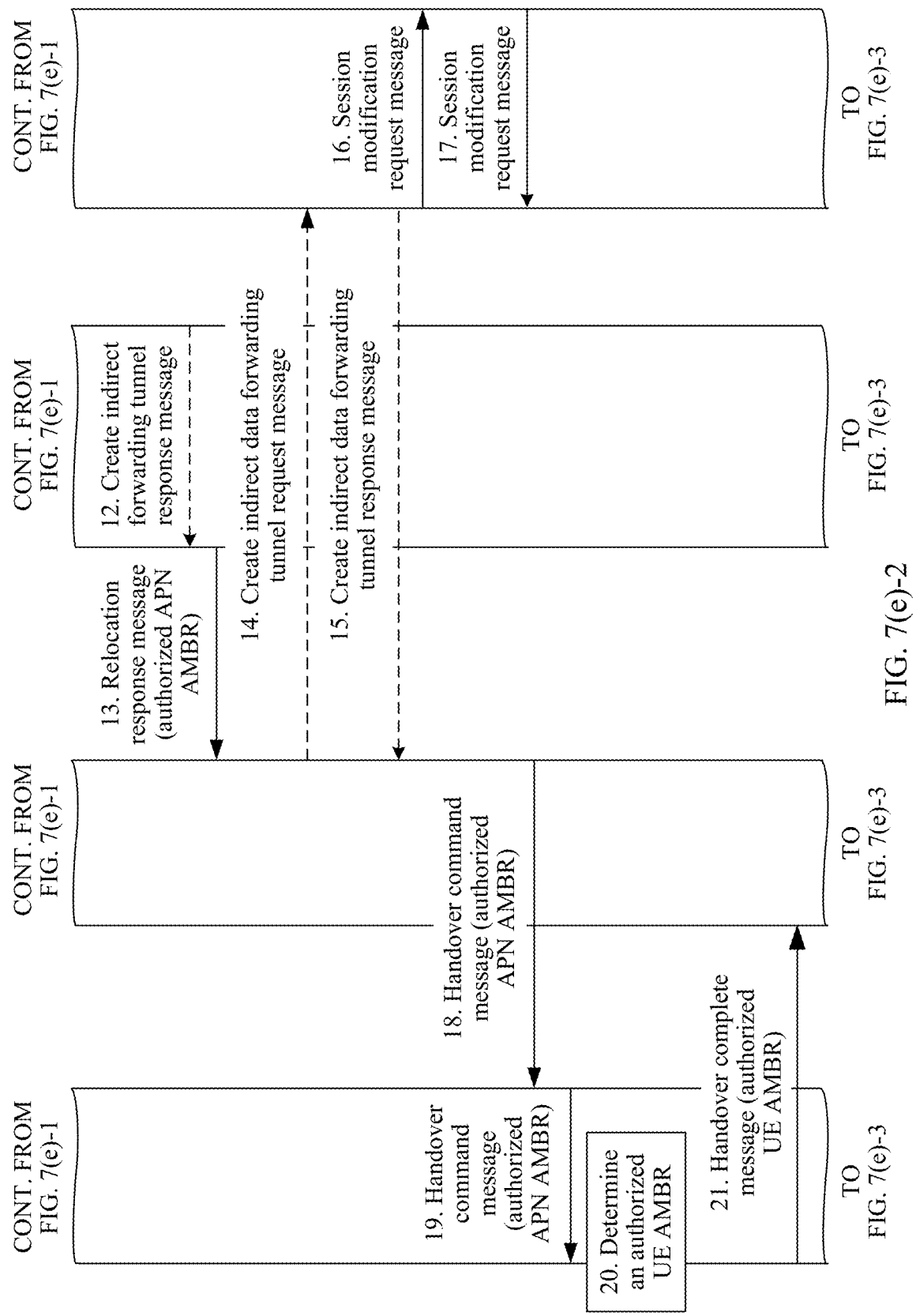
Figures 3, 7E:
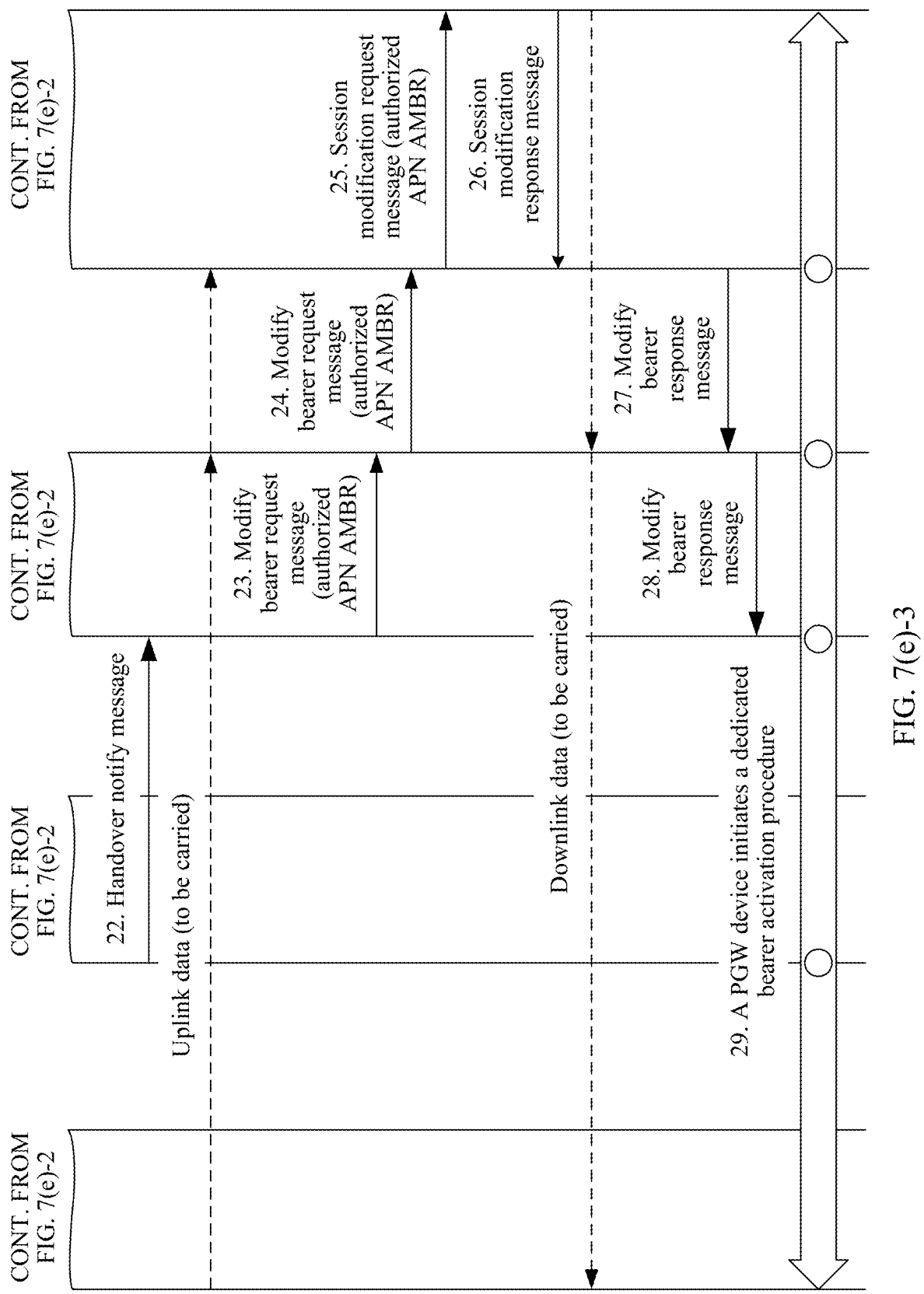

FIG. 7(e)-1 to FIG. 7(e)-3 are a schematic flowchart of another parameter determining method according to this application. The method is applied to a scenario in which UE is handed over from a 5GS network to an EPS network. To be specific, the UE accesses the network by using a 5G access network entity, to obtain a service. Because of movement of the UE, the 5G access network entity determines that a handover procedure needs to be initiated.

In this embodiment, a first communications entity is an SMF+PGW-C entity, and a second communications entity is UE. To be specific, the UE determines an authorized UE AMBR of the UE, and the SMF+PGW-C entity determines an authorized APN AMBR in each DN.

A specific procedure is described as follows:

Operation 1: The 5G access network entity determines that the UE needs to be handed over to a 4G access network entity.

Because of movement of the UE, the UE has moved to a 4G network. For example, the UE has moved to a base station in the 4G network. In this case, the 5G access network entity detects that a signal of the UE is relatively weak, and therefore makes a handover decision, and starts to prepare for the handover.

Operation 2: The 5G access network entity sends a handover request message to an AMF entity.

The handover request message includes a target eNB ID. The target eNB ID may be an ID of a base station that is in the 4G network and detected by the UE and whose signal is strongest, or may be an ID of a base station that is obtained from the 4G access network entity through message exchange between the 5G access network entity and the 4G access network entity. A manner of obtaining the target eNB ID is not limited in this application.

Operation 3: The AMF entity sends a session management context request (SM context request) message to the SMF+PGW-C entity.

The AMF entity determines, based on the target eNB ID, that the handover to the 4G access network entity is needed, and therefore sends the session management context request to the SMF+PGW-C entity.

Operation 4: The SMF+PGW-C entity determines an authorized APN AMBR.

Specifically, the SMF+PGW-C entity determines an authorized APN AMBR in each DN based on a subscribed APN AMBR and an authorized session AMBR in the DN. In one embodiment, authorized APN AMBR=min{sum(authorized session AMBRs in the DN), subscribed APN AMBR}, that is, an authorized APN AMBR in one DN is a smaller value in the subscribed APN AMBR and a sum of authorized session AMBRs in the DN. The subscribed APN AMBR is obtained by the SMF+PGW-C entity from a UDM entity and/or an HSS entity. The authorized APN AMBR is either of the subscribed APN AMBR and the sum of the authorized session AMBRs in the DN if the subscribed APN AMBR and the sum of the authorized session AMBRs in the DN are equal.

The function min(a, b) represents calculating a smaller value in a and b, and sum( ) is a summation function.

In one embodiment, the SMF+PGW-C entity determines an authorized APN AMBR in each DN based on an authorized session AMBR in the DN, where authorized APN AMBR=sum(authorized session AMBR of a PDU session), and sum( ) is a summation function.

In one embodiment, the SMF+PGW-C entity interacts with a PCF+PCRF based on an authorized session AMBR in each DN, to determine an APN AMBR in the DN.

In one embodiment, the SMF+PGW-C entity may determine the authorized APN AMBR based on the subscribed APN AMBR and a local policy.

In an alternative method, operation 4 may be replaced by the following: A PCF+PCRF entity (that is, the first communications entity is a PCF+PCRF entity) determines an authorized APN AMBR.

In one embodiment, the SMF+PGW-C entity sends the subscribed APN AMBR to the PCF+PCRF entity, the PCF+PCRF entity determines the authorized APN AMBR based on the subscribed APN AMBR and a local policy on the PCF and/or information obtained from a UDR, and the PCF+PCRF entity sends the authorized APN AMBR to the SMF+PGW-C entity.

Alternatively, the SMF entity obtains the authorized APN AMBR from the PCF+PCRF entity, and the authorized APN AMBR is determined by the PCF+PCRF entity based on the subscribed APN AMBR and a local policy on the PCF and/or information obtained from a UDR. The subscribed APN AMBR is obtained by the PCF+PCRF entity from the UDM entity and the HSS entity by using the SMF+PGW-C.

Operation 5: The SMF+PGW-C entity sends a session management context response (SM context response) message to the AMF entity.

The session management context response message includes the authorized APN AMBR.

It should be noted that in this application, the UE may establish a connection to a plurality of DNs, and establish one or more PDU sessions with each DN, where each PDU session has one authorized session AMBR. One or more PDU sessions in a same DN are controlled by one SMF entity. PDU sessions in different DNs may be controlled by different SMF entities. Therefore, when there are a plurality of SMF entities, the AMF entity needs to initiate operation 3 to operation 5 to each SMF entity, to obtain an authorized APN AMBR in each DN by using each SMF entity.

Operation 6: The AMF entity sends a relocation request message to an MME.

The relocation request message includes the authorized APN AMBR.

Operation 7: The MME sends a create session request message to an SGW entity.

The create session request message is used to request to establish a PDN connection.

Operation 8: The SGW entity allocates a local resource, and sends a create session response message to the MME.

Operation 9: The MME sends a handover request message to the 4G access network entity.

Operation 10: The 4G access network entity allocates a requested resource, and sends a handover response message to the MME.

Operation 11: The MME sends a create indirect forwarding tunnel request (create indirect data forwarding tunnel request) message to the SGW.

The request includes information such as a target EPS RAN node tunnel identifier.

Operation 12: The SGW entity sends a create indirect forwarding tunnel response (create indirect data forwarding tunnel response) message to the MME.

The response message includes information such as an SGW entity tunnel identifier.

Operation 11 and operation 12 are optional operations. Operation 11 and operation 12 are performed only when the MME determines to apply indirect forwarding.

Operation 13: The MME sends a relocation response message to the AMF entity.

The message includes the authorized APN AMBR.

Operation 14: The AMF entity sends a create indirect data forwarding tunnel request (create indirect data forwarding tunnel request) message to the SMF+PGW-C entity.

Operation 15: The SMF+PGW-C entity returns a create indirect data forwarding tunnel response (Create indirect data forwarding tunnel response) message to the AMF entity.

Operation 14 and operation 15 are optional operations.

Operation 16: The SMF+PGW-C entity initiates a session modification request message to a UPF+PGW-U entity.

Operation 17: The UPF+PGW-U entity initiates a session modification response message to the SMF+PGW-C entity.

Operation 18: The AMF entity sends a handover command message to the 5G access network entity.

The handover command message includes the authorized APN AMBR.

Operation 19: The 5G access network entity sends a handover command message to the UE.

The handover command message includes the authorized APN AMBR.

Operation 20: The UE determines an authorized UE AMBR.

For a method for calculating the authorized UE AMBR, in one embodiment, authorized UE AMBR=min{sum(authorized APN AMBRs in all DNs), subscribed UE AMBR}, that is, the authorized UE AMBR of the UE is a smaller value in the subscribed UE AMBR and a sum of the authorized APN AMBRs in all the DNs.

The function min(a, b) represents calculating a smaller value in a and b, and sum( ) is a summation function.

The subscribed UE AMBR is obtained by the MME from the UDM entity and/or the HSS entity.

Operation 21: The UE returns a handover complete message to the 4G access network entity.

The handover complete message includes the authorized UE AMBR.

Operation 22: The 4G access network entity sends a handover notify (handover notify) message to the MME.

Operation 23: The MME sends a modify bearer request message to the SGW entity.

In one embodiment, the request message includes authorized APN AMBRs.

The authorized APN AMBRs included in the request message include an uplink APN AMBR and a downlink APN AMBR.

Operation 24: The SGW entity sends a modify bearer request message to the SMF+PGW-C entity.

In one embodiment, the request message includes the authorized APN AMBRs.

Operation 25: The SMF+PGW-C entity sends a session modification request message to the UPF entity.

The request message includes the authorized APN AMBRs.

In one embodiment, for the session modification request message, reference may be made to an Sx session modification request in 4G.

Operation 26: The UPF entity sends a session modification response message to the SMF+PGW-C entity.

In one embodiment, for the session modification request message, reference may be made to an Sx session modification response in 4G.

Operation 27: The SMF+PGW-C entity sends a modify bearer response message to the SGW entity.

Operation 28: The SGW entity sends a modify bearer response message to the MME.

Operation 29: A PGW entity initiates a dedicated bearer activation (initiated dedicated bearer activation) procedure.

Through operation 1 to operation 29, the UE determines the authorized UE AMBR of the UE, and sends the determined authorized UE AMBR of the UE to the 4G access network entity, so that the 4G access network entity controls the UE AMBR, and specifically, a base station in the 4G access network entity controls the UE AMBR. The SMF+PGW-C entity determines the authorized APN AMBR, and sends the determined authorized APN AMBR to the UE and the PGW entity, so that in an uplink direction, the UE controls the APN AMBR, and the PGW entity performs check, and in a downlink direction, the PGW entity controls the APN AMBR.

Embodiment 6

Figures 1, 7F:
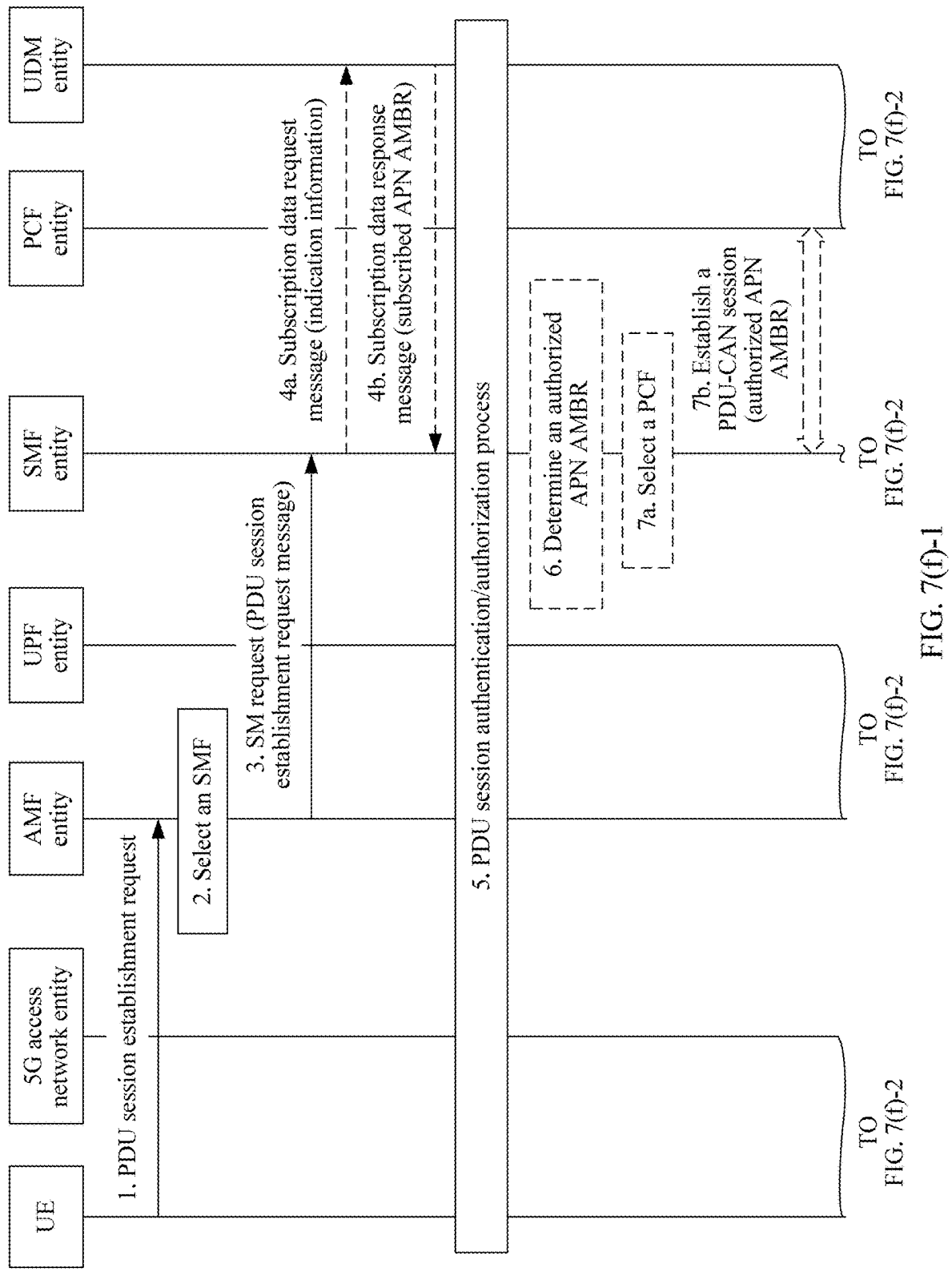
Figures 3, 7F:
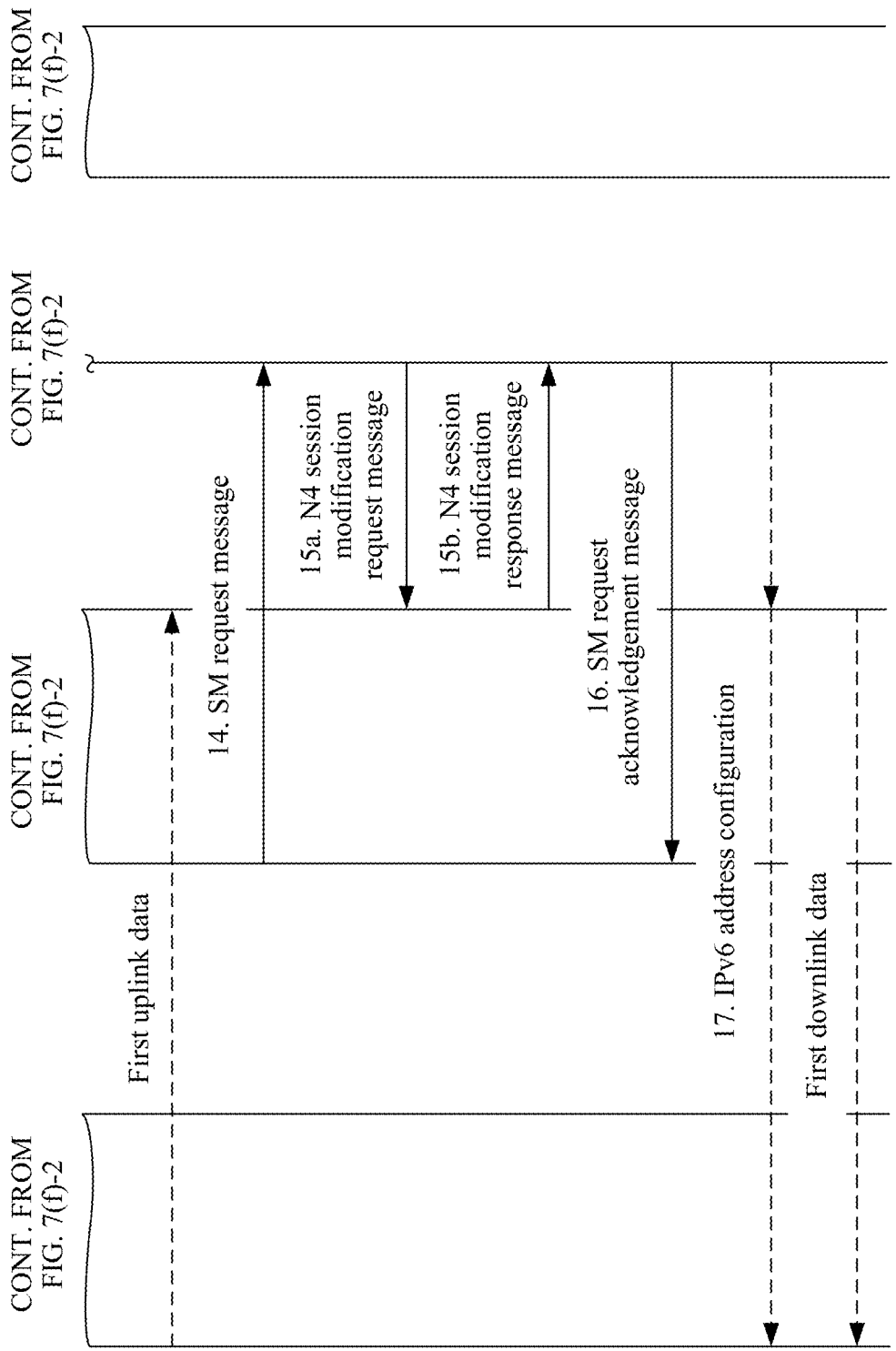

FIG. 7(f)-1 to FIG. 7(f)-3 are a schematic flowchart of another parameter determining method according to this application. It should be noted that the embodiment shown in FIG. 7(f)-1 to FIG. 7(f)-3 differs from Embodiment 1 to Embodiment 5 in that in Embodiment 6, an authorized APN AMBR is determined in a process in which UE establishes a connection to 5G, and an authorized UE AMBR is still determined in a process in which the UE is handed over from a 5GS to an EPS.

The following describes in detail a process of determining an authorized APN AMBR. In this embodiment, an SMF+PGW-C entity determines an authorized APN AMBR in a DN.

A specific procedure is as follows:

Operation 1: The UE sends a PDU session establishment request message to an AMF entity.

Operation 2: The AMF entity selects an SMF entity.

Operation 3: The AMF entity sends an SM request message to the SMF entity.

The SM request carries the PDU session establishment request message.

Operation 4a: The SMF entity sends a subscription data request message to a UDM entity.

In one embodiment, the subscription data request carries indication information (indicator), used to obtain subscription information of an APN, such as a subscribed APN AMBR, from the UDM entity.

Operation 4b: The UDM entity sends a subscription data response (Subscription data Response) message to the SMF entity.

The subscription data response message carries the subscribed APN AMBR.

Operation 5: PDU session authentication/authorization process.

For this process, refer to related descriptions in the prior art. Details are not described.

Operation 6: The SMF entity determines an authorized APN AMBR.

The SMF entity obtains the authorized APN AMBR based on the subscribed APN AMBR and a local policy.

In one embodiment, the SMF entity may determine an authorized APN AMBR in each DN based on the subscribed APN AMBR and an authorized session AMBR in the DN. Authorized APN AMBR=min{sum(authorized session AMBRs in the DN), subscribed APN AMBR}, that is, an authorized APN AMBR in one DN is a smaller value in the subscribed APN AMBR and a sum of authorized session AMBRs in the DN. The subscribed APN AMBR is obtained by the SMF+PGW-C entity from a UDM entity and/or an HSS entity.

The function min(a, b) represents calculating a smaller value in a and b, and sum( ) is a summation function.

In one embodiment, a PCF entity may determine the authorized APN AMBR.

In one embodiment, the SMF entity sends the subscribed APN AMBR to the PCF entity, the PCF entity determines the authorized APN AMBR based on the subscribed APN AMBR and a policy on the PCF and/or information obtained from a user data repository (UDR), and the PCF entity sends the authorized APN AMBR to the SMF entity.

Alternatively, the SMF entity obtains the authorized APN AMBR from the PCF entity, and the authorized APN AMBR is determined by the PCF entity based on the subscribed APN AMBR and a policy on the PCF entity and/or information obtained from a UDR. The subscribed APN AMBR is obtained by the PCF entity from the UDM entity by using the SMF.

Further, In one embodiment, the SMF entity determines an APN AMBR based on an authorized session AMBR in a DN. Authorized APN AMBR=sum(authorized session AMBR in the DN).

Operation 6 is an optional operation. When a dynamic PCC architecture is deployed in a network, operation 7a and operation 7b are performed to determine an authorized APN AMBR.

Operation 7a: The SMF entity selects a PCF entity.

Operation 7b: The SMF entity establishes a PDU-CAN session with the PCF entity (PDU-CAN Session Establishment).

In other words, the PCF entity obtains the subscribed APN AMBR from the SMF entity, determines the authorized APN AMBR based on a policy, and sends the authorized APN AMBR to the SMF entity.

Operation 8: The SMF entity selects a UPF entity.

In one embodiment, if the SMF entity selects the UPF entity and does not need to obtain a related policy from the PCF entity, operation 8 may be implemented after operation 5 and before operation 7a.

In one embodiment, after operation 8, a PDU-CAN session modification procedure may be performed between the PCF entity and the SMF entity, so as to send an allocated IP address.

Operation 9a: The SMF entity sends an N4 session establishment request message to the UPF entity.

In one embodiment, the N4 session establishment request message includes the authorized APN AMBR.

Operation 9b: The UPF entity sends an N4 session establishment response message to the SMF entity.

Operation 10: The SMF entity sends an SM response message to the AMF entity.

The SM response message includes a PDU session establishment accept message, and the PDU session establishment accept message includes the authorized APN AMBR.

Operation 11: The AMF entity sends an N2 PDU session request message to a 5G access network entity.

The N2 PDU session request message includes a NAS message, and the NAS message includes the authorized APN AMBR.

Operation 12: The 5G access network entity sets up an AN-specific resource with the UE.

In addition, in this process, the 5G access network entity sends the PDU session establishment accept message to the UE, and the PDU session establishment accept message includes the authorized APN AMBR.

Operation 13: The 5G access network entity sends an N2 PDU session request acknowledgement (N2 PDU Session Request Ack) message to the AMF entity.

Operation 14: The AMF entity sends an SM request message to the SMF entity.

The SM request message includes N2 information.

Operation 15a: The SMF entity sends an N4 session modification request message to the UPF entity.

Operation 15b: The UPF entity sends an N4 session modification response message to the SMF entity.

Operation 16: The SMF entity sends an SM request acknowledgement (SM Request Ack) message to the AMF entity.

Operation 17: The SMF entity (or the UPF entity) sends an IPv6 address configuration (IPv6 Address Configuration) to the UE.

Operation 17 is an optional operation.

Through operation 1 to operation 17, the authorized APN AMBR may be determined in a process in which the UE establishes a connection to 5G In one embodiment, based on Embodiment 5, the operation of determining the authorized APN AMBR by the SMF entity in Embodiment 6 is modified into the following: The PCF entity determines the authorized APN AMBR, the AMF entity determines the authorized APN AMBR, the 5G access network entity determines the authorized APN AMBR, the UE determines the authorized APN AMBR, or the like. For details, refer to the process of determining the authorized APN AMBR in Embodiment 1 to Embodiment 5.

In one implementation, an authorized UE AMBR is determined in a process in which the UE is handed over from the 5GS to the EPS. Specifically, the authorized UE AMBR may be generated by an MME, the AMF entity, the SMF entity, the UE, or the like. In another implementation, an authorized UE AMBR is determined in the process in which the UE establishes a connection to 5G in Embodiment 5. For example, the authorized UE AMBR may be determined by the SMF entity, the UE, the 5G access network entity, the PCF entity, or the like, where authorized UE AMBR=min{sum(authorized APN AMBRs in all DNs), subscribed UE AMBR}, that is, the authorized UE AMBR of the UE is a smaller value in the subscribed UE AMBR and a sum of the authorized APN AMBRs in all the DNs.

The function min(a, b) represents calculating a smaller value in a and b, and sum( ) is a summation function.

Embodiment 7

Figures 1, 8A:
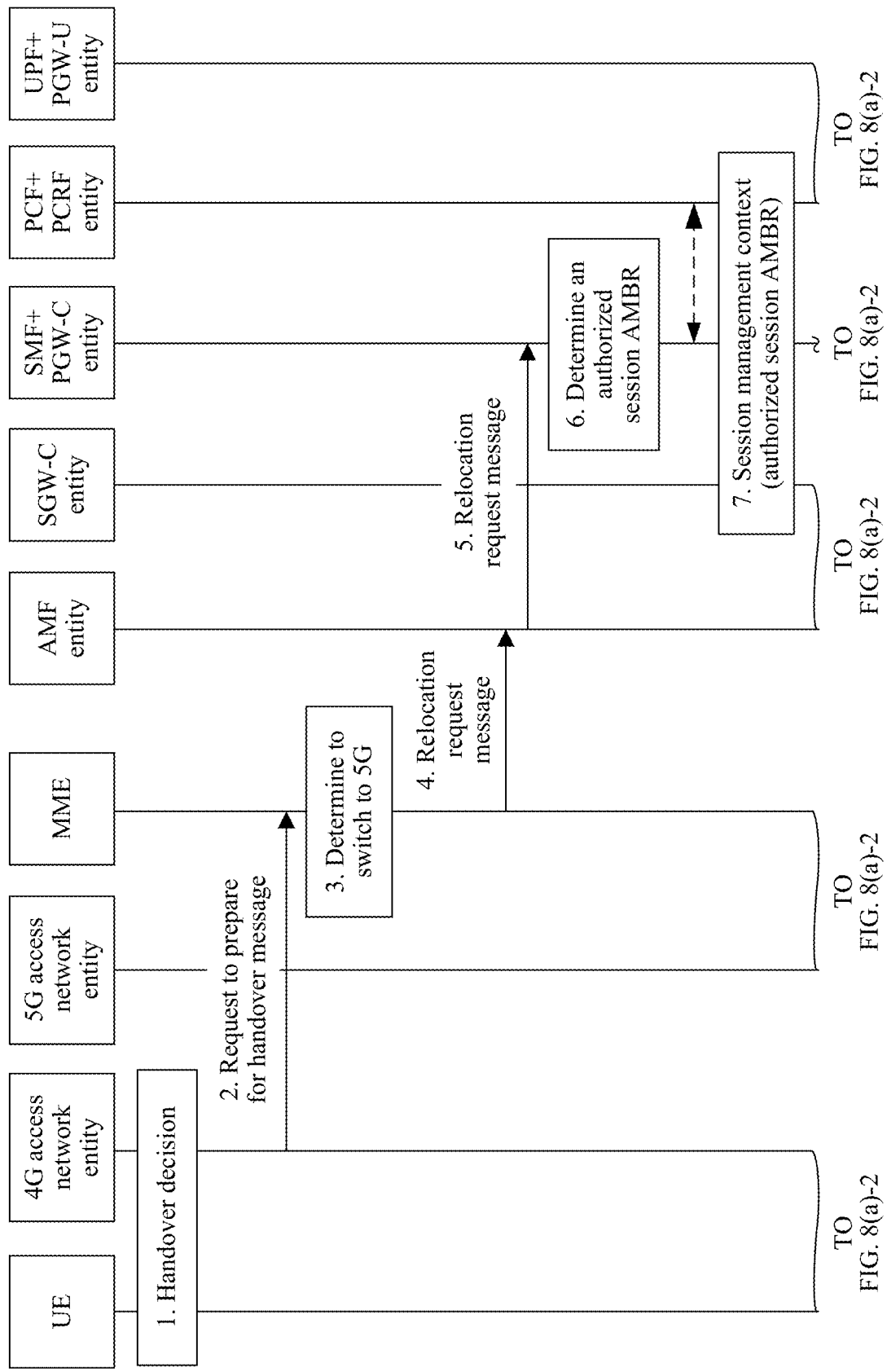
Figures 2, 8A:
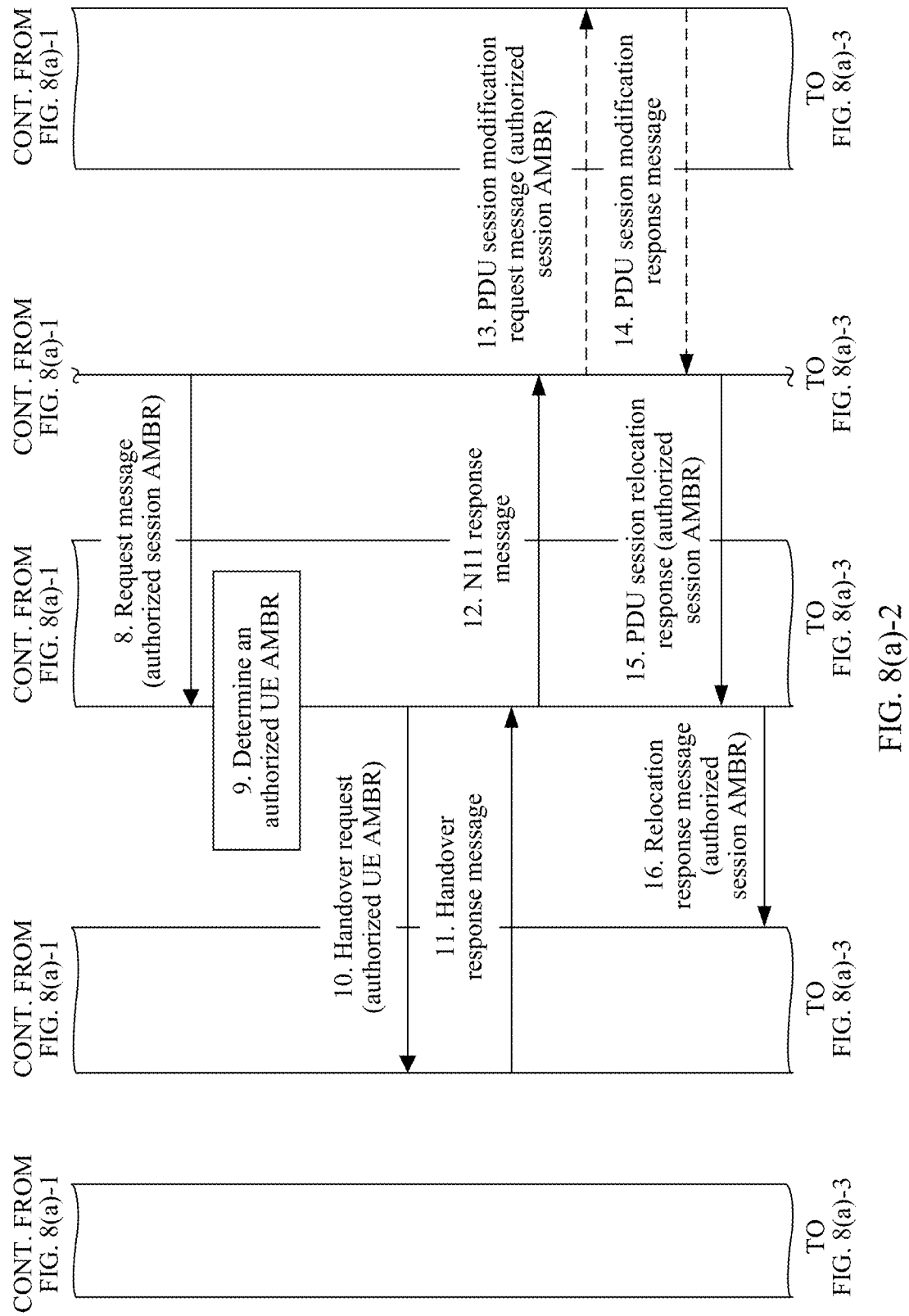
Figures 3, 8A:
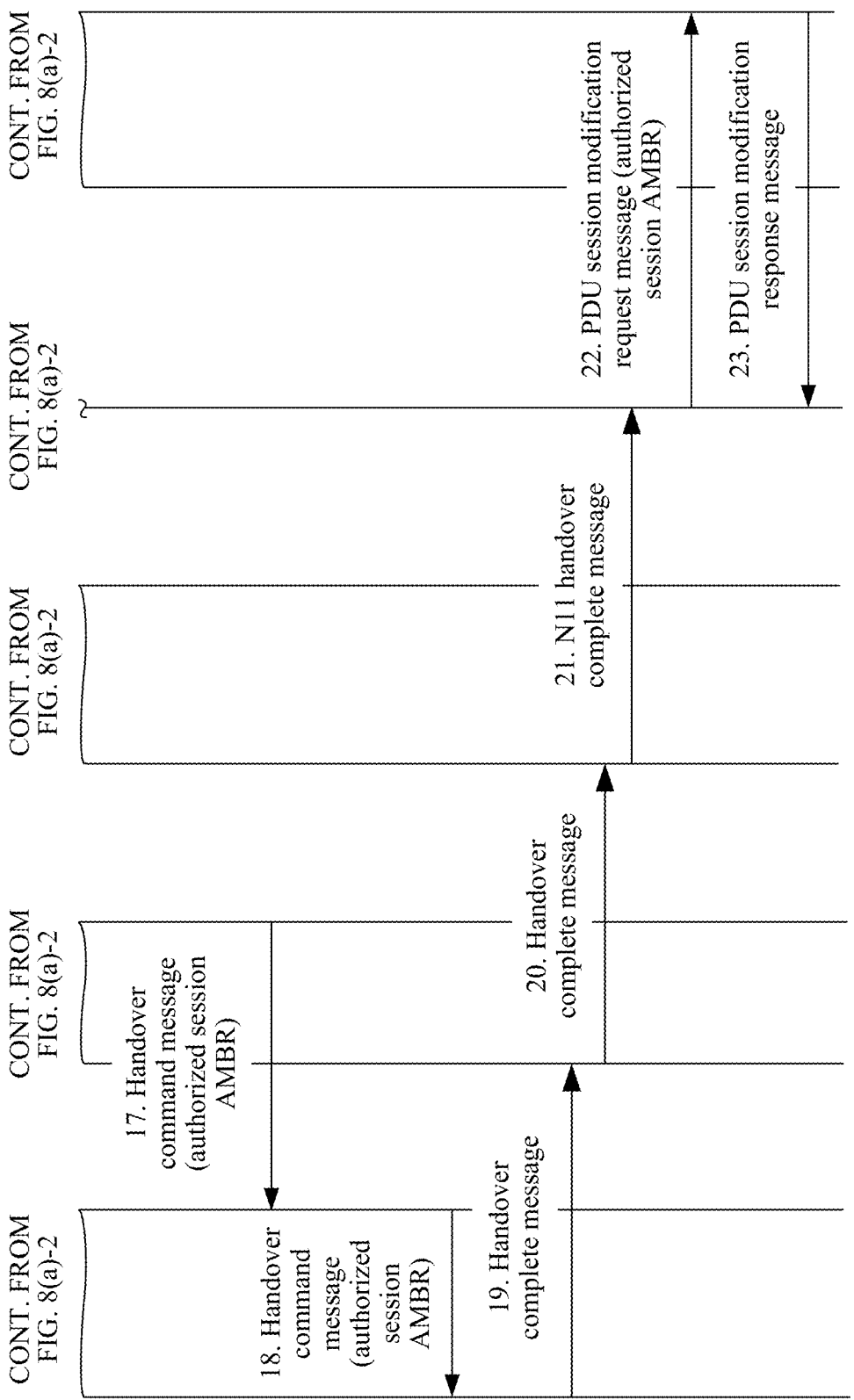

FIG. 8(a)-1 to FIG. 8(a)-3 are a schematic flowchart of another parameter determining method according to this application. The method is applied to a scenario in which UE is handed over from an EPS network to a 5GS network. To be specific, the UE accesses the network by using a 4G access network entity, to obtain a service. Because of movement of the UE, the 4G access network entity determines that a handover procedure needs to be initiated.

In this embodiment, a third communications entity is an SMF+PGW-C entity, and a fourth communications entity is an AMF entity. To be specific, the AMF entity determines an authorized UE AMBR of the UE, and the SMF+PGW-C entity determines an authorized APN AMBR in each PDN.

A specific procedure is described as follows:

Operation 1: The 4G access network entity determines that the UE needs to be handed over to a 5G access network entity.

Because of movement of the UE, the UE has moved to a 5G network. For example, the UE has moved to a base station in the 5G network. In this case, the 4G access network entity detects that a signal of the UE is relatively weak, and therefore makes a handover decision, and starts to prepare for the handover.

Operation 2: The 4G access network entity sends a request to prepare for handover message to an MME.

The request to prepare for handover message includes a node identifier of a target 5G access network entity, for example, a target gNB ID. The target gNB ID may be an ID of a wireless access point that is in the 5G network and detected by the UE and whose signal is strongest, or may be an ID of a wireless access point that is obtained from the 5G access network entity through message exchange between the 4G access network entity and the 5G access network entity. A manner of obtaining the target gNB ID is not limited in this application.

Operation 3: The MME determines, based on the received target gNB ID, to switch to a 5G system.

In addition, the MME further selects an AMF entity.

Operation 4: The MME sends a relocation request (Forward relocation request) message to the AMF entity.

The relocation request message includes a UE context in a 4G system, and specifically includes a mobility context and a session context.

Operation 5: The AMF entity sends a relocation request (Forward relocation request) message to the SMF+PGW-C entity.

The relocation request message includes a UE context related to a 4G session.

Operation 6: The SMF+PGW-C entity determines an authorized session AMBR of a session.

The authorized session AMBR of the session is determined by the SMF+PGW-C entity based on a subscribed session AMBR, or an authorized APN AMBR and a quantity of PDN connections.

The following describes some methods for determining the authorized session AMBR.

Method 1

The SMF+PGW-C entity uses, as a value of each authorized session AMBR of an APN, a value obtained by dividing an authorized APN AMBR of the APN by a quantity of PDN connections in the APN, that is, authorized session AMBR=authorized APN AMBR/quantity of PDN connections in the APN.

For example, if an authorized APN AMBR of an APN is 100, and a quantity of PDN connections in the APN is 5, each authorized session AMBR is 100/5=20.

Method 2

The SMF+PGW-C entity sets a value of an authorized session AMBR by proportion based on an authorized APN AMBR of an APN, a quantity of PDN connections in the APN, and an attribute of each PDN connection.

For example, if an authorized APN AMBR of an APN is 100, and a quantity of PDN connections in the APN is 5, based on attributes, the first authorized session AMBR may be set to 18, the second authorized session AMBR may be set to 21, the third authorized session AMBR may be set to 9, the fourth authorized session AMBR may be set to 29, and the fifth authorized session AMBR may be set to 23.

Method 3

The SMF+PGW-C entity determines the authorized session AMBR based on the subscribed session AMBR and a local policy. The subscribed session AMBR is obtained by the SMF+PGW-C entity from a UDM entity.

In an alternative method, operation 6 may be replaced by the following: A PCF+PCRF entity (that is, the third communications entity is a PCF+PCRF entity) determines an authorized APN AMBR.

Method 4

The SMF+PGW-C entity sends the subscribed session AMBR to a PCF+PCRF entity, the PCF+PCRF entity (that is, the PCF+PCRF entity is the third communications entity) determines the authorized session AMBR based on the subscribed session AMBR and a policy on the PCF+PCRF entity and/or information obtained from a UDR, and the PCF+PCRF entity sends the authorized session AMBR to the SMF+PGW-C entity.

Method 5

The SMF+PGW-C entity obtains the authorized session AMBR from a PCF+PCRF entity, the authorized session AMBR is determined by the PCF+PCRF entity (that is, the PCF+PCRF entity is the third communications entity) based on the subscribed session AMBR and a local policy on the PCF+PCRF (or a policy obtained from a UDR), and the subscribed session AMBR is obtained by the PCF+PCRF entity from a UDM entity. Further, the subscribed session AMBR is obtained by the PCF+PCRF from the UDM entity by using the SMF+PGW-C, in other words, the SMF+PGW-C receives the authorized session AMBR from the UDM, and sends the authorized session AMBR to the PCF+PCRF.

Operation 7: The SMF+PGW-C entity establishes a session management context (SM context).

The session management context includes the authorized session AMBR.

Operation 8: The SMF+PGW-C entity sends a request message to the AMF entity.

For example, the request message may be an N11 request message, and the request message includes the authorized session AMBR.

Operation 9: The AMF entity determines an authorized UE AMBR.

The AMF entity determines the authorized UE AMBR based on a subscribed UE AMBR and received authorized session AMBRs of all sessions, that is, UE AMBR=min(sum (authorized session AMBRs of all the sessions), subscribed UE AMBR).

Operation 10: The AMF entity sends a handover request message to the 5G access network entity.

The handover request message includes the authorized UE AMBR.

Operation 11: The 5G access network entity sends a handover response message to the AMF entity.

The message includes information about a QoS flow for which a resource is successfully allocated.

Operation 12: The AMF entity sends an N11 response message to the SMF.

Operation 13: The SMF+PGW-C entity sends a PDU session modification request (PDU session modification request) message to a UPF+PGW-U entity.

In one embodiment, the request message includes an authorized session AMBR of a session. Further, the authorized session AMBR is an authorized session AMBR of a successfully switched session.

Operation 14: The UPF+PGW-U entity sends a PDU session modification response message to the SMF+PGW-C entity.

Operation 15: The SMF+PGW-C entity sends a response for the PDU session relocation message to the AMF entity.

In one embodiment, the response message includes the authorized session AMBR of the session. Further, the authorized session AMBR is an authorized session AMBR of a successfully switched session.

Operation 16: The AMF entity sends a relocation response (forward relocation response) message to the MME, where the message includes the authorized session AMBR of the session.

Operation 17: The MME sends a handover command message to the 4G access network entity.

The message includes the authorized session AMBR of the session.

Operation 18: The 4G access network entity sends a handover command (handover command) message to the UE.

The message includes the authorized session AMBR of the session.

Operation 19: The UE sends a handover complete message to the 5G access network entity.

Operation 20: The 5G access network entity sends a handover complete message to the AMF entity.

Operation 21: The AMF entity sends an N11 handover complete message to the SMF entity.

Operation 22: The SMF+PGW-C entity sends a PDU session modification request message to the UPF+PGW-U entity.

In one embodiment, the PDU session modification request message includes the authorized session AMBR, and further, the authorized session AMBR is an authorized session AMBR of a successfully switched session.

Operation 23: The UPF+PGW-U entity sends a PDU session modification response message to the SMF+PGW-C entity.

Operation 13 and operation 14 are optional operations. When there is operation 13 and the authorized session AMBR is carried in operation 13, the authorized session AMBR is not carried in operation 22; or when there is no operation 13 or the authorized session AMBR is not carried in operation 13, the authorized session AMBR is carried in operation 22.

Through operation 1 to operation 23, the AMF entity determines the authorized UE AMBR of the UE, and sends the determined authorized UE AMBR of the UE to the 5G access network entity, so that the 5G access network entity controls the UE AMBR, and specifically, a base station in the 5G access network entity controls the UE AMBR. The SMF+PGW-C entity determines the authorized session AMBR, and sends the determined authorized session AMBR to the UE and the UPF entity, so that in an uplink direction, the UE controls the authorized session AMBR, and the UPF entity performs check, and in a downlink direction, the UPF entity controls the authorized session AMBR.

Embodiment 8

Figures 1, 8B:
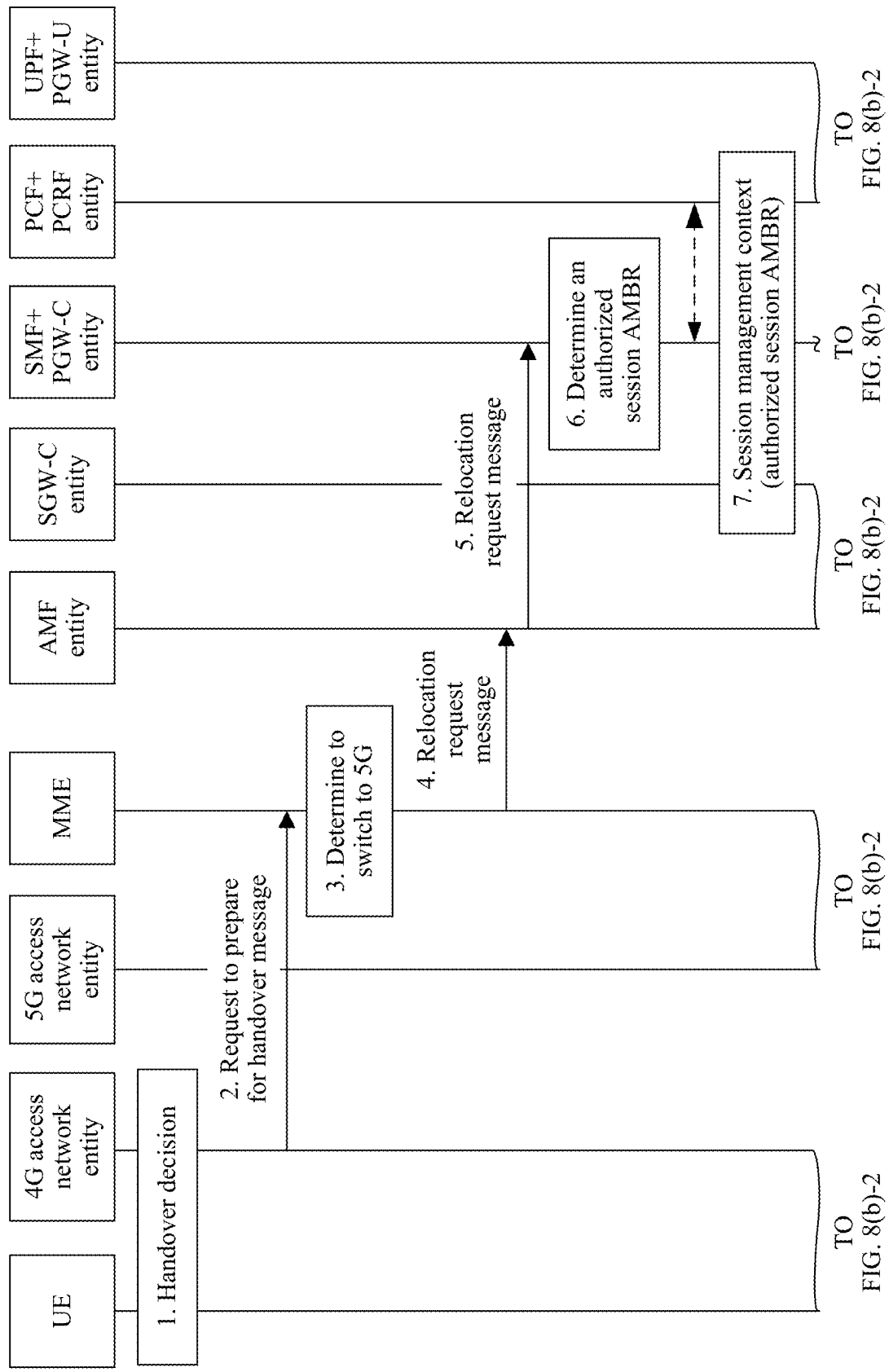
Figures 2, 8B:
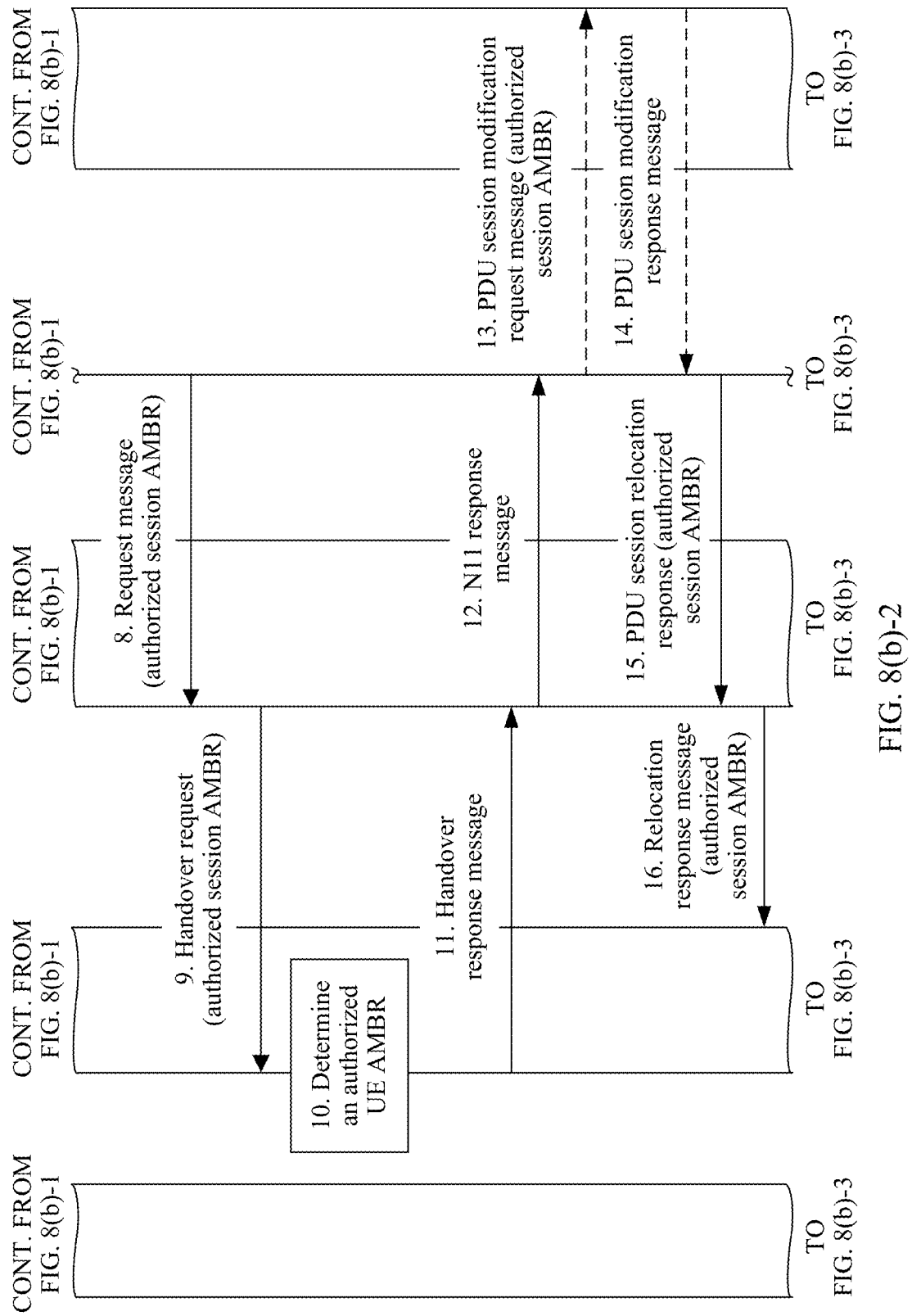
Figures 3, 8B:
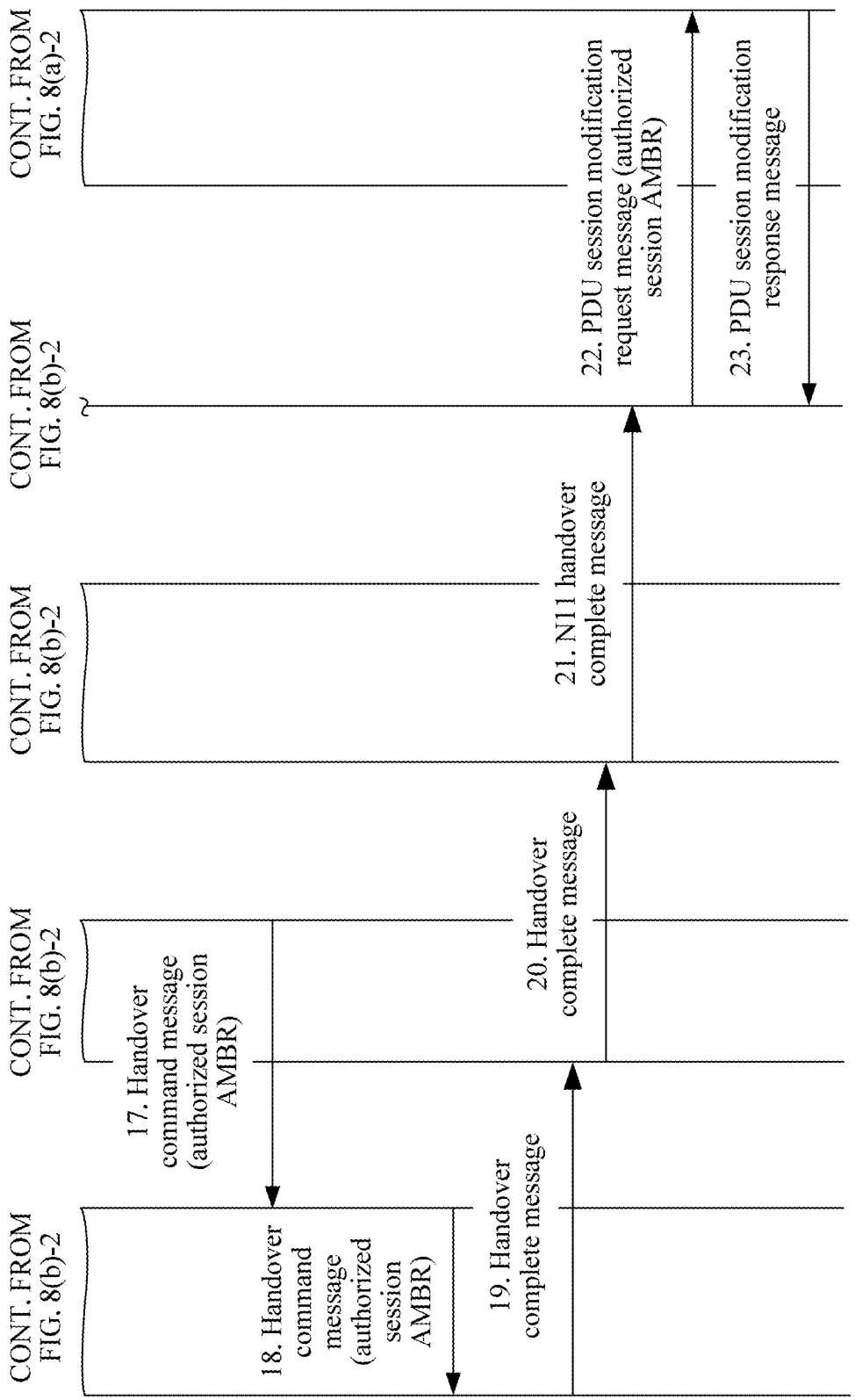

FIG. 8(b)-1 to FIG. 8(b)-3 are a schematic flowchart of another parameter determining method according to this application. The method is applied to a scenario in which UE is handed over from an EPS network to a 5GS network. To be specific, the UE accesses the network by using a 4G access network entity, to obtain a service. Because of movement of the UE, the 4G access network entity determines that a handover procedure needs to be initiated.

In this embodiment, a third communications entity is an SMF+PGW-C entity, and a fourth communications entity is a 5G access network entity. To be specific, the 5G access network entity determines an authorized UE AMBR of the UE, and the SMF+PGW-C entity determines an authorized APN AMBR in each PDN.

A specific procedure is described as follows:

Operation 1: The 4G access network entity determines that the UE needs to be handed over to the 4G access network entity.

Because of movement of the UE, the UE has moved to a 5G network. For example, the UE has moved to a base station in the 5G network. In this case, the 4G access network entity detects that a signal of the UE is relatively weak, and therefore makes a handover decision (handover decision), and starts to prepare for the handover.

Operation 2: The 4G access network entity sends a request to prepare for handover (request to prepare for handover) message to an MME.

The request to prepare for handover message includes a node identifier of a target 5G access network entity, for example, a target gNB ID. The target gNB ID may be an ID of a wireless access point that is in the 5G network and detected by the UE and whose signal is strongest, or may be an ID of a wireless access point that is obtained from the 5G access network entity through message exchange between the 4G access network entity and the 5G access network entity. A manner of obtaining the target gNB ID is not limited in this application.

Operation 3: The MME determines, based on the received target gNB ID, to switch to a 5G system.

In addition, the MME further selects an AMF entity.

Operation 4: The MME sends a relocation request (Forward relocation request) message to the AMF entity.

The relocation request message includes a UE context in a 4G system, and specifically includes a mobility context and a session context.

Operation 5: The AMF entity sends a relocation handover request (Forward relocation request) message to the SMF+PGW-C entity.

The relocation handover request message includes a UE context related to a 4G session.

Operation 6: The SMF+PGW-C entity determines an authorized session AMBR of a session.

The authorized session AMBR of the session is determined by the SMF+PGW-C entity based on a subscribed session AMBR, or an authorized APN AMBR and a quantity of PDN connections.

There are many methods for determining the authorized session AMBR. Refer to the five methods described in Embodiment 7. Details are not described herein again.

Operation 7: The SMF+PGW-C entity establishes a session management context (SM context).

The session management context includes the authorized session AMBR.

Operation 8: The SMF+PGW-C entity sends a request message to the AMF entity.

For example, the request message may be an N11 request message, and the request message includes the authorized session AMBR.

Operation 9: The AMF entity sends a handover request message to the 5G access network entity.

The handover request message includes the authorized session AMBR.

Operation 10: The 5G access network entity determines an authorized UE AMBR.

The 5G access network entity determines the authorized UE AMBR based on a subscribed UE AMBR and received authorized session AMBRs of all sessions, that is, authorized UE AMBR=min(sum(authorized session AMBRs of all the sessions), subscribed UE AMBR).

Operation 11: The 5G access network entity sends a handover response message to the AMF entity.

The message includes information about a QoS flow for which a resource is successfully allocated.

Operation 12: The AMF entity sends an N11 response message to the SMF.

Operation 13: The SMF+PGW-C entity sends a PDU session modification request message to a UPF+PGW-U entity.

In one embodiment, the request message includes an authorized session AMBR of a session. Further, the authorized session AMBR is an authorized session AMBR of a successfully switched session.

Operation 14: The UPF+PGW-U entity sends a PDU session modification response message to the SMF+PGW-C entity.

Operation 15: The SMF+PGW-C entity sends a response for the PDU session relocation message to the AMF entity.

The response message includes the authorized session AMBR of the session. Further, the authorized session AMBR is an authorized session AMBR of a successfully switched session.

Operation 16: The AMF entity sends a relocation response (forward relocation response) message to the MME, where the message includes the authorized session AMBR of the session. Further, the authorized session AMBR is an authorized session AMBR of a successfully switched session.

Operation 17: The MME sends a handover command message to the 4G access network entity.

The message includes the authorized session AMBR. Further, the authorized session AMBR is an authorized session AMBR of a successfully switched session.

Operation 18: The 4G access network entity sends a handover command (handover command) message to the UE.

The message includes the authorized session AMBR. Further, the authorized session AMBR is an authorized session AMBR of a successfully switched session.

Operation 19: The UE sends a handover complete message to the 5G access network entity.

Operation 20: The 5G access network entity sends a handover complete (handover complete) message to the AMF entity.

Operation 21: The AMF entity sends an N11 handover complete message to the SMF entity.

Operation 22: The SMF+PGW-C entity sends a PDU session modification request message to the UPF+PGW-U entity.

In one embodiment, the PDU session modification request message includes the authorized session AMBR. Further, the authorized session AMBR is an authorized session AMBR of a successfully switched session.

Operation 23: The UPF+PGW-U entity sends a PDU session modification response message to the SMF+PGW-C entity.

Operation 13 and operation 14 are optional operations. When there is operation 13 and the authorized session AMBR is carried in operation 13, the authorized session AMBR is not carried in operation 22; or when there is no operation 13 or the authorized session AMBR is not carried in operation 13, the authorized session AMBR is carried in operation 22.

Through operation 1 to operation 23, the 5G access network entity determines the authorized UE AMBR of the UE, and controls the UE AMBR, and specifically, a base station in the 5G access network entity controls the UE AMBR. The SMF+PGW-C entity determines the authorized session AMBR, and sends the determined authorized session AMBR to the UE and the UPF entity, so that in an uplink direction, the UE controls the authorized session AMBR, and the UPF entity performs check, and in a downlink direction, the UPF entity controls the authorized session AMBR.

Embodiment 9

Figures 1, 8C:
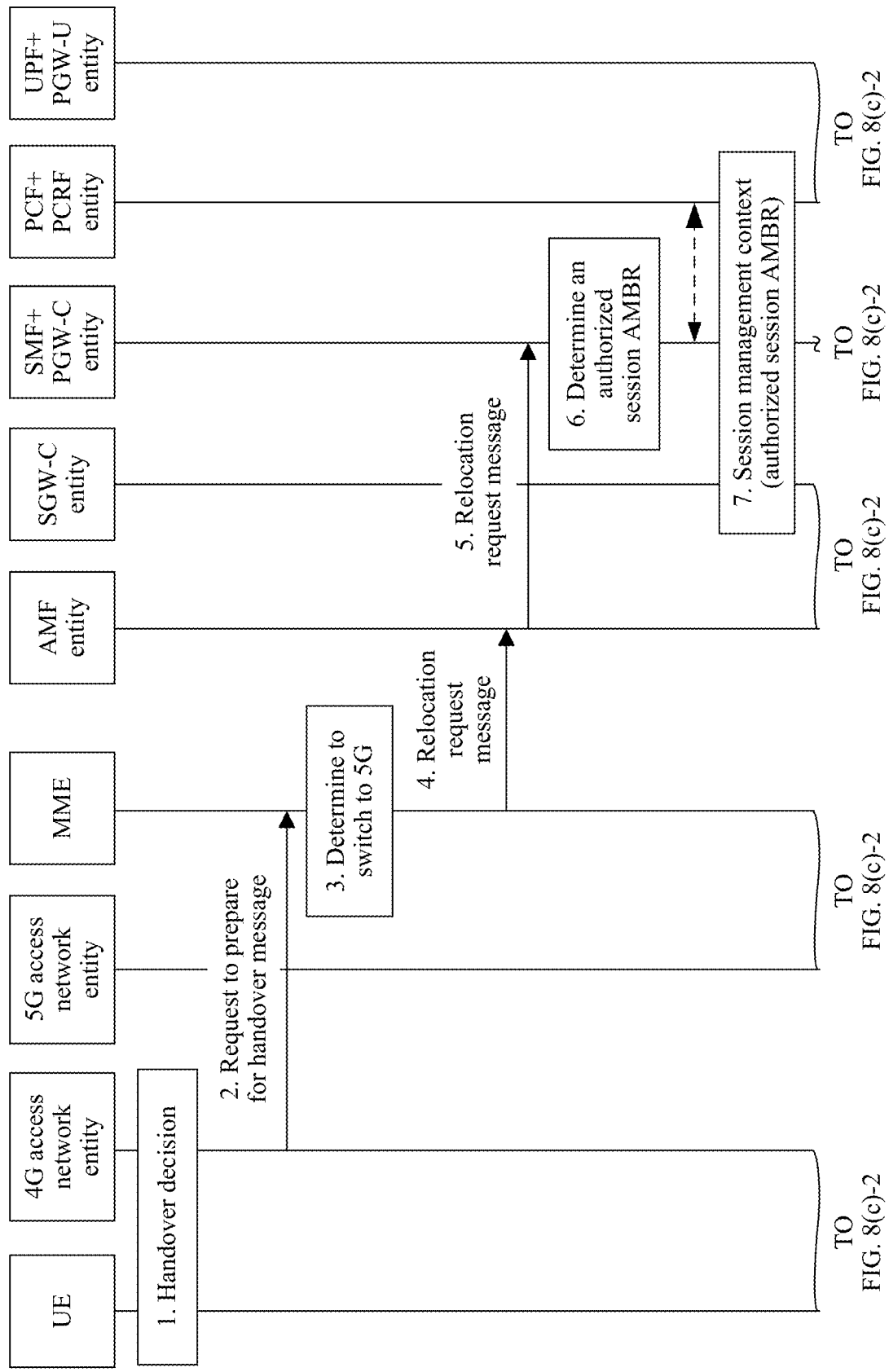
Figures 2, 8C:
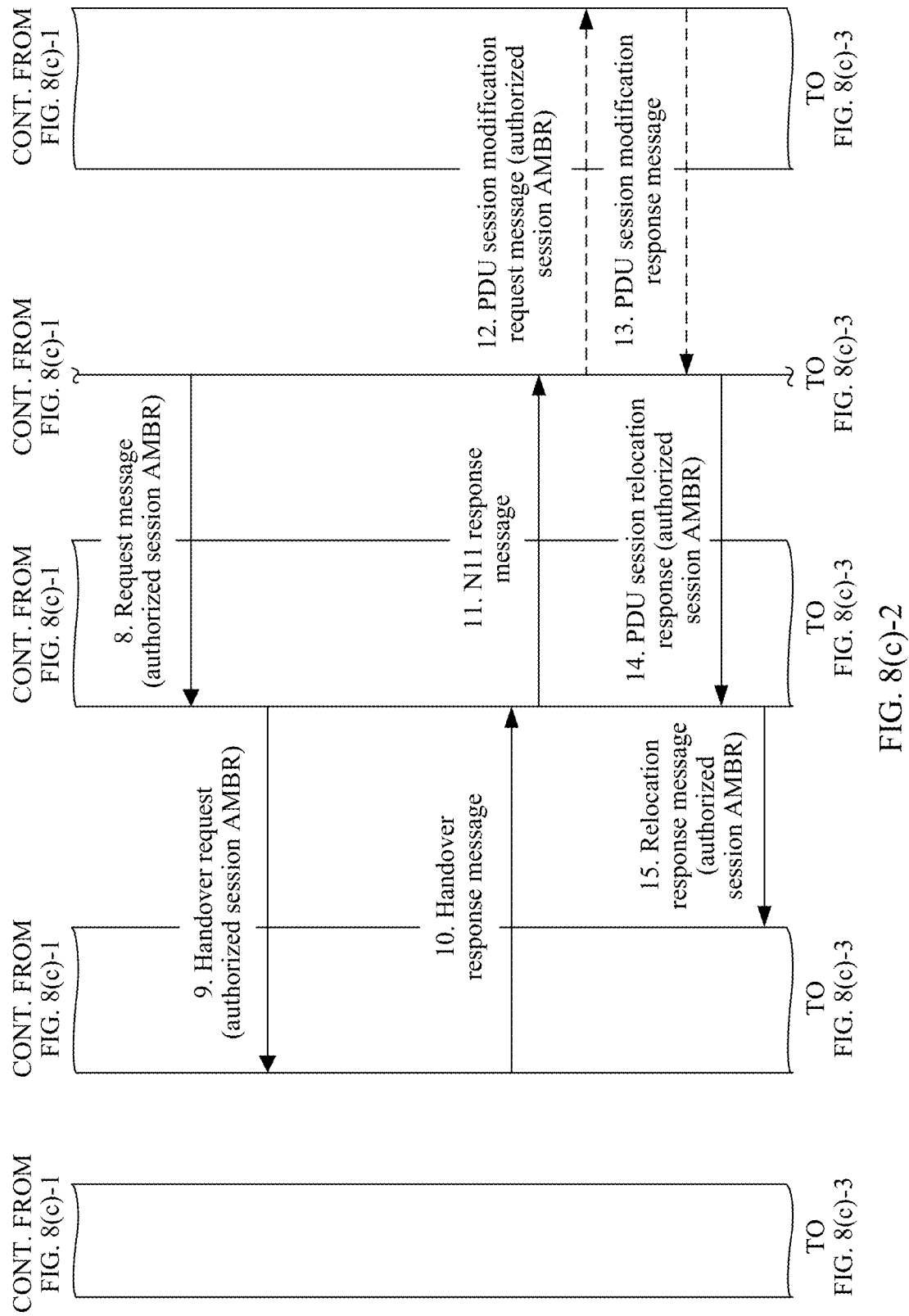
Figures 3, 8C:
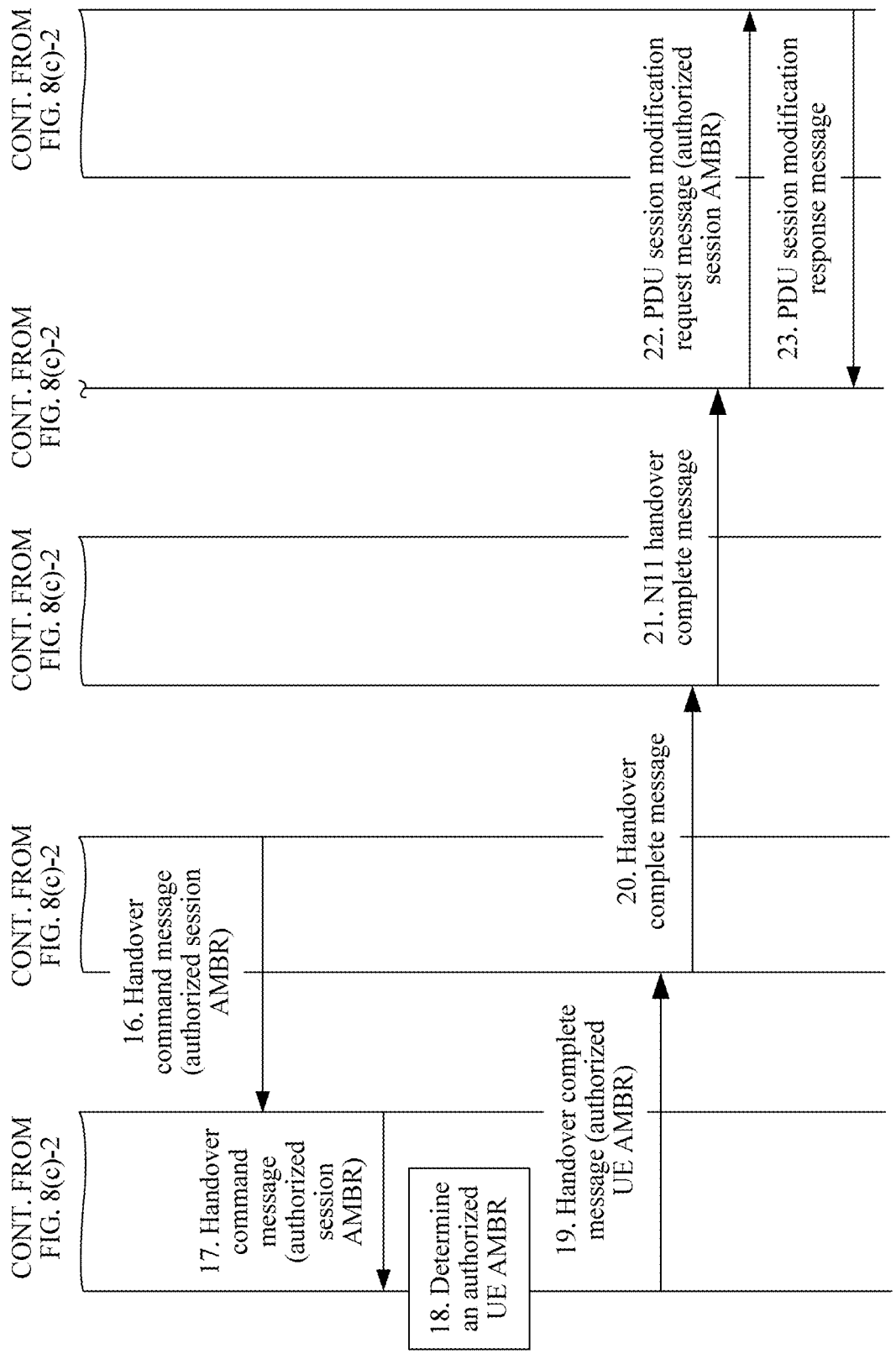

FIG. 8(c)-1 to FIG. 8(c)-3 are a schematic flowchart of another parameter determining method according to this application. The method is applied to a scenario in which UE is handed over from an EPS network to a 5GS network. To be specific, the UE accesses the network by using a 4G access network entity, to obtain a service. Because of movement of the UE, the 4G access network entity determines that a handover procedure needs to be initiated.

In this embodiment, a third communications entity is an SMF+PGW-C entity, and a fourth communications entity is UE. To be specific, a 5G access network entity determines an authorized UE AMBR of the UE, and the SMF+PGW-C entity determines an authorized APN AMBR in each PDN.

A specific procedure is described as follows:

Operation 1: The 4G access network entity determines that the UE needs to be handed over to the 4G access network entity.

Because of movement of the UE, the UE has moved to a 5G network. For example, the UE has moved to a base station in the 5G network. In this case, the 4G access network entity detects that a signal of the UE is relatively weak, and therefore makes a handover decision, and starts to prepare for the handover.

Operation 2: The 4G access network entity sends a request to prepare for handover message to an MME.

The request to prepare for handover message includes a node identifier of a target 5G access network entity, for example, a target gNB ID. The target gNB ID may be an ID of a wireless access point that is in the 5G network and detected by the UE and whose signal is strongest, or may be an ID of a wireless access point that is obtained from the 5G access network entity through message exchange between the 4G access network entity and the 5G access network entity. A manner of obtaining the target gNB ID is not limited in this application.

Operation 3: The MME determines, based on the received target gNB ID, to switch to a 5G system.

In addition, the MME further selects an AMF entity.

Operation 4: The MME sends a relocation request (Forward relocation request) message to the AMF entity.

The relocation request message includes a UE context in a 4G system, and specifically includes a mobility context and a session context.

Operation 5: The AMF entity sends a relocation handover request (Forward relocation request) message to the SMF+PGW-C entity.

The relocation handover request message includes a UE context related to a 4G session.

Operation 6: The SMF+PGW-C entity determines an authorized session AMBR of a session.

The authorized session AMBR of the session is determined by the SMF+PGW-C entity based on a subscribed session AMBR, or an authorized APN AMBR and a quantity of PDN connections.

There are many methods for determining the authorized session AMBR. Refer to the five methods described in Embodiment 5. Details are not described herein again.

Operation 7: The SMF+PGW-C entity establishes a session management context (SM context).

The session management context includes the authorized session AMBR.

Operation 8: The SMF+PGW-C entity sends a request message to the AMF entity.

For example, the request message may be an N11 request message, and the request message includes the authorized session AMBR.

Operation 9: The AMF entity sends a handover request message to the 5G access network entity.

Operation 10: The 5G access network entity sends a handover response (handover response) message to the AMF entity.

The message includes information about a QoS flow for which a resource is successfully allocated.

Operation 11: The AMF entity sends an N11 response message to the SMF.

Operation 12: The SMF+PGW-C entity sends a PDU session modification request message to a UPF+PGW-U entity.

In one embodiment, the request message includes an authorized session AMBR of a session. Further, the authorized session AMBR is an authorized session AMBR of a successfully switched session.

Operation 13: The UPF+PGW-U entity sends a PDU session modification response message to the SMF+PGW-C entity.

Operation 14: The SMF+PGW-C entity sends a response for the PDU session relocation message to the AMF entity.

The response message includes the authorized session AMBR of the session. Further, the authorized session AMBR is an authorized session AMBR of a successfully switched session.

Operation 15: The AMF entity sends a relocation response (forward relocation response) message to the MME, where the message includes the authorized session AMBR of the session.

Operation 16: The MME sends a handover command message to the 4G access network entity.

The message includes the authorized session AMBR. Further, the authorized session AMBR is an authorized session AMBR of a successfully switched session.

Operation 17: The 4G access network entity sends a handover command message to the UE.

The message includes the authorized session AMBR. Further, the authorized session AMBR is an authorized session AMBR of a successfully switched session.

Operation 18: The UE determines an authorized UE AMBR. Further, the authorized session AMBR is an authorized session AMBR of a successfully switched session.

The UE determines the authorized UE AMBR based on a subscribed UE AMBR and received authorized session AMBRs of all sessions, that is, authorized UE AMBR=min (sum(authorized session AMBRs of all the sessions), subscribed UE AMBR).

Operation 19: The UE sends a handover complete message to the 5G access network entity.

The message includes the authorized UE AMBR. Further, the authorized session AMBR is an authorized session AMBR of a successfully switched session.

Operation 20: The 5G access network entity sends a handover complete (handover complete) message to the AMF entity.

Operation 21: The AMF entity sends an N11 handover complete message to the SMF entity.

Operation 22: The SMF+PGW-C entity sends a PDU session modification request message to the UPF+PGW-U entity.

In one embodiment, the PDU session modification request message includes the authorized session AMBR. Further, the authorized session AMBR is an authorized session AMBR of a successfully switched session.

Operation 23: The UPF+PGW-U entity sends a PDU session modification response message to the SMF+PGW-C entity.

Operation 12 and operation 13 are optional operations. When there is operation 12 and the authorized session AMBR is carried in operation 12, the authorized session AMBR is not carried in operation 22; or when there is no operation 12 or the authorized session AMBR is not carried in operation 12, the authorized session AMBR is carried in operation 22.

Through operation 1 to operation 23, the UE determines the authorized UE AMBR of the UE, and sends the determined authorized UE AMBR of the UE to the 5G access network entity, so that the 5G access network entity controls the UE AMBR, and specifically, a base station in the 5G access network entity controls the UE AMBR. The SMF+PGW-C entity determines the authorized session AMBR, and sends the determined authorized session AMBR to the UE and the UPF entity, so that in an uplink direction, the UE controls the authorized session AMBR, and the UPF entity performs check, and in a downlink direction, the UPF entity controls the authorized session AMBR.

Embodiment 10

Figures 2, 8D:
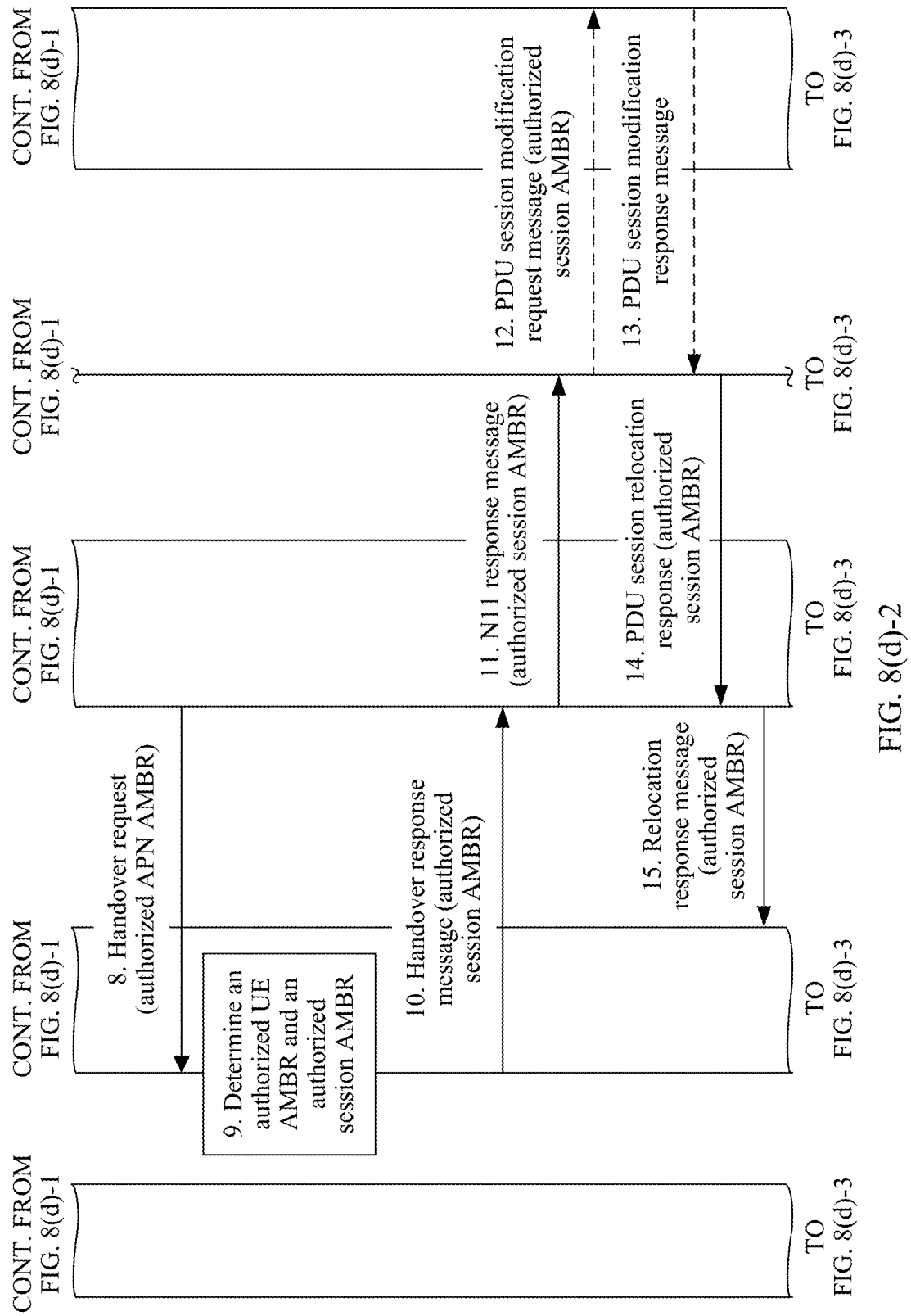
Figures 3, 8D:
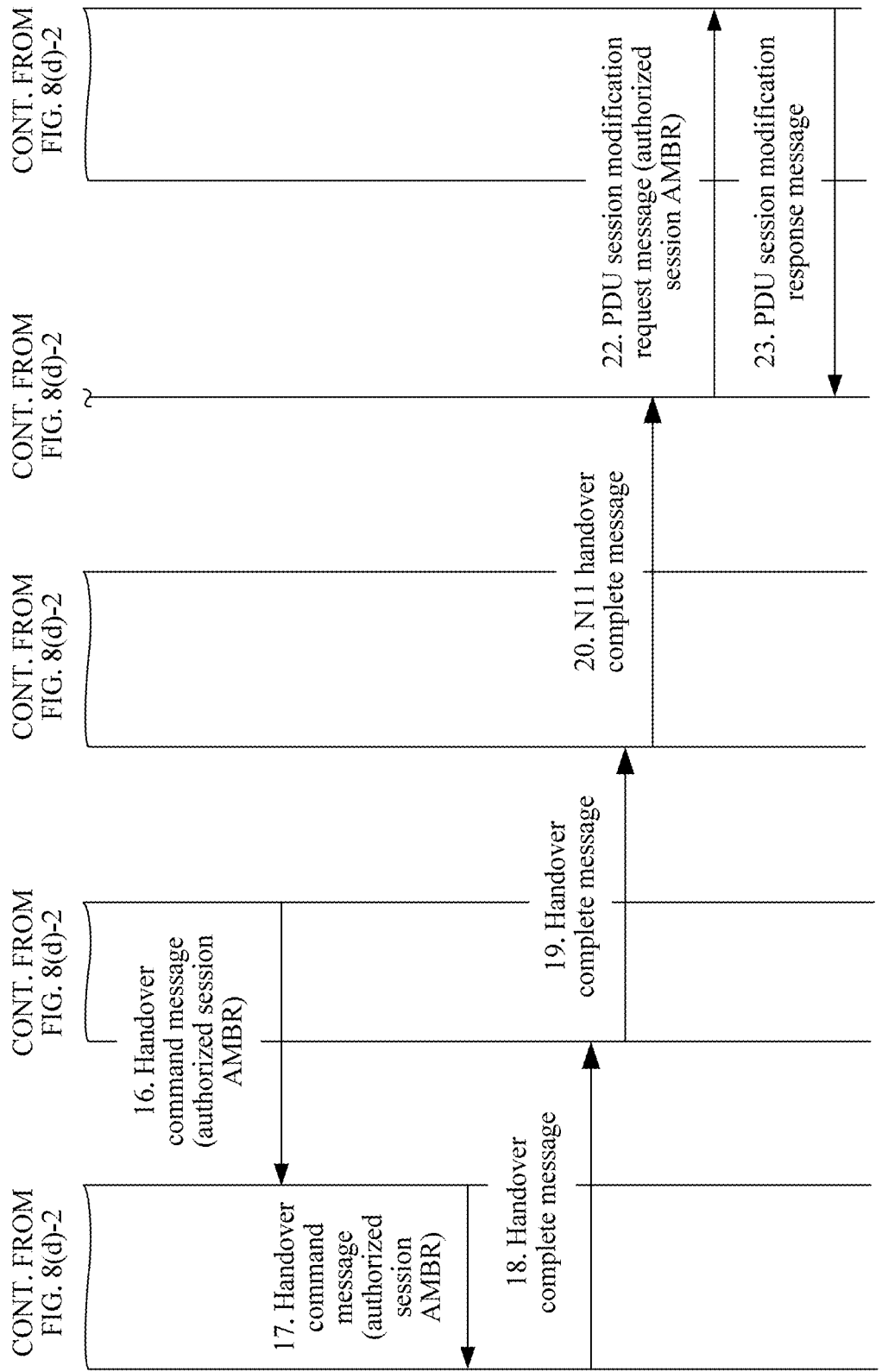

FIG. 8(d)-1 to FIG. 8(d)-3 are a schematic flowchart of another parameter determining method according to this application. The method is applied to a scenario in which UE is handed over from an EPS network to a 5GS network. To be specific, the UE accesses the network by using a 4G access network entity, to obtain a service. Because of movement of the UE, the 4G access network entity determines that a handover procedure needs to be initiated.

In this embodiment, a third communications entity is a 5G access network entity, and a fourth communications entity is a 5G access network entity. To be specific, the 5G access network entity determines an authorized UE AMBR of the UE and an authorized APN AMBR in each PDN.

A specific procedure is described as follows:

Operation 1: The 4G access network entity determines that the UE needs to be handed over to the 4G access network entity.

Because of movement of the UE, the UE has moved to a 5G network. For example, the UE has moved to a base station in the 5G network. In this case, the 4G access network entity detects that a signal of the UE is relatively weak, and therefore makes a handover decision, and starts to prepare for the handover.

Operation 2: The 4G access network entity sends a request to prepare for handover message to an MME.

The request to prepare for handover message includes a node identifier of a target 5G access network entity, for example, a target gNB ID. The target gNB ID may be an ID of a wireless access point that is in the 5G network and detected by the UE and whose signal is strongest, or may be an ID of a wireless access point that is obtained from the 5G access network entity through message exchange between the 4G access network entity and the 5G access network entity. A manner of obtaining the target gNB ID is not limited in this application.

Operation 3: The MME determines, based on the received target gNB ID, to switch to a 5G system.

In addition, the MME further selects an AMF entity.

Operation 4: The MME sends a relocation request (Forward relocation request) message to the AMF entity.

The relocation request message includes a UE context in a 4G system, and specifically includes a mobility context and a session context.

Operation 5: The AMF entity sends a relocation handover request (Forward relocation request) message to an SMF+PGW-C entity.

The relocation handover request message includes a UE context related to a 4G session.

Operation 6: The SMF+PGW-C entity establishes a session management context (SM context).

The session management context includes an authorized APN AMBR.

Operation 7: The SMF+PGW-C entity sends a request message to the AMF entity.

For example, the request message may be an N11 request message, and the request message includes the authorized APN AMBR.

Operation 8: The AMF entity sends a handover request message to the 5G access network entity.

The handover request message includes the authorized APN AMBR.

Operation 9: The 5G access network entity determines an authorized UE AMBR and an authorized session AMBR of a session.

The 5G access network entity determines the authorized session AMBR of the session based on the authorized APN AMBR and a quantity of PDN connections. For details, refer to the foregoing descriptions.

The 5G access network entity determines the authorized UE AMBR based on a subscribed UE AMBR and authorized session AMBRs of all sessions, that is, authorized UE AMBR=min(sum(authorized session AMBRs of all the sessions), subscribed UE AMBR).

Operation 10: The 5G access network entity sends a handover response message to the AMF entity.

The message includes information about a QoS flow for which a resource is successfully allocated and includes the authorized session AMBR.

Operation 11: The AMF entity sends an N11 response message to the SMF.

The N11 response message includes the authorized session AMBR.

Operation 12: The SMF+PGW-C entity sends a PDU session modification request message to a UPF+PGW-U entity.

The request message includes an authorized session AMBR of a session. Further, the authorized session AMBR is an authorized session AMBR of a successfully switched session.

Operation 13: The UPF+PGW-U entity sends a PDU session modification response message to the SMF+PGW-C entity.

Operation 14: The SMF+PGW-C entity sends a response for the PDU session relocation message to the AMF entity.

The response message includes the authorized session AMBR of the session. Further, the authorized session AMBR is an authorized session AMBR of a successfully switched session.

Operation 15: The AMF entity sends a relocation response (forward relocation response) message to the MME, where the message includes the authorized session AMBR of the session. Further, the authorized session AMBR is an authorized session AMBR of a successfully switched session.

Operation 16: The MME sends a handover command message to the 4G access network entity.

The message includes the authorized session AMBR. Further, the authorized session AMBR is an authorized session AMBR of a successfully switched session.

Operation 17: The 4G access network entity sends a handover command (handover command) message to the UE.

The message includes the authorized session AMBR. Further, the authorized session AMBR is an authorized session AMBR of a successfully switched session.

Operation 18: The UE sends a handover complete message to the 5G access network entity.

Operation 19: The 5G access network entity sends a handover complete message to the AMF entity.

Operation 20: The AMF entity sends an N11 handover complete message to the SMF entity.

Operation 22: The SMF+PGW-C entity sends a PDU session modification request message to the UPF+PGW-U entity.

In one embodiment, the PDU session modification request message includes the authorized session AMBR. Further, the authorized session AMBR is an authorized session AMBR of a successfully switched session.

Operation 23: The UPF+PGW-U entity sends a PDU session modification response message to the SMF+PGW-C entity.

Operation 12 and operation 13 are optional operations. When there is operation 13 and the authorized session AMBR is carried in operation 13, the authorized session AMBR is not carried in operation 22; or when there is no operation 13 or the authorized session AMBR is not carried in operation 13, the authorized session AMBR is carried in operation 22.

Through operation 1 to operation 23, the 5G access network entity determines the authorized UE AMBR of the UE, and controls the UE AMBR, and specifically, a base station in the 5G access network entity controls the UE AMBR. The 5G access network entity determines the authorized session AMBR, and sends the determined authorized session AMBR to the UE and the UPF entity, so that in an uplink direction, the UE controls the authorized session AMBR, and the UPF entity performs check, and in a downlink direction, the UPF entity controls the authorized session AMBR.

Embodiment 11

Figures 1, 8E:
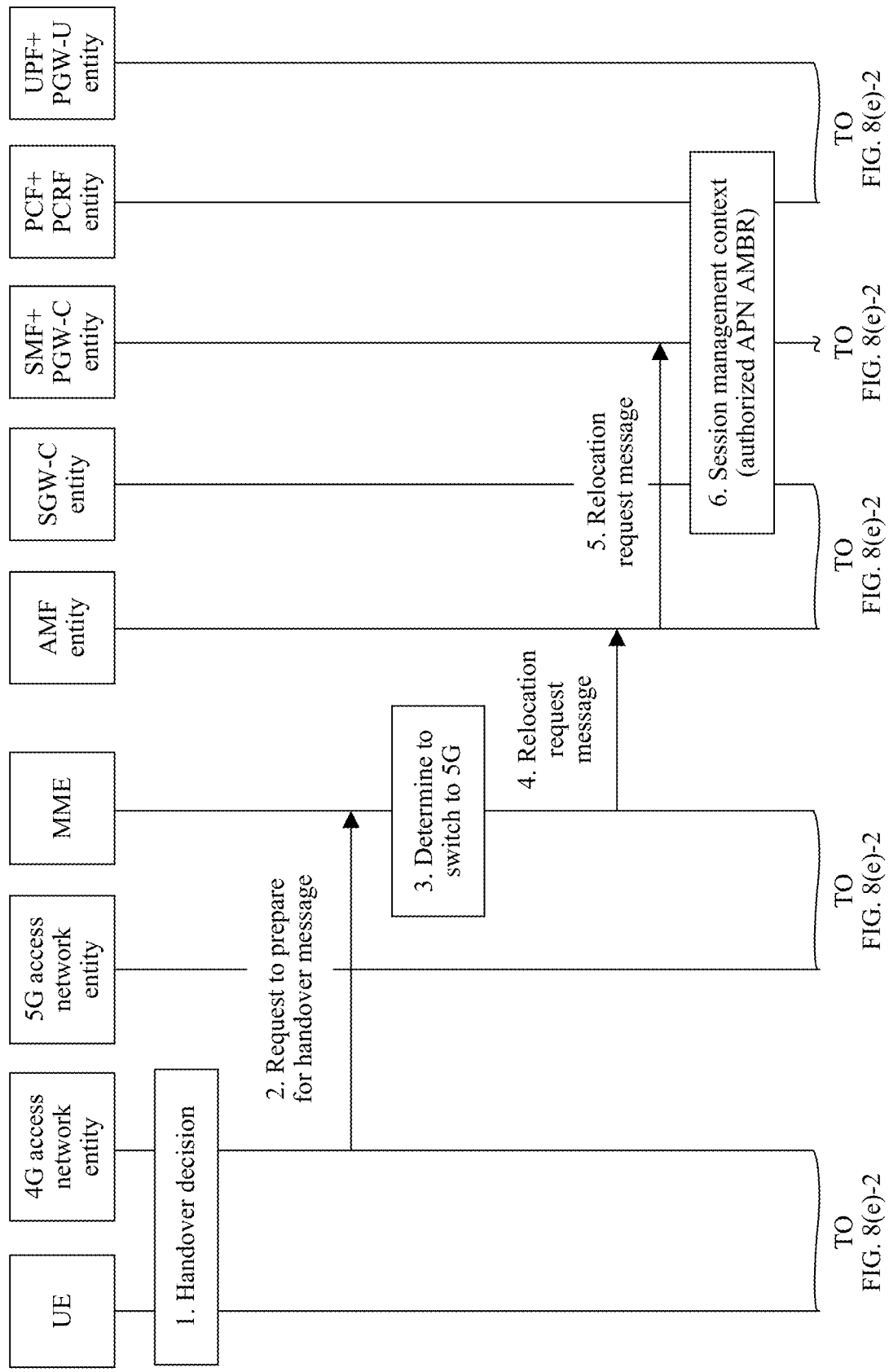
Figures 2, 8E:
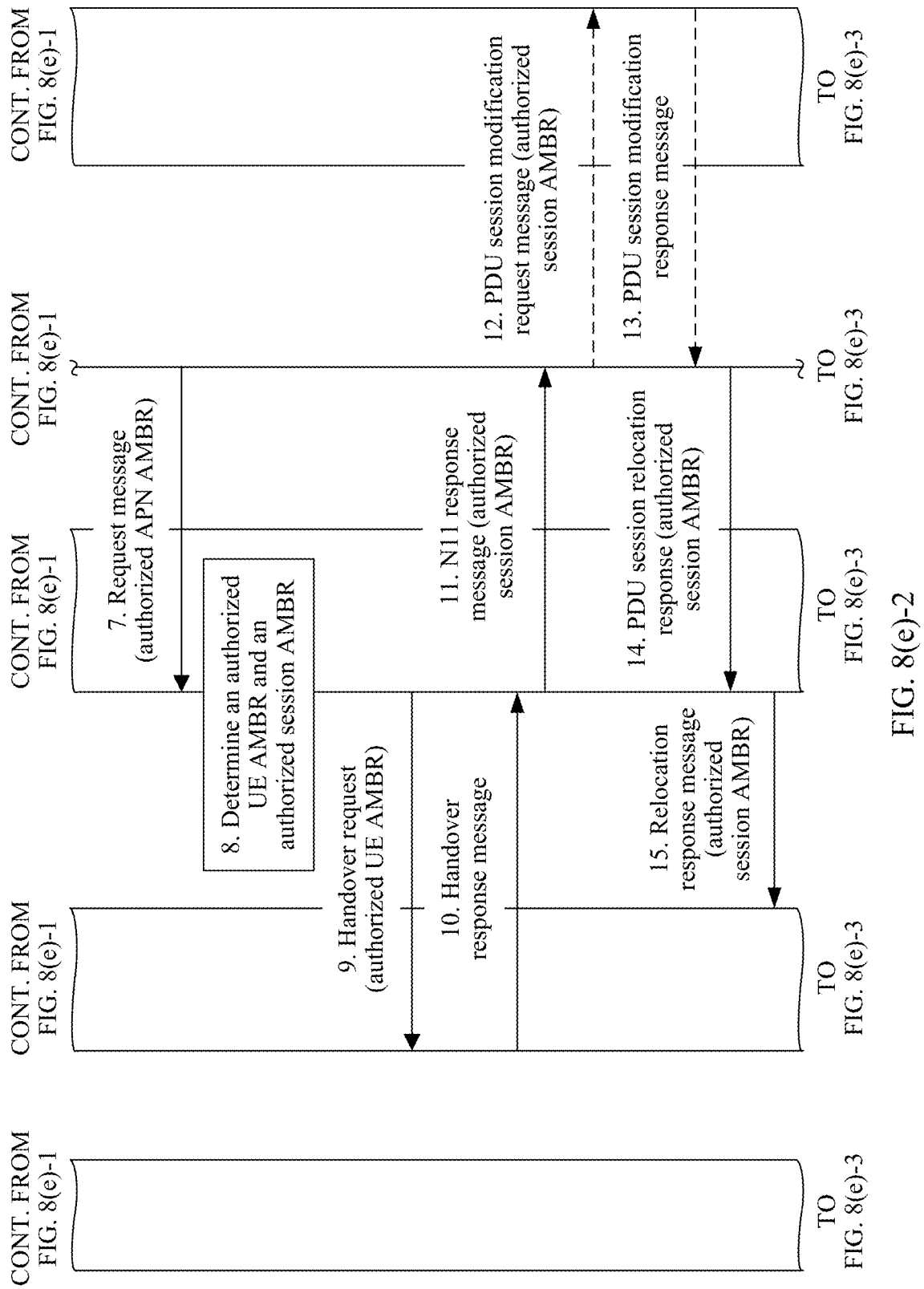
Figures 3, 8E:
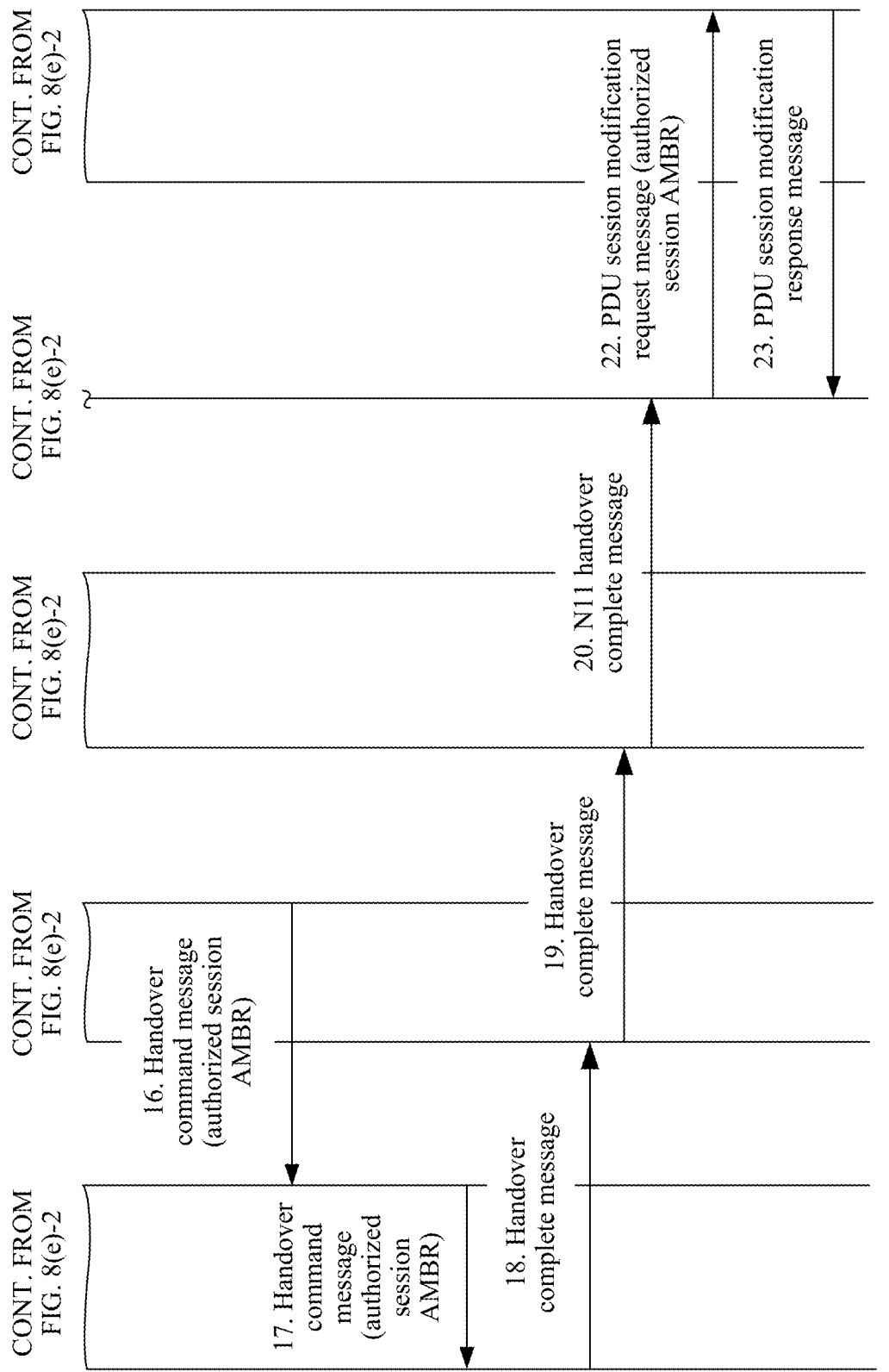

FIG. 8(e)-1 to FIG. 8(e)-3 are a schematic flowchart of another parameter determining method according to this application. The method is applied to a scenario in which UE is handed over from an EPS network to a 5GS network. To be specific, the UE accesses the network by using a 4G access network entity, to obtain a service. Because of movement of the UE, the 4G access network entity determines that a handover procedure needs to be initiated.

In this embodiment, a third communications entity is an AMF entity, and a fourth communications entity is an AMF entity. To be specific, the AMF entity determines an authorized UE AMBR of the UE and an authorized APN AMBR in each PDN.

A specific procedure is described as follows:

Operation 1: The 4G access network entity determines that the UE needs to be handed over to the 4G access network entity.

Because of movement of the UE, the UE has moved to a 5G network. For example, the UE has moved to a base station in the 5G network. In this case, the 4G access network entity detects that a signal of the UE is relatively weak, and therefore makes a handover decision, and starts to prepare for the handover.

Operation 2: The 4G access network entity sends a request to prepare for handover message to an MME.

The request to prepare for handover message includes a node identifier of a target 5G access network entity, for example, a target gNB ID. The target gNB ID may be an ID of a wireless access point that is in the 5G network and detected by the UE and whose signal is strongest, or may be an ID of a wireless access point that is obtained from the 5G access network entity through message exchange between the 4G access network entity and the 5G access network entity. A manner of obtaining the target gNB ID is not limited in this application.

Operation 3: The MME determines, based on the received target gNB ID, to switch to a 5G system.

In addition, the MME further selects an AMF entity.

Operation 4: The MME sends a relocation request (Forward relocation request) message to the AMF entity.

The relocation request message includes a UE context in a 4G system, and specifically includes a mobility context and a session context.

Operation 5: The AMF entity sends a relocation handover request (Forward relocation request) message to an SMF+PGW-C entity.

The relocation handover request message includes a UE context related to a 4G session.

Operation 6: The SMF+PGW-C entity establishes a session management context (SM context).

The session management context includes an authorized APN AMBR and a quantity of PDN connections.

Operation 7: The SMF+PGW-C entity sends a request message to the AMF entity.

For example, the request message may be an N11 request message, and the request message includes the authorized APN AMBR and the quantity of PDN connections.

Operation 8: The AMF entity determines an authorized UE AMBR and an authorized session AMBR of a session.

The AMF entity determines the authorized session AMBR of the session based on the authorized APN AMBR and the quantity of PDN connections. For details, refer to the foregoing descriptions.

The AMF entity determines the authorized UE AMBR based on a subscribed UE AMBR and authorized session AMBRs of all sessions, that is, authorized UE AMBR=min (sum(authorized session AMBRs of all the sessions), subscribed UE AMBR).

Operation 9: The AMF entity sends a handover request message to the 5G access network entity.

The handover request message includes the authorized UE AMBR.

Operation 10: The 5G access network entity sends a handover response message to the AMF entity.

The message includes information about a QoS flow for which a resource is successfully allocated.

Operation 11: The AMF entity sends an N11 response message to the SMF.

The N11 response message includes an authorized session AMBR. Further, the authorized session AMBR is an authorized session AMBR of a successfully switched session.

Operation 12: The SMF+PGW-C entity sends a PDU session modification request message to a UPF+PGW-U entity.

The request message includes the authorized session AMBR of the session. Further, the authorized session AMBR is an authorized session AMBR of a successfully switched session.

Operation 13: The UPF+PGW-U entity sends a PDU session modification response message to the SMF+PGW-C entity.

Operation 14: The SMF+PGW-C entity sends a response for the PDU session relocation message to the AMF entity.

The response message includes the authorized session AMBR of the session. Further, the authorized session AMBR is an authorized session AMBR of a successfully switched session.

Operation 15: The AMF entity sends a relocation response (forward relocation response) message to the MME, where the message includes the authorized session AMBR of the session. Further, the authorized session AMBR is an authorized session AMBR of a successfully switched session.

Operation 16: The MME sends a handover command message to the 4G access network entity.

The message includes the authorized session AMBR. Further, the authorized session AMBR is an authorized session AMBR of a successfully switched session.

Operation 17: The 4G access network entity sends a handover command (handover command) message to the UE.

The message includes the authorized session AMBR. Further, the authorized session AMBR is an authorized session AMBR of a successfully switched session.

Operation 18: The UE sends a handover complete message to the 5G access network entity.

Operation 19: The 5G access network entity sends a handover complete (handover complete) message to the AMF entity.

Operation 20: The AMF entity sends an N11 handover complete message to the SMF entity.

Operation 22: The SMF+PGW-C entity sends a PDU session modification request message to the UPF+PGW-U entity.

In one embodiment, the PDU session modification request message includes the authorized session AMBR.

Operation 23: The UPF+PGW-U entity sends a PDU session modification response message to the SMF+PGW-C entity. Further, the authorized session AMBR is an authorized session AMBR of a successfully switched session.

Operation 12 and operation 13 are optional operations. When there is operation 12 and the authorized session AMBR is carried in operation 12, the authorized session AMBR is not carried in operation 22; or when there is no operation 12 or the authorized session AMBR is not carried in operation 12, the authorized session AMBR is carried in operation 22.

Through operation 1 to operation 23, the AMF entity determines the authorized UE AMBR of the UE, and sends the determined authorized UE AMBR of the UE to the 5G access network entity, so that the 5G access network entity controls the UE AMBR, and specifically, a base station in the 5G access network entity controls the UE AMBR. The AMF entity determines the authorized session AMBR, and sends the determined authorized session AMBR to the UE and the UPF entity, so that in an uplink direction, the UE controls the authorized session AMBR, and the UPF entity performs check, and in a downlink direction, the UPF entity controls the authorized session AMBR.

In the foregoing embodiments provided in this application, the parameter determining methods provided in the embodiments of this application are described separately from perspectives of each network element and interaction between network elements. It may be understood that, to implement the foregoing function, the network elements, such as a terminal device (for example, UE) and a network device (for example, a base station), include a corresponding hardware structure and/or software module for performing each function. A person skilled in the art should easily be aware that, in combination with the examples described in the embodiments disclosed in this specification, units and algorithm operations may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 9:
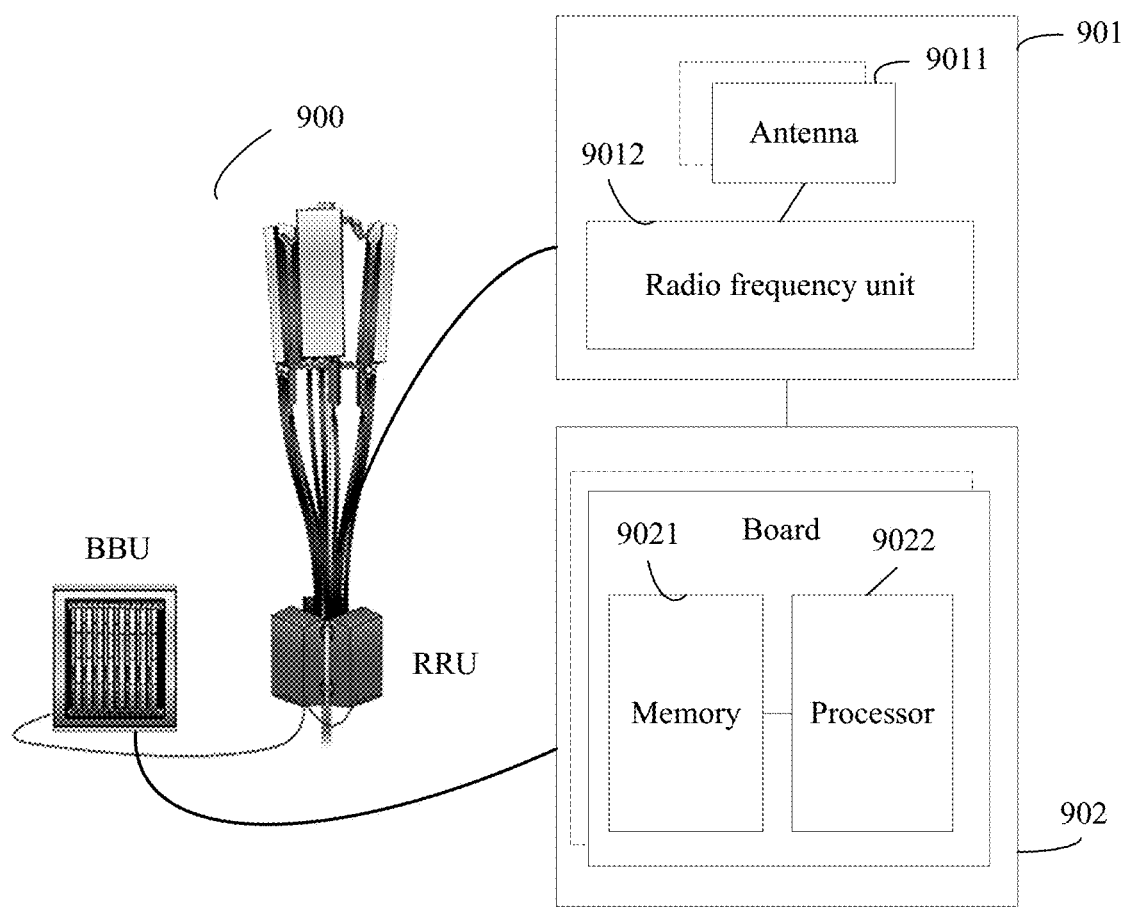
FIG. 9 is a schematic diagram of a base station according to this application.

Based on a same inventive concept, an embodiment of this application further provides a base station 900. As shown in FIG. 9, the base station 900 may be applied to the method performed by the first communications entity or the third communications entity in any one of the foregoing embodiments. The base station 900 includes one or more remote radio units (RRU) 901 and one or more baseband units (BBU) 902. The RRU 901 may be referred to as a transceiver unit, a transceiver, a transceiver circuit, a transceiver, or the like, and the RRU 901 may include at least one antenna 9011 and at least one radio frequency unit 9012. The RRU 901 is mainly configured to receive and send a radio frequency signal and convert a radio frequency signal and a baseband signal. The BBU 902 is mainly configured to perform baseband processing, control the base station, and the like. The RRU 901 and the BBU 902 may be physically disposed together, or may be physically disposed separately, to be specific, in a distributed base station.

As a control center of the base station, the BBU 902, which may also be referred to as a processing unit, is mainly configured to complete a baseband processing function such as channel coding, multiplexing, modulation, or spreading. For example, the BBU (the processing unit) may be configured to control the base station to perform the method performed by the first communications entity or the third communications entity in any of the foregoing embodiments.

For example, the BBU 902 may include one or more boards, and a plurality of boards may jointly support a radio access network (for example, an LTE network) of a single access standard, or may separately support radio access networks of different access standards. The BBU 902 further includes a memory 9021 and a processor 9022. The memory 9021 is configured to store a necessary instruction and necessary data. The processor 9022 is configured to control the base station to perform necessary actions, for example, is configured to control the base station to perform the method performed by the first communications entity or the third communications entity in any one of the foregoing embodiments. The memory 9021 and the processor 9022 may serve one or more boards. In other words, a memory and a processor may be disposed on each board. Alternatively, a plurality of boards may use a same memory and processor. In addition, a necessary circuit is further disposed on each board.

On an uplink, an uplink signal (including data and the like) sent by a terminal device is received by using the antenna 9011. On a downlink, a downlink signal (including data and/or control information) is sent to the terminal device by using the antenna 9011. In the processor 9022, service data and a signaling message are processed, and these units perform processing based on a radio access technology (such as access technologies in LTE, NR, and other evolved systems) used by a radio access network. The processor 9022 is further configured to control and manage an action of the base station, and is configured to perform processing performed by the first communications entity or the third communications entity in the foregoing embodiment.

It may be understood that FIG. 9 shows only a simplified design of the network device. In actual application, the network device may include any quantity of antennas, memories, processors, radio frequency units, RRUs, BBUs, and the like, and all network devices that can implement this application fall within the protection scope of this application.

Figure 10A:
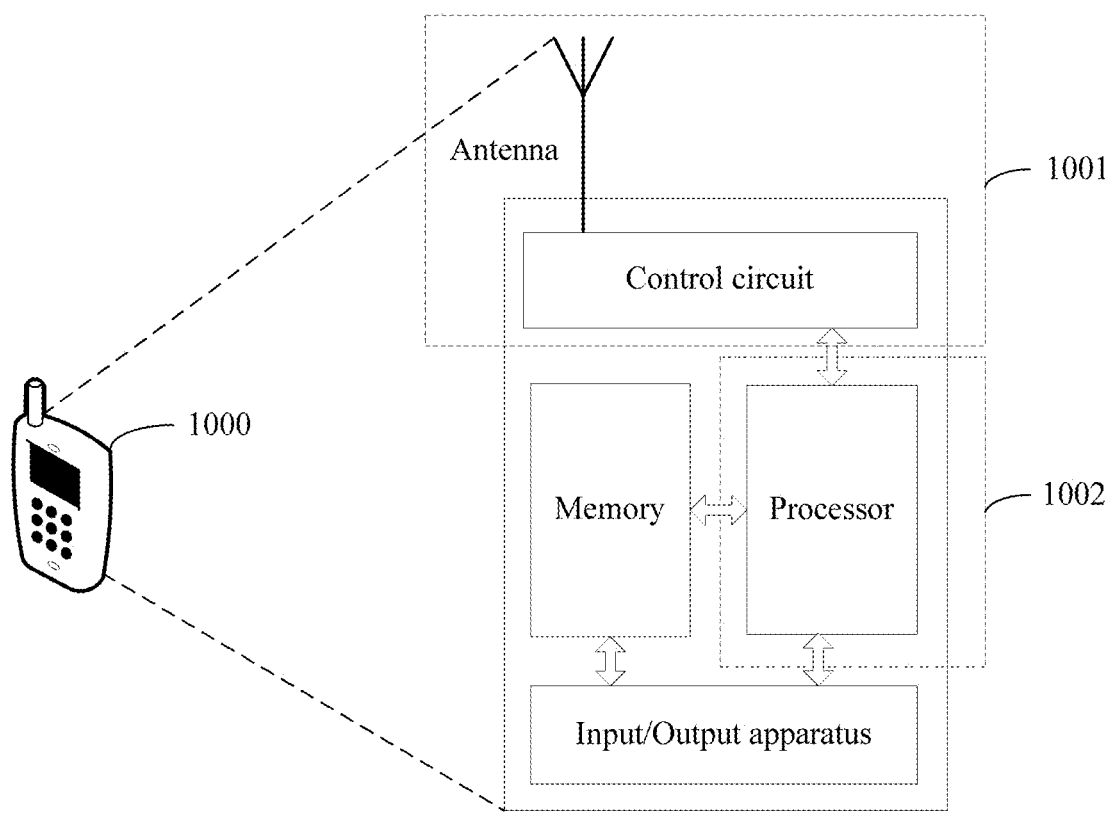
FIG. 10($a$) is a schematic diagram of a terminal device according to this application.

Based on a same inventive concept, an embodiment of this application further provides a terminal device 1000. The terminal device 1000 may be specifically UE, as shown in FIG. 10(a). For ease of description, FIG. 10(a) shows only main components of the terminal device. As shown in FIG. 10(a), the terminal device 1000 includes a processor, a memory, a control circuit, an antenna, and an input/output apparatus. The processor is mainly configured to process a communication protocol and communication data, control the entire terminal device, execute a software program, and process data of the software program. For example, the processor is configured to support the terminal device 1000 in performing the method performed by the terminal device 1000 in any one of the foregoing embodiments. That is, when a first communications entity is UE or a third communications entity is UE, the terminal device shown in FIG. 10(a) may perform the method in the foregoing embodiment. The memory is mainly configured to store the software program and the data. The control circuit is mainly configured to convert a baseband signal and a radio frequency signal and process a radio frequency signal. The control circuit and the antenna may also be referred to as a transceiver, mainly configured to receive and send a radio frequency signal in an electromagnetic wave form. The input/output apparatus, for example, a touchscreen, a display screen, or a keyboard, is mainly configured to receive data entered by a user and output data to the user.

After the terminal device is powered on, the processor may read a software program in a storage unit, explain and execute an instruction of the software program, and process data of the software program. When data needs to be wirelessly sent, the processor performs baseband processing on the to-be-sent data, and then outputs a baseband signal to a radio frequency circuit. The radio frequency circuit performs radio frequency processing on the baseband signal, and then sends a radio frequency signal in an electromagnetic wave form by using the antenna. When data is to be sent to the terminal device 1000, the radio frequency circuit receives a radio frequency signal by using the antenna, converts the radio frequency signal into a baseband signal, and outputs the baseband signal to the processor, and the processor converts the baseband signal into data and processes the data.

A person skilled in the art may understand that, for ease of description, FIG. 10(a) shows only one memory and one processor. Actually, the terminal device may include a plurality of processors and a plurality of memories. The memory may also be referred to as a storage medium, a storage device, or the like. This is not limited in this application.

In an optional implementation, the processor may include a baseband processor and a central processing unit. The baseband processor is mainly configured to process a communication protocol and communication data, and the central processing unit is mainly configured to control the entire terminal device 1000, execute a software program, and process data of the software program. Functions of the baseband processor and the central processing unit are integrated into the processor in FIG. 10(*a*). A person skilled in the art may understand that the baseband processor and the central processing unit each may be an independent processor, and are interconnected by using a technology such as a bus. A person skilled in the art may understand that the terminal device may include a plurality of baseband processors to adapt to different network standards, the terminal device 1000 may include a plurality of central processing units to enhance a processing capability of the terminal device 1000, and all components of the terminal device 1000 may be connected by using various buses. The baseband processor may also be expressed as a baseband processing circuit or a baseband processing chip. The central processing unit may also be expressed as a central processing circuit or a central processing chip. A function of processing a communication protocol and communication data may be built into the processor, or may be stored in a storage unit in a form of a software program, so that the processor executes the software program to implement a baseband processing function.

Figure 10B:
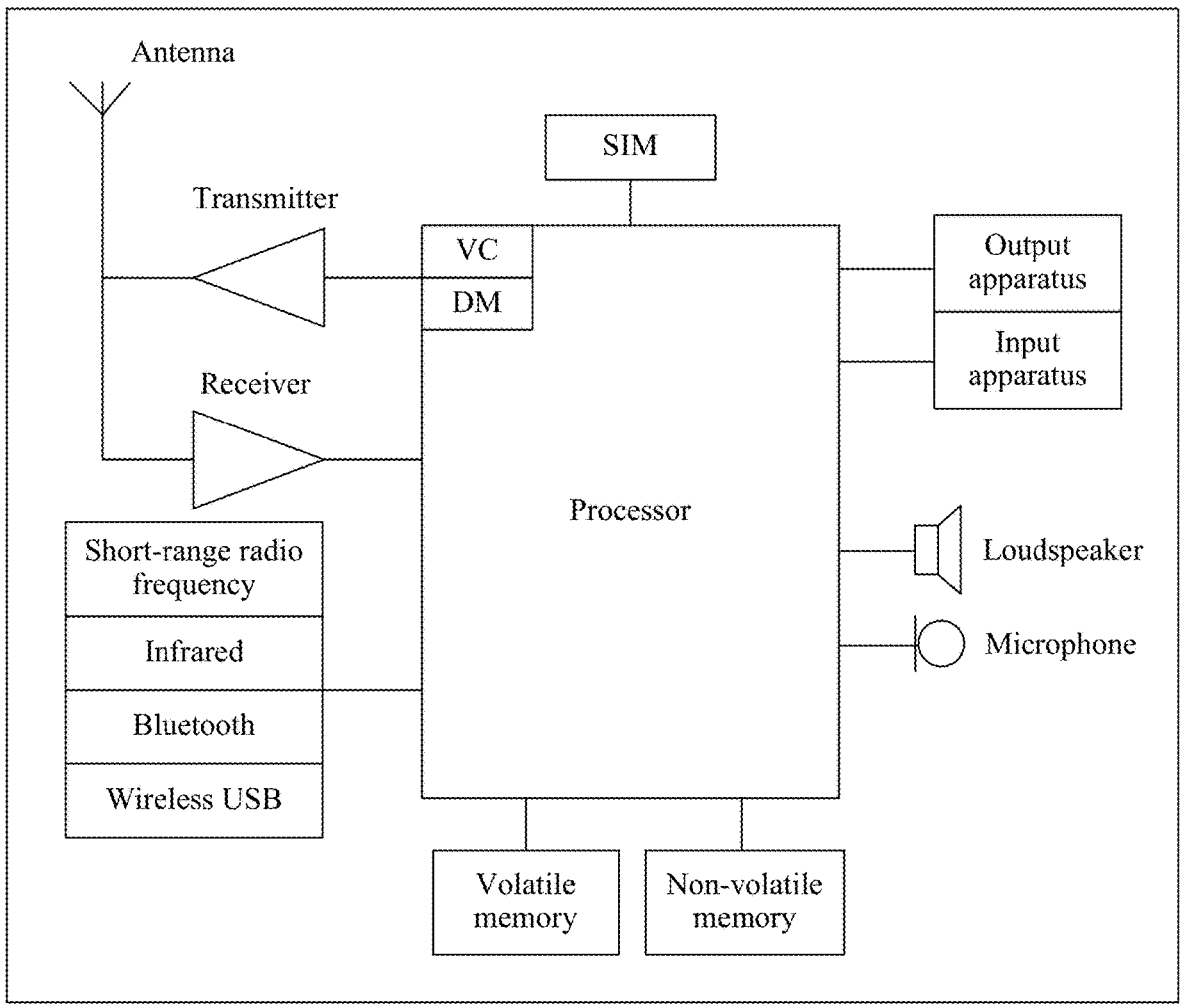

For example, in this application, the antenna having receiving and sending functions and the control circuit may be considered as a transceiver unit 1001 of the terminal device 1000, and the processor having a processing function may be considered as a processing unit 1002 of the terminal device 1000. As shown in FIG. 10(*a*), the terminal device 1000 includes the transceiver unit 1001 and the processing unit 1002. The transceiver unit may also be referred to as a transceiver, a transceiver, a transceiver apparatus, or the like. In one embodiment, a component that is in the transceiver unit 1001 and that is configured to implement a receiving function may be considered as a receiving unit, and a component that is in the transceiver unit 1001 and that is configured to implement a sending function may be considered as a sending unit, in other words, the transceiver unit 1001 includes the receiving unit and the sending unit. For example, the receiving unit may also be referred to as a receiver, a receiver, a receiver circuit, or the like, and the sending unit may be referred to as a transmitter, a transmitter, a transmit circuit, or the like.

On a downlink, a downlink signal (including data and/or control information) sent by a network device is received by using the antenna. On an uplink, an uplink signal (including data and/or control information) is sent to the network device by using the antenna. In the processor, service data and a signaling message are processed, and these units perform processing based on a radio access technology (such as access technologies in LTE, NR, and other evolved systems) used by a radio access network. The processor is further configured to control and manage an action of the terminal device, and is configured to perform processing performed by the terminal device in the foregoing embodiment.

It may be understood that FIG. 10(*a*) shows only a simplified design of the terminal device. In actual application, the terminal device may include any quantity of antennas, memories, processors, and the like, and all terminal devices that can implement this application fall within the protection scope of this application.

FIG. 10(*b*) is a schematic diagram of another terminal device according to this application. The terminal device may be configured to perform the method performed by the first communications entity or the third communications entity when the first communications entity is UE or the third communications entity is UE in the foregoing embodiment. A processor may include a circuit configured to perform audio/video and logical functions of the terminal device. For example, the processor may include a digital signal processor device, a microprocessor device, an analog-to-digital converter, a digital-to-analog converter, and the like. Control and signal processing functions of the terminal device may be allocated between these devices based on respective capabilities of the devices. The processor may further include an internal voice coder VC, an internal data modem DM, and the like. In addition, the processor may include functions for operating one or more software programs, and the software programs may be stored in a memory. Usually, the processor and the stored software program may be configured to enable the terminal device to perform an action. For example, the processor can operate a connection program.

The terminal device may further include a user interface. The user interface may include, for example, a headset or a loudspeaker, a microphone, an output apparatus (for example, a display), and an input apparatus. The user interface may be coupled to the processor through an operation. In this case, the processor may include a user interface circuit, configured to control at least some functions of one or more elements (for example, the loudspeaker, the microphone, and the display) of the user interface. The processor and/or the user interface circuit included in the processor may be configured to control one or more functions of the one or more elements of the user interface by using a computer program instruction (for example, software and/or firmware) stored in a memory accessible to the processor. The terminal device may include a battery configured to supply power to various circuits related to the mobile device, although the battery is not shown. The circuit is, for example, a circuit that provides mechanical vibration as detectable output. The input apparatus may include a device that allows the apparatus to receive data, for example, a keypad, a touch display, a joystick, and/or at least one other input device.

The terminal device may further include one or more connection circuit modules configured to share and/or obtain data. For example, the terminal device may include a short-range radio frequency RF transceiver and/or detector, to share data with an electronic device and/or obtain data from an electronic device based on an RF technology. The terminal device may include other short-range transceivers such as an infrared IR transceiver, a used transceiver, and a wireless universal serial bus USB transceiver. The Bluetooth transceiver can operate based on a low-power or ultra-low-power Bluetooth technology. In this case, the terminal device, more specifically, the short-range transceiver, can send data to and/or receive data from an electronic device near the apparatus (for example, within 10 meters). Although not shown, the terminal device can send data to and/or receive data from the electronic device based on various wireless networking technologies, and these technologies include Wi-Fi, Wi-Fi low power consumption, and WLAN technologies, for example, an IEEE 802.11 technology, an IEEE 802.15 technology, and an IEEE 802.16 technology.

The terminal device may include a memory that can store an information element related to a mobile user, for example, a subscriber identity module SIM. In addition to the SIM, the apparatus may further include another removable and/or fixed memory. The terminal device may include a volatile memory and/or a nonvolatile memory. For example, the volatile memory may include a random access memory RAM, and the RAM includes a dynamic RAM and/or a static RAM, and an on-chip and/or off-chip cache. The nonvolatile memory may be embedded and/or removable. The nonvolatile memory may include, for example, a read-only memory, a flash memory, a magnetic storage device such as a hard disk, a floppy disk drive, or a magnetic tape, an optical disc drive and/or a medium, and a nonvolatile random access memory NVRAM. Similar to the volatile memory, the nonvolatile memory may include a cache area used for temporary storage of data. At least a part of the volatile memory and/or the nonvolatile memory may be embedded into the processor. The memory may store one or more software programs, instructions, information blocks, data, and the like. The memory may be used by the terminal device to perform a function of the terminal device. For example, the memory may include an identifier that can uniquely identify the terminal device, for example, an international mobile equipment identity IMEI code.

Figure 11:
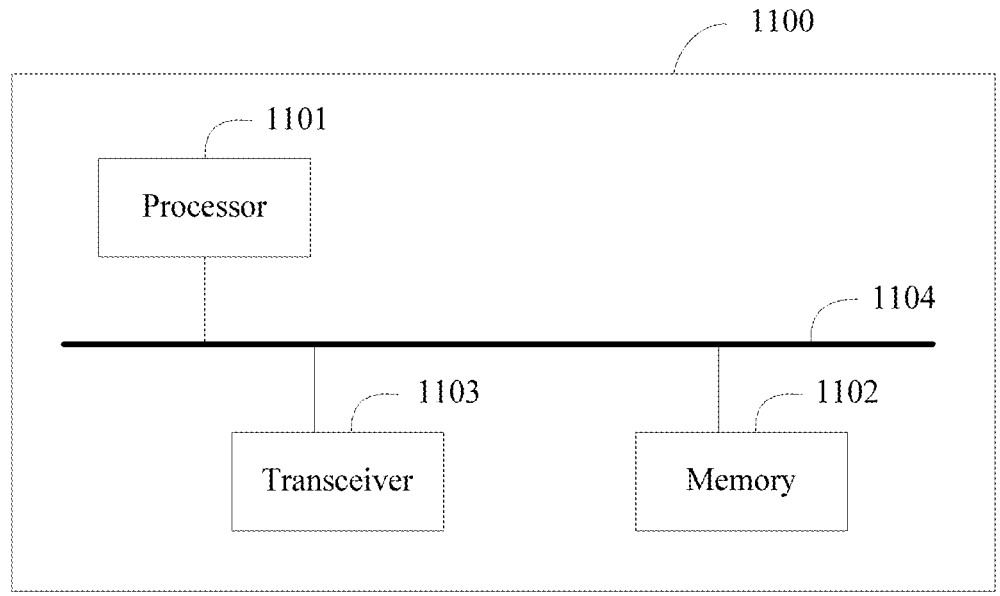
FIG. 11 is a schematic diagram of a communications entity according to this application.

Based on a same inventive concept, an embodiment of this application further provides a communications entity 1100. As shown in FIG. 11, the communications entity 1100 includes at least a processor 1101 and a memory 1102, and may further include a transceiver 1103 and a bus 1104.

The processor 1101, the memory 1102, and the transceiver 1103 are all connected by using the bus 1104.

The memory 1102 is configured to store a computer executable instruction.

The processor 1101 is configured to execute the computer executable instruction stored in the memory 1102.

When the communications entity 1100 is the first communications entity in the foregoing embodiment, the processor 1101 executes the computer executable instruction stored in the memory 1102, so that the communications entity 1100 performs the operations performed by the first communications entity in any one of the foregoing embodiments provided in the embodiments of this application, or a functional unit corresponding to the operations is deployed in the communications entity.

When the communications entity 1100 is the third communications entity in the foregoing embodiment, the processor 1101 executes the computer executable instruction stored in the memory 1102, so that the communications entity 1100 performs the operations performed by the third communications entity in any one of the foregoing embodiments provided in the embodiments of this application, or a functional unit corresponding to the operations is deployed in the communications entity.

The processor 1101 may include processors 1101 of different types, or may include processors 1101 of a same type. The processor 1101 may be any one of the following devices having a computing and processing capability: a central processing unit (CPU), an ARM processor (Advanced RISC Machines, RISC: Reduced Instruction Set Computing), a field programmable gate array (FPGA), a dedicated processor, and the like. In an optional implementation, the processor 1101 may be integrated as a many-core processor.

The memory 1102 may be any one or any combination of the following storage media: a random access memory (RAM), a read-only memory (ROM), a nonvolatile memory (NVM), a solid state drive (SSD), a mechanical hard disk, a magnetic disk, a disk array, and the like.

The bus 1104 may include an address bus, a data bus, a control bus, and the like. For ease of denotation, the bus is represented by using a thick line in FIG. 11. The bus 1104 may be any one or any combination of the following components used for wired data transmission: an industry standard architecture (ISA) bus, a peripheral component interconnect (PCI) bus, an extended industry standard architecture (EISA) bus, and the like.

In one aspect, the processor 1101 and the transceiver 1103 of the communications entity shown in FIG. 11 may be configured to perform the following operations:

The processor 1101 is configured to determine an authorized access point name APN aggregate maximum bit rate AMBR based on a subscribed APN AMBR and/or an authorized session AMBR of a PDU session, where the authorized APN AMBR is used by a second communications entity to determine an authorized user equipment UE AMBR of UE based on the authorized APN AMBR, and the authorized APN AMBR and the authorized UE AMBR are quality of service QoS parameters needed in an evolved packet system EPS network when the UE is handed over from a 5GS network to the EPS network.

In one embodiment, authorized APN AMBR=min(subscribed APN AMBR, sum(authorized session AMBR of the PDU session)), where sum( ) is a summation function, and min( ) is a function of calculating a minimum value.

In one embodiment, authorized APN AMBR=sum(authorized session AMBR of the PDU session), where sum( ) is a summation function.

In one embodiment, the first communications entity is a session management entity or a policy control entity, and the processor 1101 is specifically configured to determine the authorized APN AMBR based on the subscribed APN AMBR and a policy.

In one embodiment, the first communications entity is an access and mobility management function AMF entity, an MME, a session management entity, a policy control entity, or UE.

In one embodiment, the second communications entity is an AMF entity, a mobility management entity MME, or UE.

In one embodiment, the first communications entity is an AMF entity, an MME, a session management entity, or a policy control entity, and the transceiver 1103 is configured to send the authorized APN AMBR to the UE and/or a user plane entity.

In one embodiment, the authorized UE AMBR of the UE is sent by the second communications entity to a 4G access network entity in a radio access network.

In one embodiment, the session management entity is a session management function SMF entity and/or a PGW-C entity.

In one embodiment, the policy control entity is a policy control function PCF entity and/or a policy and charging rules function PCRF entity.

In one embodiment, the user plane entity is a user plane function UPF entity and/or a PGW-U entity.

In one embodiment, the subscribed APN AMBR is obtained by the first communications entity from a unified data management UDM entity and/or a home subscriber server HSS entity.

In another aspect, the processor 1101 and the transceiver 1103 of the communications entity shown in FIG. 11 may be configured to perform the following operations:

The processor 1101 is specifically configured to determine an authorized session AMBR of a session based on a subscribed session AMBR, or an authorized APN AMBR and a quantity of packet data connections PDN connections, where the authorized session AMBR is used by a fourth communications entity to determine an authorized user equipment UE AMBR of UE based on at least the authorized session AMBR, and the authorized session AMBR and the authorized UE AMBR are QoS parameters needed in a 5GS network when the UE is handed over from an EPS network to the 5GS network.

In one embodiment, the third communications entity is a session management entity or a policy control entity, and the processor 1101 is specifically configured to determine the authorized session AMBR based on the subscribed session AMBR and a policy.

In one embodiment, the authorized APN AMBR is equal to a sum of authorized session AMBRs of N sessions, where N is the quantity of PDN connections.

In one embodiment, all the authorized session AMBRs of the N sessions are equal; or all the authorized session AMBRs of the N sessions are not equal, and an authorized session AMBR of each of the N sessions is determined by the third communications entity based on an attribute of the session.

In one embodiment, the third communications entity is an AMF entity, an MME, a 5G access network entity, a session management entity, a policy control entity, or UE.

In one embodiment, the third communications entity is an AMF entity, an MME, a 5G access network entity, a session management entity, or a policy control entity, and the transceiver 1103 is configured to send the authorized session AMBR to the UE and/or a user plane entity.

In one embodiment, the fourth communications entity is an AMF entity, an MME, a 5G access network entity, or UE.

In one embodiment, the fourth communications entity is an AMF entity, an MME, or UE, and the authorized UE AMBR is sent by the fourth communications entity to a 5G access network entity.

In one embodiment, the policy control entity is a PCF entity and/or a PCRF entity.

In one embodiment, the session management entity is an SMF entity and/or a PGW-C entity.

In one embodiment, the user plane entity is a UPF entity and/or a PGW-U entity.

In one embodiment, the subscribed session AMBR is obtained by the third communications entity from a UDM entity and/or an HSS entity.

An embodiment of this application provides a computer-readable storage medium. The computer-readable storage medium stores a computer executable instruction, and a processor of a communications entity executes the computer executable instruction, so that the communications entity performs the operations performed by the first communications entity in the parameter determining method provided in this application, or a functional unit corresponding to the operations is deployed in a communications entity.

An embodiment of this application provides a computer-readable storage medium. The computer-readable storage medium stores a computer executable instruction, and a processor of a communications entity executes the computer executable instruction, so that the communications entity performs the operations performed by the third communications entity in the parameter determining method provided in this application, or a functional unit corresponding to the operations is deployed in the communications entity.

An embodiment of this application provides a computer program product. The computer program product includes a computer executable instruction, and the computer executable instruction is stored in a computer-readable storage medium. A processor of a communications entity may read the computer executable instruction from the computer-readable storage medium. The processor executes the computer executable instruction, so that the communications entity performs the operations performed by the first communications entity in the foregoing method provided in the embodiments of this application, or a functional unit corresponding to the operations is deployed in the communications entity.

An embodiment of this application provides a computer program product. The computer program product includes a computer executable instruction, and the computer executable instruction is stored in a computer-readable storage medium. A processor of a communications entity may read the computer executable instruction from the computer-readable storage medium. The processor executes the computer executable instruction, so that the communications entity performs the operations performed by the third communications entity in the foregoing method provided in the embodiments of this application, or a functional unit corresponding to the operations is deployed in the communications entity.

This application further provides a chip system, and the chip system includes a processor, configured to support a communications entity in implementing functions in the foregoing aspects, for example, generating, receiving, or processing data and/or information in the foregoing methods. In one embodiment, the chip system further includes a memory. The memory may be configured to store a program instruction and data that are necessary for a terminal device. The chip system may include a chip, or may include a chip and another discrete device.

Figure 12:
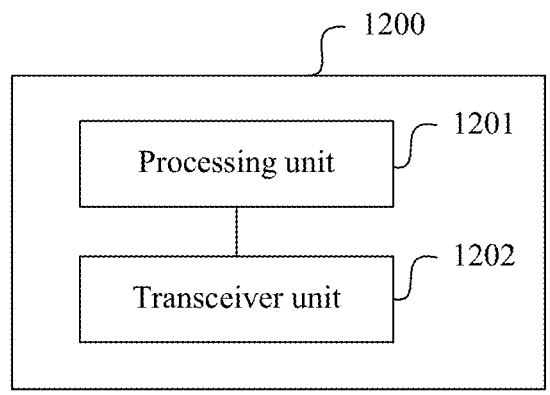
FIG. 12 is a schematic diagram of a communications entity according to this application.

Based on a same inventive concept, this application further provides a communications entity 1200. As shown in FIG. 12, the communications entity 1200 includes a processing unit 1201 and a transceiver unit 1202, and may be configured to perform the method performed by the first communications entity in any one of the foregoing embodiments. In one embodiment, the processing unit 1201 and the transceiver unit 1202 are configured to perform the following operations:

The processing unit 1201 is configured to determine an authorized access point name APN aggregate maximum bit rate AMBR based on at least a subscribed APN AMBR and/or an authorized session AMBR of a PDU session, where the authorized APN AMBR is used by a second communications entity to determine an authorized user equipment UE AMBR of UE based on the authorized APN AMBR, and the authorized APN AMBR and the authorized UE AMBR are quality of service QoS parameters needed in an evolved packet system EPS network when the UE is handed over from a 5GS network to the EPS network.

In one embodiment, authorized APN AMBR=min(subscribed APN AMBR, sum(authorized session AMBR of the PDU session)), where sum( ) is a summation function, and min( ) is a function of calculating a minimum value.

In one embodiment, authorized APN AMBR=sum(authorized session AMBR of the PDU session), where sum( ) is a summation function.

In one embodiment, the first communications entity is a session management entity or a policy control entity, and the processing unit 1201 is specifically configured to determine the authorized APN AMBR based on the subscribed APN AMBR and a policy.

In one embodiment, the first communications entity is an access and mobility management function AMF entity, an MME, a session management entity, a policy control entity, or UE.

In one embodiment, the second communications entity is an AMF entity, a mobility management entity MME, or UE.

In one embodiment, the first communications entity is an AMF entity, an MME, a session management entity, or a policy control entity, and the transceiver unit 1202 is configured to send the authorized APN AMBR to the UE and/or a user plane entity.

In one embodiment, the authorized UE AMBR of the UE is sent by the second communications entity to a 4G access network entity in a radio access network.

In one embodiment, the session management entity is a session management function SMF entity and/or a PGW-C entity.

In one embodiment, the policy control entity is a policy control function PCF entity and/or a policy and charging rules function PCRF entity.

In one embodiment, the user plane entity is a user plane function UPF entity and/or a PGW-U entity.

In one embodiment, the subscribed APN AMBR is obtained by the first communications entity from a unified data management UDM entity and/or a home subscriber server HSS entity.

Figure 13:
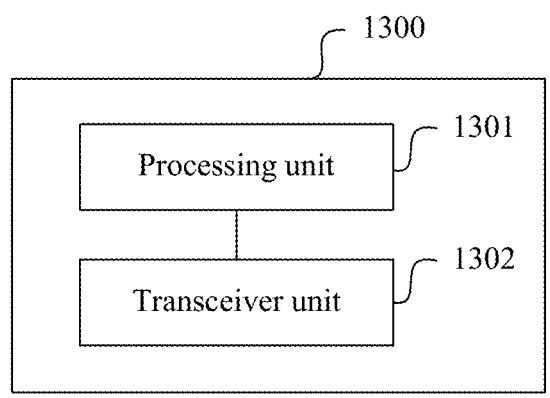
FIG. 13 is a schematic diagram of a communications entity according to this application.

Based on a same inventive concept, this application further provides a communications entity 1300. As shown in FIG. 13, the communications entity 1300 includes a processing unit 1301 and a transceiver unit 1302, and may be configured to perform the method performed by the third communications entity in any one of the foregoing embodiments. In one embodiment, the processing unit 1301 and the transceiver unit 1302 are configured to perform the following operations:

The processing unit 1301 is specifically configured to determine an authorized session AMBR of a session based on a subscribed session AMBR, or an authorized APN AMBR and a quantity of packet data connections PDN connections, where the authorized session AMBR is used by a fourth communications entity to determine an authorized user equipment UE AMBR of UE based on at least the authorized session AMBR, and the authorized session AMBR and the authorized UE AMBR are QoS parameters needed in a 5GS network when the UE is handed over from an EPS network to the 5GS network.

In one embodiment, the third communications entity is a session management entity or a policy control entity, and the processing unit 1301 is specifically configured to determine the authorized session AMBR based on the subscribed session AMBR and a policy.

In one embodiment, the authorized APN AMBR is equal to a sum of authorized session AMBRs of N sessions, where N is the quantity of PDN connections.

In one embodiment, all the authorized session AMBRs of the N sessions are equal; or all the authorized session AMBRs of the N sessions are not equal, and an authorized session AMBR of each of the N sessions is determined by the third communications entity based on an attribute of the session.

In one embodiment, the third communications entity is an AMF entity, an MME, a 5G access network entity, a session management entity, a policy control entity, or UE.

In one embodiment, the third communications entity is an AMF entity, an MME, a 5G access network entity, a session management entity, or a policy control entity, and the transceiver unit 1302 is configured to send the authorized session AMBR to the UE and/or a user plane entity.

In one embodiment, the fourth communications entity is an AMF entity, an MME, a 5G access network entity, or UE.

In one embodiment, the fourth communications entity is an AMF entity, an MME, or UE, and the authorized UE AMBR is sent by the fourth communications entity to a 5G access network entity.

In one embodiment, the policy control entity is a PCF entity and/or a PCRF entity.

In one embodiment, the session management entity is an SMF entity and/or a PGW-C entity.

In one embodiment, the user plane entity is a UPF entity and/or a PGW-U entity.

In one embodiment, the subscribed session AMBR is obtained by the third communications entity from a UDM entity and/or an HSS entity.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (SSD)), or the like.

A person skilled in the art may further understand that various illustrative logical blocks and operations that are listed in this application may be implemented by using electronic hardware, computer software, or a combination thereof. Whether the functions are implemented by using hardware or software depends on particular applications and a design requirement of the entire system. A person skilled in the art may use various methods to implement the described functions for each particular application, but it should not be considered that the implementation goes beyond the scope of this application.

Various illustrative logical units and circuits described in this application may implement or operate the described functions by using a general-purpose processor, a digital signal processor, an application-specific integrated circuit (ASIC), a field-programmable gate array (FPGA) or another programmable logical apparatus, a discrete gate or transistor logic, a discrete hardware component, or a design of any combination of the foregoing. The general-purpose processor may be a microprocessor. In one embodiment, the general-purpose processor may be any conventional processor, controller, microcontroller, or state machine. The processor may be implemented by using a combination of computing apparatuses such as a digital signal processor and a microprocessor, a plurality of microprocessors, one or more microprocessors with a digital signal processor core, or any other similar configuration.

Operations of the methods or algorithms described in this application may be directly embedded into hardware, a software unit executed by a processor, or a combination thereof. The software unit may be stored in a random access memory (RAM), a flash memory, a read-only memory (ROM), an erasable programmable read only memory (EPROM), a register, a hard disk, a removable disk, a compact disc read-only memory (CD-ROM), or any other form of storage medium in the art. For example, the storage medium may be connected to a processor so that the processor can read information from the storage medium and write information into the storage medium. Alternatively, the storage medium may be integrated into a processor. The processor and the storage medium may be disposed in an ASIC, and the ASIC may be disposed in a terminal device or a network device. In one embodiment, the processor and the storage medium may be disposed in different components of the terminal device or the network device.

In one or more example designs, the functions described in this application may be implemented by using hardware, software, firmware, or any combination thereof. If the functions are implemented by using software, these functions may be stored in a computer-readable medium or are transmitted to a computer-readable medium in a form of one or more instructions or code. The computer-readable medium is either a computer storage medium or a communications medium that enables a computer program to move from one place to another. The storage medium may be an available medium that may be accessed by any general-purpose or special computer. For example, such a computer-readable medium may include but is not limited to a RAM, a ROM, an EEPROM, a CD-ROM, or another optical disc storage, a disk storage or another magnetic storage apparatus, or any other medium that may be used to carry or store program code, where the program code is in a form of an instruction or a data structure or in a form that can be read by a general-purpose or special computer or a general-purpose or special processor. In addition, any connection may be appropriately defined as a computer-readable medium. For example, if software is transmitted from a website, a server, or another remote resource by using a coaxial cable, an optical fiber computer, a twisted pair, a digital subscriber line (DSL) or in a wireless manner, such as infrared, radio, or microwave, the software is included in a defined computer-readable medium. The disc and the disk include a compressed disk, a laser disk, an optical disc, a digital versatile disc (DVD, a floppy disk, and a Blu-ray disc. The disk generally copies data by a magnetic means, and the disc generally copies data optically by a laser means. The foregoing combination may also be included in the computer-readable medium.

A person skilled in the art should be aware that in the foregoing one or more examples, functions described in this application may be implemented by using hardware, software, firmware, or any combination thereof. When the functions are implemented by using software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of this application are further described in detail in the foregoing specific implementations. It should be understood that the foregoing descriptions are merely specific implementations of this application, but are not intended to limit the protection scope of this application. Any modification, equivalent replacement, or improvement made based on technical solutions of this application shall fall within the protection scope of this application. According to the foregoing description of this specification in this application, technologies in the art may use or implement the content of this application. Any modification based on the disclosed content shall be considered obvious in the art. The basic principles described in this application may be applied to other variations without departing from the essence and scope of this application. Therefore, the content disclosed in this application is not limited to the described embodiments and designs but may also be extended to a maximum scope that is consistent with the principles and disclosed new features of this application.

What is claimed is:

1. A parameter determining method, wherein the method comprises:
    determining, by a first communications entity, that a user equipment (UE) moves from a $5^{th}$ generation (5G) network to an evolved packet system (EPS) network, wherein the UE in the 5G network uses a first set of quality of service (QoS) parameters, including an authorized session aggregate maximum bit rate (AMBR), and wherein the UE in the EPS network uses a second set of QoS parameters, including an authorized access point name (APN) aggregate maximum bit rate (AMBR) and an authorized UE AMBR, wherein the authorized session AMBR in the first set of QoS parameters is one of a plurality of authorized session AMBRs, the authorized session AMBRs corresponding to packet data unit (PDU) connections of a same data network (DN);
    determining, by the first communications entity, the authorized APN AMBR based on a subscribed APN AMBR and the plurality of authorized session AMBRs; and
    sending, by the first communications entity, the authorized APN AMBR to a second communications entity, wherein the second communications entity determines the authorized UE AMBR based on the authorized APN AMBR that is calculated by the first communications entity based on the subscribed APN AMBR and the plurality of authorized session AMBRs.

2. The method according to claim 1, wherein the determining of the authorized APN AMBR comprises:
    determining the authorized APN AMBR using a min (subscribed APN AMBR, sum (authorized session AMBRs of the PDU connections)) function, wherein sum ( ) is a summation function, min ( ) is a function of calculating a minimum value.

3. The method according to claim 1, wherein the determining of the authorized APN AMBR comprises:
    determining the authorized APN AMBR using a sum (authorized session AMBRs of the PDU connections) function, wherein sum ( ) is a summation function.

4. The method according to claim 1, wherein the first communications entity is a session management entity or a policy control entity; and
wherein the determining of the authorized APN AMBR comprises determining, by the first communications entity, the authorized APN AMBR based on the subscribed APN AMBR and a policy.

5. The method according to claim 1, wherein
the first communications entity is an access and mobility management function (AMF) entity, a mobility management entity (MME), a session management entity, a policy control entity, or UE.

6. The method according to claim 1, wherein the second communications entity is an AMF entity, a mobility management entity MME, or UE.

7. The method according to claim 1, wherein the method further comprises:
sending, by the first communications entity, the authorized APN AMBR to one or more of the UE or a user plane entity, wherein the first communications entity is an AMF entity, an MME, a session management entity, or a policy control entity.

8. A parameter determining method, wherein the method comprises:
determining, by a first communications entity, that a user equipment (UE) moves from an evolved packet system (EPS) network to a $5^{th}$ generation (5G) network, wherein the UE in the EPS network uses a first set of quality of service (QoS) parameters, including an authorized access point name (APN) aggregate maximum bit rate (AMBR), and wherein the UE in the 5G network uses a second set of QoS parameters, including an UE AMBR and an authorized session AMBR, wherein the authorized session AMBR is one of a plurality of authorized session AMBRs, the authorized session AMBRs corresponding to a quantity of packet data unit (PDU) connections of a same data network (DN);
determining, by the first communications entity, the authorized session AMBR based on a subscribed session AMBR, or the authorized APN AMBR and the quantity of PDU connections; and
sending, by the first communications entity, the authorized session AMBR to a second communications entity, wherein the second communications entity determines the authorized UE AMBR based on at least the authorized session AMBR.

9. The method according to claim 8, wherein
the first communications entity is a session management entity or a policy control entity, and the determining, by the first communications entity, of the authorized session AMBR based on the subscribed session AMBR comprises:
determining, by the first communications entity, the authorized session AMBR based on the subscribed session AMBR and a policy.

10. The method according to claim 8, wherein
the authorized APN AMBR is equal to a sum of authorized session AMBRs of N sessions, wherein N is the quantity of PDU connections.

11. The method according to claim 10, wherein
the authorized session AMBRs of the N sessions are equal; or
the authorized session AMBRs of the N sessions are not equal, and an authorized session AMBR of each of the N sessions is determined by the first communications entity based on an attribute of the session.

12. The method according to claim 8, wherein
the first communications entity is an AMF entity, an MME, a 5G access network entity, a session management entity, a policy control entity, or a UE.

13. The method according to claim 8, wherein
the first communications entity is an AMF entity, an MME, a 5G access network entity, a session management entity, or a policy control entity, and the method further comprises:
sending, by the first communications entity, the authorized session AMBR to at least one of the UE or a user plane entity.

14. A communications system, comprising:
a first communications entity, configured to
determine that a user equipment (UE) moves from a $5^{th}$ generation (5G) network to an evolved packet system (EPS) network, wherein the UE in the 5G network uses a first set of quality of service (QoS) parameters, including an authorized session aggregate maximum bit rate (AMBR), and wherein the UE in the EPS network uses a second set of QoS parameters, including an authorized access point name (APN) aggregate maximum bit rate (AMBR) and an authorized UE AMBR, wherein the authorized session AMBR in the first set of QoS parameters is one of a plurality of authorized session AMBRs, the authorized session AMBRs corresponding to packet data unit (PDU) connections of a same data network (DN), and
determine the authorized APN AMBR based on a subscribed APN AMBR and the plurality of authorized session AMBRs; and
a second communications entity, configured to
receive the authorized APN AMBR from the first communications entity, and
determine the authorized UE AMBR based on the authorized APN AMBR.

15. The communications system according to claim 14, wherein the first communications entity is configured to:
determine the authorized APN AMBR using a min (subscribed APN AMBR, sum (authorized session AMBRs of the PDU connections)) function, wherein sum ( ) is a summation function, min ( ) is a function of calculating a minimum value.

16. The communications system according to claim 14, wherein the first communications entity is further configured to:
determine the authorized APN AMBR using a sum (authorized session AMBRs of the PDU connections) function, wherein sum ( ) is a summation function.

17. The communications system according to claim 14, wherein the first communications entity is a session management entity or a policy control entity; and
wherein the communications first entity is further configured to determine the authorized APN AMBR based on the subscribed APN AMBR and a policy.

18. The communications system according to claim 14, wherein
the first communications entity is an access and mobility management function (AMF) entity, a mobility management entity (MME), a session management entity, a policy control entity, or UE.

19. The communications system according to claim 14, wherein the second communications entity is an AMF entity, a mobility management entity MME, or UE.

20. The communications system according to claim 14, wherein the first communications entity is further configured to:

send the authorized APN AMBR to one or more of the UE or a user plane entity, wherein the first communications entity is an AMF entity, an MME, a session management entity, or a policy control entity.

* * * * *